(12) United States Patent
Sato

(10) Patent No.: US 8,107,174 B2
(45) Date of Patent: Jan. 31, 2012

(54) WIDE-ANGLE LENS, IMAGING APPARATUS, AND METHOD FOR MANUFACTURING WIDE-ANGLE LENS

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 181 days.

(21) Appl. No.: 12/695,221

(22) Filed: Jan. 28, 2010

(65) Prior Publication Data

US 2010/0195221 A1    Aug. 5, 2010

(30) Foreign Application Priority Data

Jan. 30, 2009  (JP) ................. 2009-020608
Jan. 30, 2009  (JP) ................. 2009-020612
Jan. 30, 2009  (JP) ................. 2009-020621
Jan. 30, 2009  (JP) ................. 2009-020632

(51) Int. Cl.
G02B 13/04 (2006.01)

(52) U.S. Cl. ............ 359/753; 359/752; 359/751

(58) Field of Classification Search .......... 359/753, 359/752, 751
See application file for complete search history.

(56) References Cited

U.S. PATENT DOCUMENTS

| 4,130,349 A | 12/1978 | Hyakumura |
| 4,170,403 A | 10/1979 | Shimokura |
| 4,221,467 A | 9/1980 | Imai |
| 5,113,288 A | 5/1992 | Ohshita |
| 5,381,268 A * | 1/1995 | Sato ............... 359/691 |
| 5,801,887 A * | 9/1998 | Sato ............... 359/691 |
| 7,239,456 B2 * | 7/2007 | Kimura et al. ...... 359/749 |

FOREIGN PATENT DOCUMENTS

| JP | 58-179808 A | 10/1983 |
| JP | 58-184913 A | 10/1983 |
| JP | 60-037514 A | 2/1985 |
| JP | 60-32165 B2 | 7/1985 |
| JP | 60-32850 B2 | 7/1985 |
| JP | 60-34731 B2 | 8/1985 |
| JP | 3-288109 A | 12/1991 |
| JP | 3-288110 A | 12/1991 |
| JP | 05-215964 A | 8/1993 |

* cited by examiner

*Primary Examiner* — David N Spector
(74) *Attorney, Agent, or Firm* — Miles & Stockbridge P.C.

(57) ABSTRACT

A wide-angle lens includes, in order from an object side, a first lens group G1 having negative refractive power, and a second lens group G2 having positive refractive power. The first lens group includes at least one negative meniscus lens having a convex surface facing the object side. The second lens group includes, in order from the object side, a positive lens, a negative lens and a positive lens. Given conditional expressions are satisfied.

33 Claims, 27 Drawing Sheets

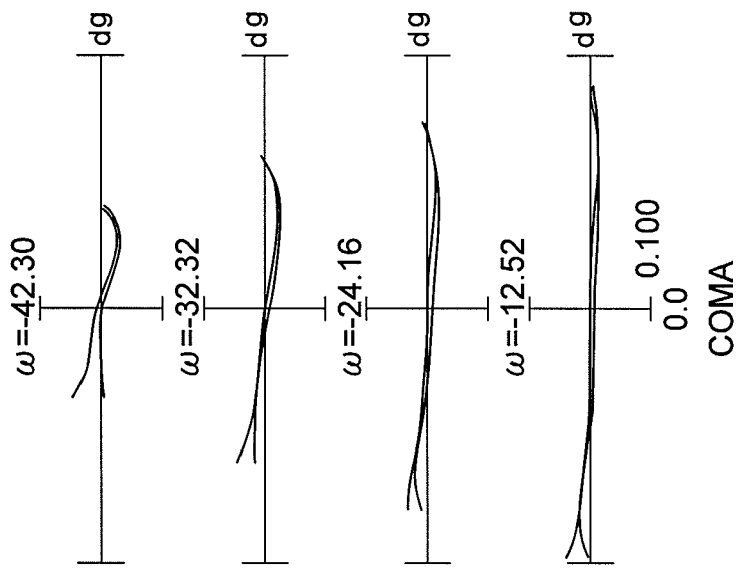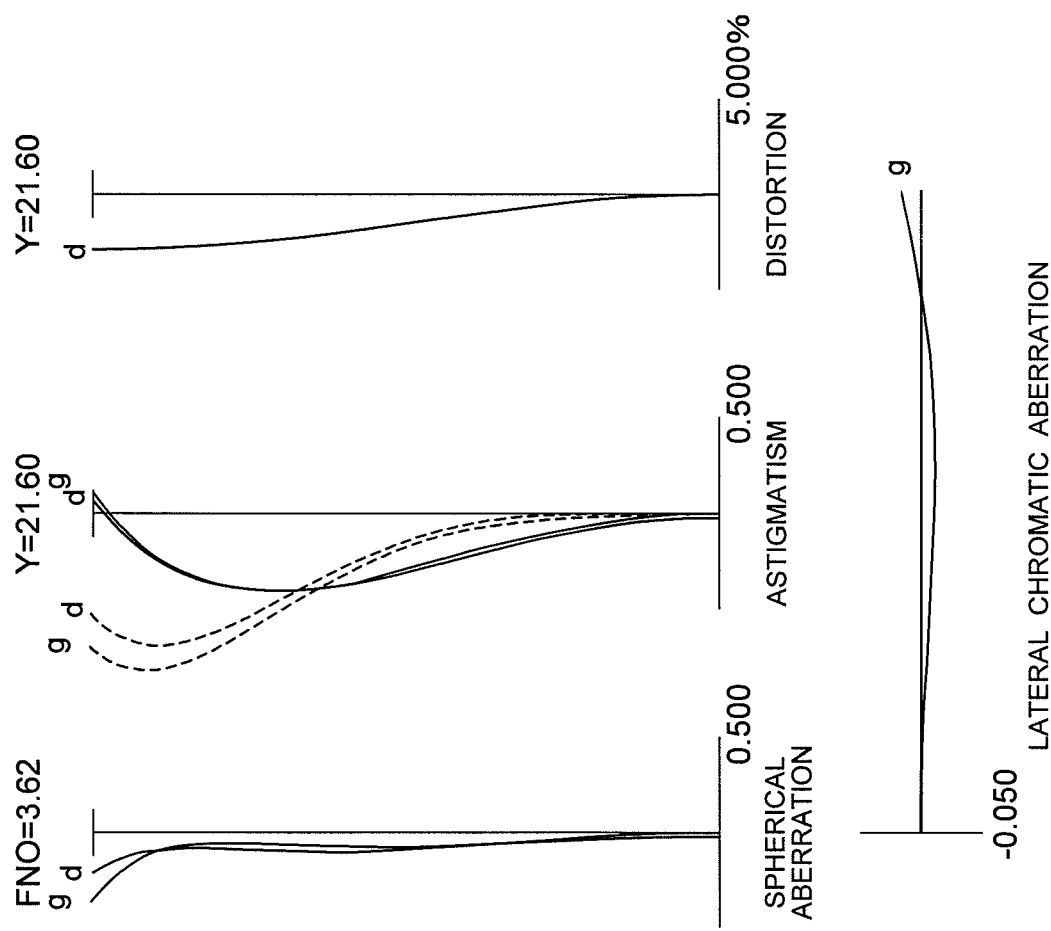
FIG. 8

WIDE-ANGLE LENS, IMAGING APPARATUS, AND METHOD FOR MANUFACTURING WIDE-ANGLE LENS

The disclosure of the following priority applications are herein incorporated by reference:

Japanese Patent Application No. 2009-020608 filed on Jan. 30, 2009;

Japanese Patent Application No. 2009-020612 filed on Jan. 30, 2009;

Japanese Patent Application No. 2009-020621 filed on Jan. 30, 2009; and

Japanese Patent Application No. 2009-020632 filed on Jan. 30, 2009.

BACKGROUND OF THE INVENTION

1. Field of the Invention

The present invention relates to a wide-angle lens optimum as an image-taking lens, an imaging apparatus, and a method for manufacturing the wide-angle lens.

2. Related Background Art

There has been proposed a thin wide-angle lens suitable for a camera such as in Japanese Patent Application Laid-Open No. 3-288109.

However, the conventional thin wide-angle lens has had a problem that when a back focal length is to be secured, it becomes difficult to keep high optical performance.

SUMMARY OF THE INVENTION

The present invention is made in view of the above described desire and has an object to provide a wide-angle lens capable of keeping sufficient back focal length and having high optical performance.

According to a first aspect of the present invention, there is provided a wide-angle lens comprising, in order from an object side: a first lens group having negative refractive power; and a second lens group having positive refractive power; the first lens group including at least one negative meniscus lens having a convex surface facing the object side, the second lens group including, in order from the object side, a positive lens, a negative lens, and a positive lens, and the following conditional expressions (1) and (2) being satisfied:

$$0.90 < \Sigma d/Y\max < 2.00 \tag{1}$$

$$1.30 < BF/f0 < 2.50 \tag{2}$$

where $\Sigma d$ denotes a distance along an optical axis between the most object side lens surface and the most image side lens surface of the wide-angle lens, Ymax denotes an image height with respect to the maximum angle of view of the wide-angle lens, BF denotes a distance between the vertex of the most image side lens surface and the paraxial image plane of the wide-angle lens, and f0 denotes a focal length of the wide-angle lens upon focusing on infinity.

According to a second aspect of the present invention, there is provided an imaging apparatus equipped with the first aspect according to the present invention.

According to a third aspect of the present invention, there is provided a wide-angle lens comprising, in order from an object side: a first lens group having negative refractive power; and a second lens group having positive refractive power; the first lens group including, in order from the object side, a positive lens component, and a negative lens component, the second lens group including, in order from the object side, a first positive lens component, a negative lens component, and a second positive lens component, and the following conditional expressions (5) and (2) being satisfied:

$$0.40 < f0/\Sigma d < 1.60 \tag{5}$$

$$1.30 < BF/f0 < 2.50 \tag{2}$$

where $\Sigma d$ denotes a distance along an optical axis between the most object side lens surface and the most image side lens surface of the wide-angle lens, f0 denotes a focal length of the wide-angle lens upon focusing on infinity, and BF denotes a distance between vertex of the most image side lens surface and the paraxial image plane of the wide-angle lens.

According to a fourth aspect of the present invention, there is provided an imaging apparatus equipped with the third aspect according to the present invention.

According to a fifth aspect of the present invention, there is provided a wide-angle lens comprising, in order from an object side: a first lens group having negative refractive power; and a second lens group having positive refractive power; the first lens group including, in order from the object side, a positive lens component having a convex surface facing the object side, and a rear lens group having negative refractive power, the rear lens group in the first lens group including at least two negative meniscus lens components having a convex surface facing the object side, the second lens group including, in order from the object side, a first positive lens component, a positive meniscus component having a convex surface facing the object side, and a rear lens group having positive refractive power, the rear lens group in the second lens group including, in order from the object side, a cemented positive lens constructed by a negative lens cemented with a positive lens, and a second positive lens component, and the following conditional expressions (1) and (2) being satisfied:

$$0.90 < \Sigma d/Y\max < 2.00 \tag{1}$$

$$1.30 < BF/f0 < 2.50 \tag{2}$$

where $\Sigma d$ denotes a distance along an optical axis between the most object side lens surface and the most image side lens surface of the wide-angle lens, Ymax denotes an image height with respect to the maximum angle of view of the wide-angle lens, BF denotes a distance between the vertex of the most image side lens surface and the paraxial image plane of the wide-angle lens, and f0 denotes a focal length of the wide-angle lens upon focusing on infinity.

According to a sixth aspect of the present invention, there is provided a wide-angle lens comprising, in order from an object side: a first lens group having negative refractive power; and a second lens group having positive refractive power; the first lens group including at least one negative meniscus lens component having a convex surface facing the object side, the second lens group including, in order from the object side, two positive lens components, a negative lens component, and two positive lens components, the negative lens component lens component including a negative lens, and the following conditional expressions (8) and (2) being satisfied:

$$0 < |RNR| - |RNF| (\text{unit: mm}) \tag{8}$$

$$1.30 < BF/f0 < 2.50 \tag{2}$$

where RNF denotes a radius of curvature of the object side lens surface of the negative lens in the negative lens component of the second lens group, RNR denotes a radius of curvature of the image side lens surface of the negative lens in the negative lens component of the second lens group, f0 denotes a focal length of the wide-angle lens upon focusing on infinity, and BF denotes a distance between the vertex of the most image side lens surface and the paraxial image plane of the wide-angle lens.

According to a seventh aspect of the present invention, there is provided a method for manufacturing a wide-angle lens that includes, in order from an object side, a first lens group having negative refractive power, and a second lens group having positive refractive power, the method comprising steps of: disposing a negative meniscus lens having a convex surface facing the object side into the first lens group; disposing, in order from the object side, a positive lens, a negative lens, and a positive lens into the second lens group; and disposing the first lens group and the second lens group such that the wide-angle lens satisfies the following conditional expressions (1) and (2):

$$0.90 < \Sigma d/Y\text{max} < 2.00 \tag{1}$$

$$1.30 < BF/f0 < 2.50 \tag{2}$$

where Σd denotes a distance along an optical axis between the most object side lens surface and the most image side lens surface of the wide-angle lens, Ymax denotes an image height with respect to the maximum angle of view of the wide-angle lens, BF denotes a distance between the vertex of the most image side lens surface and the paraxial image plane of the wide-angle lens, and f0 denotes a focal length of the wide-angle lens upon focusing on infinity.

According to an eighth aspect of the present invention, there is provided a method for manufacturing a wide-angle lens that includes, in order from an object side, a first lens group having negative refractive power, and a second lens group having positive refractive power, the method comprising steps of: disposing, in order from the object side, a positive lens component and a negative lens component into the first lens group; disposing, in order from the object side, a first positive lens component, a negative lens component and a second lens component into the second lens group; and disposing the first lens group and the second lens group such that the wide-angle lens satisfies the following conditional expressions (5) and (2):

$$0.40 < f0/\Sigma d < 1.60 \tag{5}$$

$$1.30 < BF/f0 < 2.50 \tag{2}$$

where Σd denotes a distance along an optical axis between the most object side lens surface and the most image side lens surface of the wide-angle lens, f0 denotes a focal length of the wide-angle lens upon focusing on infinity, and BF denotes a distance between the vertex of the most image side lens surface and the paraxial image plane of the wide-angle lens.

According to a ninth aspect of the present invention, there is provided a method for manufacturing a wide-angle lens that includes, in order from an object side, a first lens group having negative refractive power, and a second lens group having positive refractive power, the method comprising steps of: disposing, in order from the object side, a positive lens component and a rear lens group having negative refractive power into the first lens group; disposing a negative meniscus lens component into the rear lens group of the first lens group; disposing, in order from the object side, a first positive lens component, a positive meniscus lens component, and a rear lens group having positive refractive power into the second lens group; disposing, in order from the object side, a cemented positive lens constructed by a negative lens cemented with a positive lens, and a second positive lens component into the rear lens group of the second lens group;
and disposing the first lens group and the second lens group such that the wide-angle lens satisfies the following conditional expressions (1) and (2):

$$0.90 < \Sigma d/Y\text{max} < 2.00 \tag{1}$$

$$1.30 < BF/f0 < 2.50 \tag{2}$$

where Σd denotes a distance along an optical axis between the most object side lens surface and the most image side lens surface of the wide-angle lens, Ymax denotes an image height with respect to the maximum angle of view of the wide-angle lens, BF denotes a distance between the vertex of the most image side lens surface and the paraxial image plane of the wide-angle lens, and f0 denotes a focal length of the wide-angle lens upon focusing on infinity.

According to a tenth aspect of the present invention, there is provided a method for manufacturing a wide-angle lens that includes, in order from an object side, a first lens group having negative refractive power, and a second lens group having positive refractive power, the method comprising steps of: disposing a negative meniscus lens component having a convex surface facing the object side into the first lens group; disposing, in order from the object side, two positive lens components, a negative lens component, and two positive lens components into the second lens group; disposing a negative lens into the negative lens component; and disposing the first lens group and the second lens group such that the following conditional expressions (8) and (2) are satisfied:

$$0 < |RNR| - |RNF| (\text{unit: mm}) \tag{8}$$

$$1.30 < BF/f0 < 2.50 \tag{2}$$

where RNF denotes a radius of curvature of the object side lens surface of the negative lens in the negative lens component of the second lens group, RNR denotes a radius of curvature of the image side lens surface of the negative lens in the negative lens component of the second lens group, f0 denotes a focal length of the wide-angle lens upon focusing on infinity, and BF denotes a distance between the vertex of the most image side lens surface and the paraxial image plane of the wide-angle lens.

The present invention makes it possible to provide a wide-angle lens having high optical performance and securing a back focal length, an imaging apparatus equipped therewith, and a method for manufacturing the wide-angle lens.

BRIEF DESCRIPTION OF THE DRAWINGS

FIG. 8 shows graphs of various aberrations of the wide-angle lens according to Example 4 upon focusing on infinity.

DESCRIPTION OF THE MOST PREFERRED EMBODIMENT

First Embodiment

Figure 1:
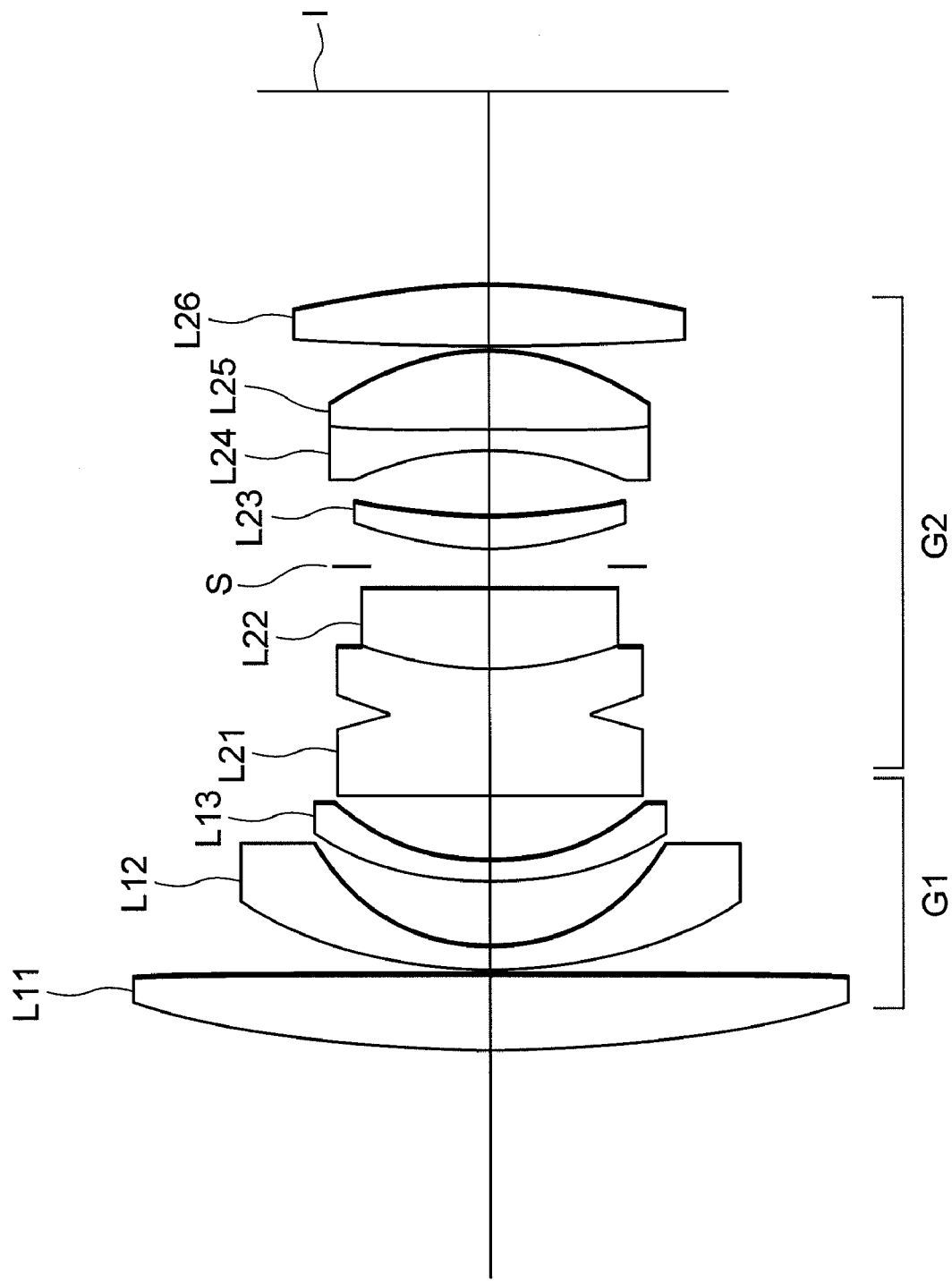
FIG. 1 is a sectional view showing a lens configuration of a wide-angle lens focusing on infinity according to Example 1 of a first embodiment of the present application.

A wide-angle lens according to a first embodiment of the present application is explained below. The following embodiment only shows for better understandings of the present invention. Accordingly, any operable additions or conversions capable of being carried out by a person having ordinary skill in the art are not intended to be excluded within a scope of the present invention.

A wide-angle lens according to the first embodiment includes, in order from an object side, a first lens group having negative refractive power, and a second lens group having positive refractive power. The first lens group includes at least one negative meniscus lens having a convex surface facing the object side. The second lens group includes, in order from the object side, a positive lens, a negative lens, and a positive lens. The following conditional expressions (1) and (2) are satisfied:

$$0.90 < \Sigma d/Y\max < 2.00 \quad (1)$$

$$1.30 < BF/f0 < 2.50 \quad (2)$$

where $\Sigma d$ denotes a distance along an optical axis between the most object side lens surface and the most image side lens surface of the wide-angle lens (hereinafter shown as a total lens thickness), Ymax denotes an image height with respect to the maximum angle of view of the wide-angle lens (hereinafter called as the maximum image height), BF denotes a distance between the vertex of the most image side lens surface and the paraxial image plane of the wide-angle lens (a so-called back focal length), and f0 denotes a focal length of the wide-angle lens upon focusing on infinity.

With satisfying the above conditional expressions, the wide-angle lens makes it possible to optimize Petzval sum as well as to accomplish excellent spherical aberration with making the lens configuration of positive-negative-positive in the second lens group thinner.

Incidentally, the negative lens in the second lens group may be a negative lens component existing in the cemented lens, or the one existing independently in the air. A lens component means a single lens or a cemented lens.

In a wide-angle lens according to the first embodiment, with including at least one negative meniscus lens having a convex surface facing the object side in the first lens group, it becomes possible to excellently correct off-axis aberrations such as curvature of field, astigmatism and coma.

With the lens configuration described above, a wide-angle lens according to the first embodiment makes it possible to accomplish to be extremely thin and to have a wide angle of view with keeping speed of the lens. Accordingly, a so-called thin wide-angle lens can be accomplished. As the total lens thickness of the wide-angle lens becomes thinner, off-axis aberration correction and on-axis aberration correction are carried out by the same lens surface at the same time. Moreover, the number of lenses composing the wide-angle lens is limited so as to make the thickness of the lens thinner, so that complicated lens configuration cannot be applied. Accordingly, off-axis aberration correction particularly becomes difficult, so that a large amount of coma tends to be remained in the lens system. A wide-angle lens according to the first embodiment is characterized by accomplishing excellent aberration correction with optimum power distribution and lens configuration of each lens group.

Conditional expression (1) defines an appropriate range of the ratio of the total lens thickness to the maximum image height of the wide-angle lens. When conditional expression (1) shows a small value, the thickness of the wide-angle lens becomes thinner with respect to the format size. However, since conditional expression (1) has a certain limitation for securing the back focal length and correcting aberrations, optimum value is necessary to be defined. With satisfying conditional expression (1), it becomes possible to accomplish a wide-angle lens having high optical performance with a wide angle of view.

When the ratio $\Sigma d/Y\max$ is equal to or exceeds the upper limit of conditional expression (1), the maximum image height becomes small to a wide-angle lens having a certain total lens thickness. In this case, light flux on the corner of the frame gets blocked, so that the image circle becomes small. When the maximum image height is constant, the total lens thickness becomes thick, so that it becomes impossible to accomplish a wide-angle lens of an original goal. Moreover, when the total lens thickness becomes thicker, the size of the filter becomes larger. In this state, when the diameter is tried to be small, it becomes necessary to take refractive power distribution and lens configuration that makes the incident height of off-axis ray smaller, as a result curvature of field and distortion become worse.

With setting the upper limit of conditional expression (1) to 1.85, it becomes possible to accomplish to be compact. With setting the upper limit of conditional expression (1) to 1.80, it becomes possible to accomplish to be more compact, so that the effect of the present invention can be secured. With setting the upper limit of conditional expression (1) to 1.75, it becomes possible to sufficiently accomplish to be more compact, so that the effect of the present invention can be fully secured.

On the other hand, when the ratio Σd/Ymax is equal to or falls below the lower limit of conditional expression (1), the maximum image height becomes large to a wide-angle lens having a certain total lens thickness. In this case, optical performance on the corner of the frame becomes worse, and curvature of field, astigmatism and coma, in particular, become worse. When the maximum image height is constant, the total lens thickness becomes extremely thin. In this case, curvature of field, astigmatism and coma, in particular, become worse.

With setting the lower limit of conditional expression (1) to 0.95, it becomes possible to excellently correct aberrations. With setting the lower limit of conditional expression (1) to 0.98, it becomes possible to many excellently correct aberrations. With setting the lower limit of conditional expression (1) to 1.00, it becomes possible to many excellently correct aberrations, so that the effect of the present invention can be fully secured.

Conditional expression (2) defines the back focal length of the wide-angle lens with respect to the focal length of the wide-angle lens. This becomes an important factor when the wide-angle lens is used for a single-lens reflex camera. With satisfying conditional expression (2), it becomes possible to accomplish a wide-angle lens having high optical performance with securing the back focal length.

When the ratio BF/f0 is equal to or exceeds the upper limit of conditional expression (2), the back focal length becomes longer with respect to a focal length of the wide-angle lens. In this case, in a retro focus lens configuration, refractive power of the first lens group becomes excessively large, as a result, curvature of field, astigmatism and coma become worse.

With setting the upper limit of conditional expression (2) to 2.30, it becomes possible to excellently correct various aberrations. With setting the upper limit of conditional expression (2) to 2.00, it becomes possible to many excellently correct various aberrations. With setting the upper limit of conditional expression (2) to 1.80, it becomes possible to many excellently correct aberrations, so that the effect of the present invention can be fully secured.

On the other hand, when the ratio BF/f0 is equal to or falls below the lower limit of conditional expression (2), it becomes impossible to obtain sufficient back focal length. In this case, the wide-angle lens becomes difficult to be used for a single-lens reflex camera. Moreover, since the exit pupil comes near to the image plane, the wide-angle lens becomes disadvantageous to be used for a digital camera. Accordingly, when the ratio BF/f0 is equal to or falls below the lower limit of conditional expression (2), the exit pupil is necessary to be disposed far from the image plane, as a result, off-axis aberrations such as coma, in particular, cannot be excellently corrected.

With setting the lower limit of conditional expression (2) to 1.40, it becomes possible to excellently correct various aberrations. With setting the lower limit of conditional expression (2) to 1.45, it becomes possible to correct various aberrations much excellently. With setting the lower limit of conditional expression (2) to 1.50, it becomes possible to correct aberrations many excellently, so that the effect of the present invention can be fully secured.

In a wide-angle lens according to the first embodiment, the following conditional expression (3) is preferably satisfied:

$$0.10 < (-f1)/f0 < 2.00 \quad (3)$$

where f1 denotes a focal length of the first lens group, and f0 denotes a focal length of the wide-angle lens upon focusing on infinity.

Conditional expression (3) defines a focal length of the first lens group with respect to the focal length of the wide-angle lens. The magnitude of refractive power of the first lens group is necessary for the size of the wide-angle lens and for correcting off-axis aberrations excellently. With satisfying conditional expression (3), it becomes possible to accomplish a wide-angle lens having high optical performance.

When the ratio $(-f1)/f0$ is equal to or exceeds the upper limit of conditional expression (3), the absolute value of the focal length of the first lens group becomes large, so that negative refractive power becomes weak. When negative refractive power becomes weak, the diameter of the first lens group becomes large, and the diameter of the wide-angle lens becomes large. Moreover, the back focal length becomes short, so that conditional expressions (1) and (2) are not satisfied. As for correction of aberrations, the refractive power balance between the first lens group having negative refractive power and the second lens group having positive refractive power is shifted, so that it becomes impossible to correct distortion excellently.

With setting the upper limit of conditional expression (3) to 1.60, it becomes possible to secure the effect of the present invention. With setting the upper limit of conditional expression (3) to 1.40, it becomes possible to further secure the effect of the present invention. With setting the upper limit of conditional expression (3) to 1.17, the effect of the present invention can be fully secured.

On the other hand, when the ratio $(-f1)/f0$ is equal to or falls below the lower limit of conditional expression (3), the absolute value of the focal length of the first lens group becomes small, so that negative refractive power of the first lens group becomes excessively strong. In this case, the back focal length becomes excessively long, so that it becomes difficult to make the wide-angle lens compact, and conditional expressions (1) and (2) cannot be satisfied. As for correction of aberration, since excessive negative refractive power increases off-axis aberration, curvature of field, astigmatism and coma, in particular, become worse.

With setting the lower limit of conditional expression (3) to 0.20, it becomes possible to excellently correct various aberrations. With setting the lower limit of conditional expression (3) to 0.40, it becomes possible to correct various aberrations much excellently. With setting the lower limit of conditional expression (3) to 0.50, it becomes possible to correct various aberrations much excellently, and the effect of the present invention can be fully secured.

In a wide-angle lens according to the first embodiment, the following conditional expression (4) is preferably satisfied:

$$0.40 < f2/f0 < 1.50 \quad (4)$$

where f2 denotes a focal length of the second lens group, and f0 denotes a focal length of the wide-angle lens upon focusing on infinity.

Conditional expression (4) defines an appropriate range of the focal length of the second lens group. Optimizing refractive power of the second lens group having positive refractive power is necessary for excellently correcting spherical aberration and coma. With satisfying conditional expression (4), it becomes possible to accomplish a wide-angle lens having high optical performance.

When the ratio f2/f0 is equal to or exceeds the upper limit of conditional expression (4), the focal length of the second lens group becomes large, in other words, refractive power becomes weak, so that spherical aberration becomes overcorrection. In this case, coma becomes worse. Moreover, in this case, the second lens group becomes large, so that the wide-angle lens becomes large.

With setting the upper limit of conditional expression (4) to 1.30, it becomes possible to excellently correct various aberrations. With setting the upper limit of conditional expression (4) to 1.10, it becomes possible to correct various aberrations much excellently. With setting the upper limit of conditional expression (4) to 1.00, it becomes possible to correct various aberrations much excellently, and the effect of the present invention can be fully secured.

On the other hand, when the ratio f2/f0 is equal to or falls below the lower limit of conditional expression (4), the focal length of the second lens group becomes short, in other words, positive refractive power becomes strong, so that spherical aberration becomes under-correction. Moreover, in this case, the back focal length becomes short consequently.

With setting the lower limit of conditional expression (4) to 0.45, it becomes possible to excellently correct various aberrations. With setting the lower limit of conditional expression (4) to 0.55, it becomes possible to correct various aberrations much excellently. With setting the lower limit of conditional expression (4) to 0.60, it becomes possible to correct various aberrations much excellently, and the effect of the present invention can be fully secured.

In a wide-angle lens according to the first embodiment, the following conditional expression (5) is preferably satisfied:

$$0.40 < f0/\Sigma d < 1.60 \quad (5)$$

where f0 denotes a focal length of the wide-angle lens upon focusing on infinity, and $\Sigma d$ denotes a distance along the optical axis between the most object side lens surface and the most image side lens surface of the wide-angle lens (total lens thickness).

Conditional expression (5) normalizes the focal length of the wide-angle lens by the total lens thickness. With satisfying conditional expression (5), it becomes possible to realize a wide-angle lens having high optical performance.

When the ratio f0/$\Sigma d$ is equal to or exceeds the upper limit of conditional expression (5), the total lens thickness becomes excessively thin. In this case, as the total lens thickness of the wide-angle lens becomes thinner, off-axis aberration correction and on-axis aberration correction are carried out by the same lens surface at the same time. Moreover, the number of lenses composing the wide-angle lens is limited so as to make the thickness of the lens thinner, so that complicated lens configuration cannot be applied. Accordingly, off-axis aberration correction particularly becomes difficult, in particular curvature of field, astigmatism and coma become difficult to be corrected.

With setting the upper limit of conditional expression (5) to 1.50, it becomes possible to excellently correct various aberrations. With setting the upper limit of conditional expression (5) to 1.40, it becomes possible to correct various aberrations much excellently. With setting the upper limit of conditional expression (5) to 1.15, it becomes possible to correct various aberrations much excellently, and the effect of the present invention can be fully secured.

On the other hand, when the ratio f0/$\Sigma d$ is equal to or falls below the lower limit of conditional expression (5), the focal length of the wide-angle lens becomes excessively short, so that the wide-angle lens becomes a super wide-angle lens. As a result, when the thickness is made to be thin, it becomes difficult to correct off-axis aberrations such as curvature of field, astigmatism, coma and distortion in particular.

With setting the lower limit of conditional expression (5) to 0.50, it becomes possible to excellently correct various aberrations. With setting the lower limit of conditional expression (5) to 0.55, it becomes possible to correct various aberrations much excellently. With setting the lower limit of conditional expression (5) to 0.60, it becomes possible to correct various aberrations much excellently, and the effect of the present invention can be fully secured.

In a wide-angle lens according to the first embodiment, the following conditional expression (6) is preferably satisfied:

$$45.0 < vd1 < 95.0 \quad (6)$$

where vd1 denotes an average value of Abbe numbers of all lenses having negative refractive power in the first lens group.

Conditional expression (6) defines the average value of Abbe numbers of all lenses having negative refractive power in the first lens group. With satisfying conditional expression (6), it becomes possible to excellently correct lateral chromatic aberration.

When the value vd1 is equal to or exceeds the upper limit of conditional expression (6), since a glass material having an extremely low refractive index is to be used, Petzval sum cannot be kept in a preferable state, so that it becomes difficult to excellently correct curvature of field and astigmatism.

With setting the upper limit of conditional expression (6) to 90.0, various aberrations can be corrected excellently. With setting the upper limit of conditional expression (6) to 85.0, various aberrations can be corrected much excellently.

On the other hand, when the value vd1 is equal to or falls below the lower limit of conditional expression (6), in a wide-angle lens according to the first embodiment, lateral chromatic aberration becomes difficult to be corrected.

With setting the lower limit of conditional expression (6) to 48.0, various aberrations can be corrected excellently. With setting the lower limit of conditional expression (6) to 50.0, various aberrations can be corrected much excellently. With setting the lower limit of conditional expression (6) to 51.0, various aberrations can be corrected much excellently, and the effect of the present invention can be fully secured.

In a wide-angle lens according to the first embodiment, the second lens group preferably includes at least three positive lens components. With this lens configuration, spherical aberration can be corrected excellently, so that it becomes possible to accomplish a large aperture.

In a wide-angle lens according to the first embodiment, an aperture stop is preferably disposed to the object side of the most image side lens in the second lens group. The aperture stop defines an f-number of the wide-angle lens. In a wide-angle lens according to the first embodiment, with disposing the aperture stop to the object side of the most image side lens in the second lens group, it becomes possible to excellently correct curvature of field, distortion and lateral chromatic aberration.

In a wide-angle lens according to the first embodiment, the first lens group preferably includes at least one aspherical surface. With this lens configuration, since a wide-angle lens can be constructed by a fewer number of lenses, it becomes possible to accomplish to be compact. Moreover, with this lens configuration, off-axis aberrations such as curvature of field, coma and distortion, in particular, can be corrected excellently.

Figure 23:
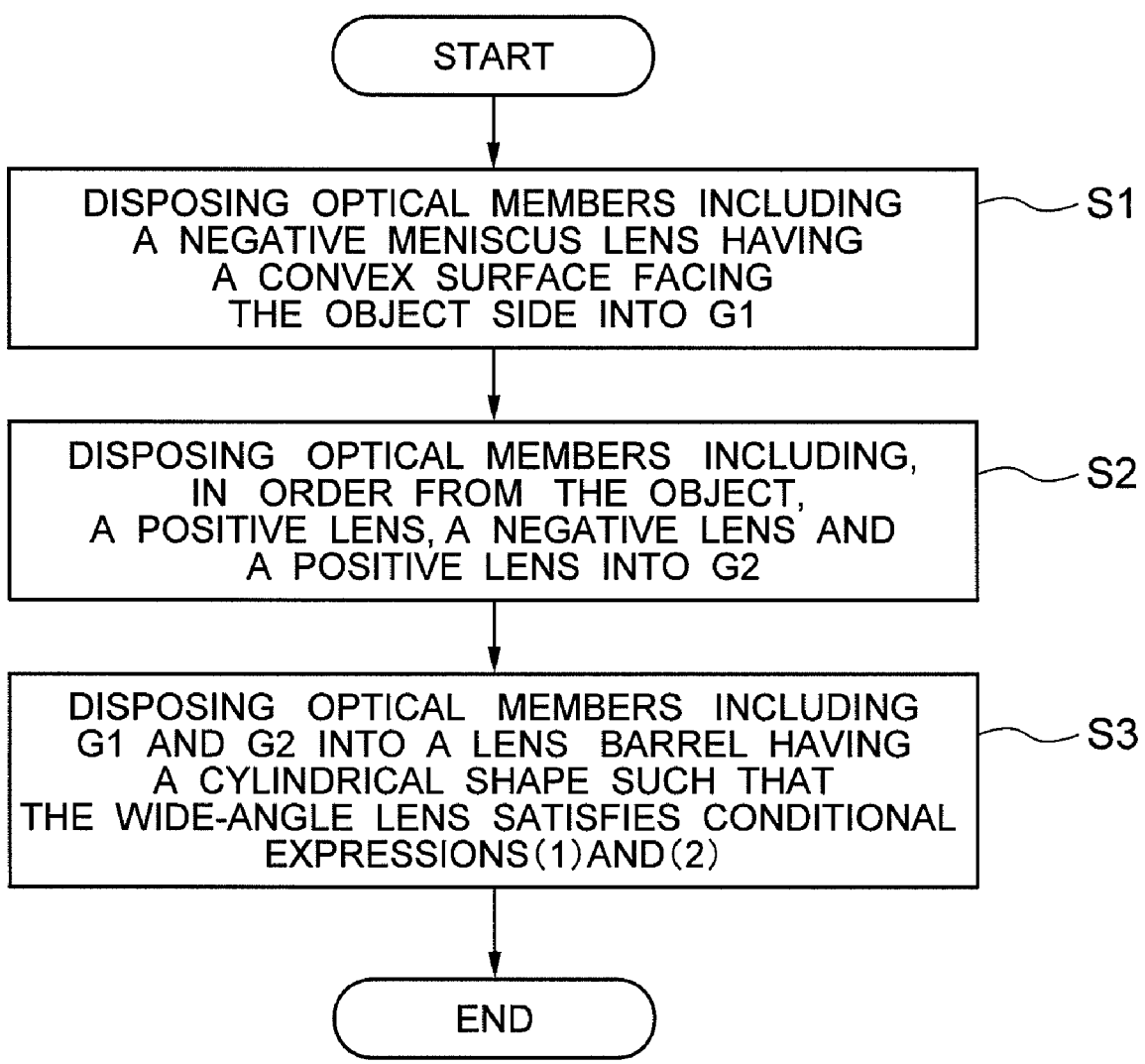
FIG. 23 is a flowchart showing a method for manufacturing the wide-angle lens according to the first embodiment of the present application.

Then, a method for manufacturing a wide-angle lens according to the first embodiment is explained with reference to FIG. 23. FIG. 23 is a flowchart showing a method for manufacturing the wide-angle lens according to the first embodiment of the present application.

The method for manufacturing the wide-angle lens according to the first embodiment is a method for manufacturing a wide-angle lens that includes, in order from an object side, a first lens group having negative refractive power, and a second lens group having positive refractive power, and the method includes the following steps from step S1 through step S3 as shown in FIG. 23.

Step S1:

In step S1, optical members including a negative meniscus lens having a convex surface facing the object side are disposed into the first lens group.

Step S2:

In step S2, optical members including, in order from the object side, a positive lens, a negative lens, and a positive lens are disposed into the second lens group.

Step S3:

In step S3, optical members including the first lens group and the second lens group are disposed into a lens barrel having a cylindrical shape such that the wide-angle lens satisfies the following conditional expressions (1) and (2):

$$0.90 < \Sigma d/Y\max < 2.00 \quad (1)$$

$$1.30 < BF/f0 < 2.50 \quad (2)$$

where $\Sigma d$ denotes a distance along an optical axis between the most object side lens surface and the most image side lens surface of the wide-angle lens, Ymax denotes an image height with respect to the maximum angle of view of the wide-angle lens, BF denotes a distance between the vertex of the most image side lens surface and the paraxial image plane, and f0 denotes a focal length of the wide-angle lens upon focusing on infinity.

With this method for manufacturing a wide-angle lens, it becomes possible to manufacture a wide-angle lens having a wide angle of view and excellent optical performance.

Then, a wide-angle lens seen from another point of view according to the first embodiment is explained. The wide-angle lens seen from another angle of view according to the first embodiment includes, in order from an object side, a first lens group having negative refractive power, and a second lens group having positive refractive power. The first lens group includes, in order from the object side, a positive lens component and a negative lens component. The second lens group includes, in order from the object side, a first positive lens component, a negative lens component, a second positive lens component, and a third positive lens component. The following conditional expressions (5) and (2) are satisfied:

$$0.40 < f0/\Sigma d < 1.60 \quad (5)$$

$$1.30 < BF/f0 < 2.50 \quad (2)$$

where $\Sigma d$ denotes a distance along an optical axis between the most object side lens surface and the most image side lens surface of the wide-angle lens (hereinafter called as a total lens thickness), f0 denotes a focal length of the wide-angle lens upon focusing on infinity, and BF denotes a distance between the vertex of the most image side lens surface and the paraxial image plane of the wide-angle lens (a so-called back focal length).

In a wide-angle lens seen from another point of view according to the first embodiment, with including, in order from the object side, a positive lens component, and a negative lens component in the first lens group, it becomes possible to excellently correct off-axis aberrations such as curvature of field, astigmatism and distortion, in particular.

In a wide-angle lens seen from another point of view according to the first embodiment, with including four lens components in the second lens group that are, in order from the object side, the first positive lens component, the negative lens component, the second positive lens component, and the third positive lens component, it becomes possible to accomplish excellent spherical aberration and to optimize Petzval sum with making the second lens group thinner. Moreover, with this lens configuration, it becomes possible to secure a given amount of back focal length with excellently correcting coma. Incidentally, a lens component means a single lens or a cemented lens.

With the above-described lens configuration, a wide-angle lens seen from another point of view according to the first embodiment makes it possible to have a wide angle of view and, at the same time, to make the thickness extremely thin with securing the speed of the lens, so that a so-called thin wide-angle lens is accomplished. As the total lens thickness of the wide-angle lens becomes thinner, off-axis aberration correction and on-axis aberration correction are carried out by the same lens surface at the same time. Moreover, the number of lenses composing the wide-angle lens is limited so as to make the thickness of the lens thinner, so that complicated lens configuration cannot be applied. Accordingly, off-axis aberration correction particularly becomes difficult, so that the lens tends to become an optical system having large residual coma. A wide-angle lens seen from another point of view according to the first embodiment makes it possible to accomplish excellent aberration state with optimum lens configuration and power distribution of each lens group.

Conditional expression (5) normalizes the focal length of the wide-angle lens by the total lens thickness. However, conditional expression (5) has already been explained above, so that duplicated explanations are omitted except different portions.

With setting the upper limit of conditional expression (5) to 1.50, various aberrations can be corrected excellently. With setting the upper limit of conditional expression (5) to 1.20, various aberrations can be corrected much excellently. With setting the upper limit of conditional expression (5) to 1.00, various aberrations can be corrected much excellently. With setting the upper limit of conditional expression (5) to 0.88, various aberrations can be corrected much excellently, and the effect of the present invention can be fully secured.

Conditional expression (2) defines the back focal length of the wide-angle lens with respect to the focal length of the wide-angle lens. However, conditional expression (2) has already been explained above, so that duplicated explanations are omitted except different portions.

With setting lower limit of conditional expression (2) to 1.45, various aberrations can be excellently corrected. With setting lower limit of conditional expression (2) to 1.50, various aberrations can be much excellently corrected. With setting lower limit of conditional expression (2) to 1.52, various aberrations can be much excellently corrected, and the effect of the present invention can be fully secured.

In a wide-angle lens seen from another point of view according to the first embodiment, the following conditional expression (3) is preferably satisfied:

$$0.10<(-f1)/f0<2.00 \tag{3}$$

where f1 denotes a focal length of the first lens group, and f0 denotes a focal length of the wide-angle lens upon focusing on infinity.

Conditional expression (3) defines a focal length of the first lens group with respect to the focal length of the wide-angle lens. However, conditional expression (3) has already been explained above, so that duplicated explanations are omitted except different portions.

With setting the upper limit of conditional expression (3) to 1.60, the effect of the present invention can be secured. With setting the upper limit of conditional expression (3) to 1.40, the effect of the present invention can be more secured.

With setting upper limit of conditional expression (3) to 1.10, the effect of the present invention can be further more secured. With setting the upper limit of conditional expression (3) to 1.00, the effect of the present invention can be fully secured.

In a wide-angle lens seen from another point of view according to the first embodiment, the following conditional expression (7) is preferably satisfied:

$$0.80<f2R/f0<10.00 \tag{7}$$

where f2R denotes a combined focal length of the negative lens component, the second positive lens component and the third positive lens component in the second lens group, and f0 denotes a focal length of the wide-angle lens upon focusing on infinity.

Conditional expression (7) defines an appropriate range of the combined focal length of a rear lens group composed of the negative lens component, the second positive lens component and the third positive lens component of the second lens group (hereinafter called as a rear lens group of the second lens group). Optimizing refractive power of the rear lens group of the second lens group having positive refractive power is necessary for excellently correcting spherical aberration and coma. With satisfying conditional expression (7), it becomes possible to accomplish a wide-angle lens having high optical performance.

When the ratio f2R/f0 is equal to or exceeds the upper limit of conditional expression (7), the combined focal length of the rear lens group of the second lens group becomes long, and refractive power thereof becomes weak, so that spherical aberration becomes difficult to be excellently corrected. Moreover, coma becomes worse. Furthermore, the rear lens group of the second lens group becomes large, as a result the wide-angle lens becomes large.

With setting the upper limit of conditional expression (7) to 9.00, various aberrations can be excellently corrected. With setting the upper limit of conditional expression (7) to 8.50, various aberrations can be excellently corrected. With setting the upper limit of conditional expression (7) to 8.00, various aberrations can be excellently corrected and the effect of the present invention can be fully secured.

On the other hand, when the ratio f2R/f0 is equal to or falls below the lower limit of conditional expression (7), the combined focal length of the rear lens group of the second lens group becomes short and refractive power thereof becomes strong, so that it becomes difficult to excellently correct spherical aberration. Moreover, coma becomes worse. Furthermore, a given back focal length cannot be obtained.

With setting the lower limit of conditional expression (7) to 1.00, various aberrations can be excellently corrected. With setting the lower limit of conditional expression (7) to 1.30, various aberrations can be much excellently corrected. With setting the lower limit of conditional expression (7) to 1.40, various aberrations can be much excellently corrected, and the effect of the present invention can be fully secured.

In a wide-angle lens seen from another point of view according to the first embodiment, the negative lens component of the second lens group includes a negative lens, and the following conditional expression (8) is preferably satisfied:

$$0<|RNR|-|RNF| \text{(unit: mm)} \tag{8}$$

where RNF denotes a radius of curvature of the object side lens surface of the negative lens in the negative lens component of the second lens group, and RNR denotes a radius of curvature of the image side lens surface of the negative lens in the negative lens component of the second lens group.

Conditional expression (8) defines the lens surface shape of the negative lens in the negative lens component of the second lens group. With satisfying conditional expression (8), a wide-angle lens seen from another point of view according to the first embodiment makes it possible to obtain an optimum back focal length with keeping spherical aberration and coma in excellent states. When conditional expression (8) is not satisfied, the back focal length becomes too short to be used as an interchangeable lens for a single-lens reflex camera. When the back focal length is forcibly secured, upper coma in particular becomes worse.

Figure 24:
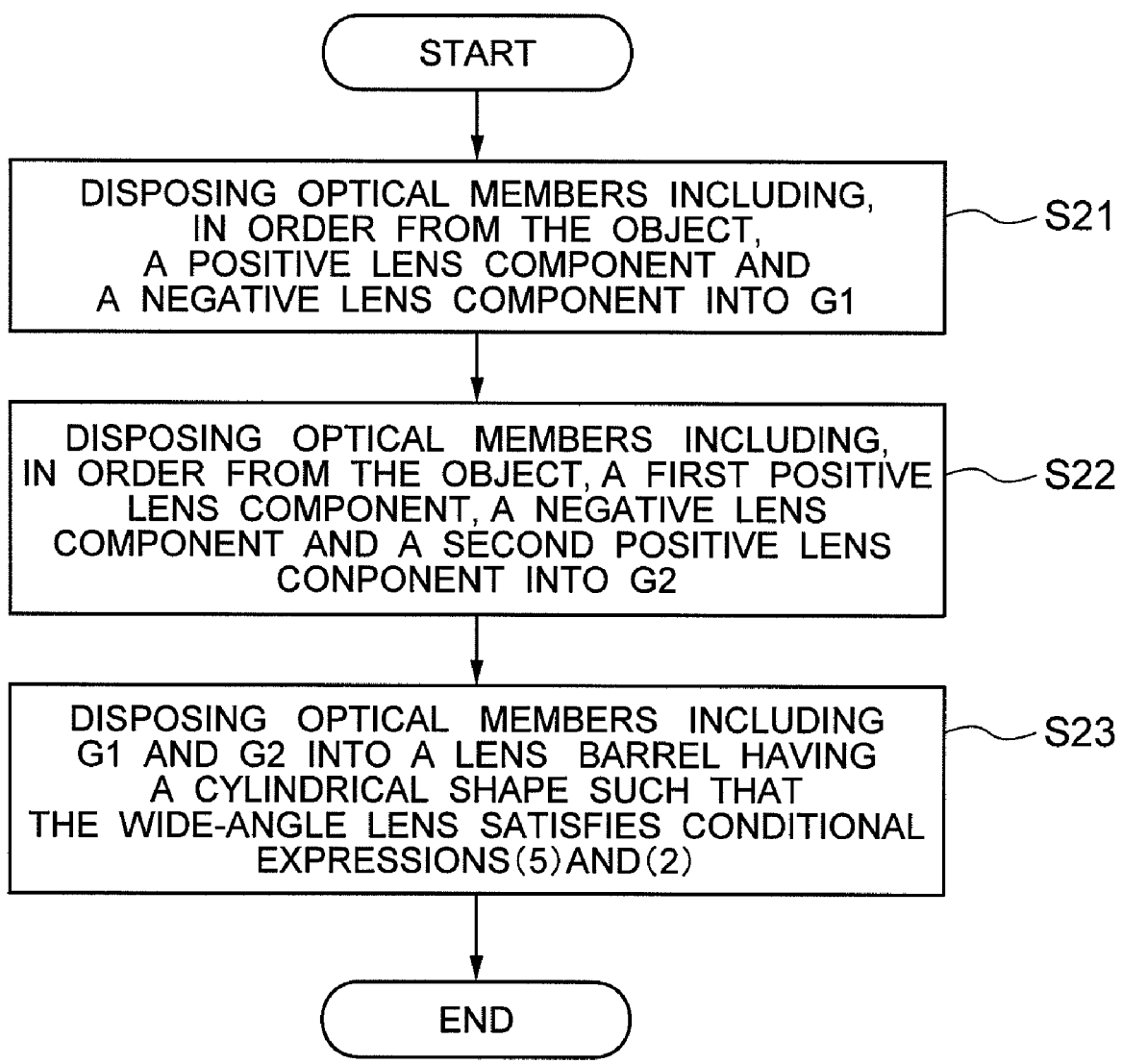
FIG. 24 is a flowchart showing a method for manufacturing the wide-angle lens seen from another point of view according to the first embodiment of the present application.

Then, a method for manufacturing a wide-angle lens seen from another point of view according to the first embodiment is explained with reference to FIG. 24. FIG. 24 is a flowchart showing a method for manufacturing the wide-angle lens seen from another point of view according to the first embodiment of the present application.

The method for manufacturing the wide-angle lens seen from another point of view according to the first embodiment is a method for manufacturing a wide-angle lens that includes, in order from an object side, a first lens group having negative refractive power, and a second lens group having positive refractive power, and the method includes the following steps from step S21 through step S23 as shown in FIG. 24.

Step S21:

In step S21, optical members including, in order from the object side, a positive lens component a negative lens component are disposed into the first lens group.

Step S22:

In step S22, optical members including, in order from the object side, a first positive lens component, a negative lens component, a second positive lens component and a third positive lens component are disposed into the second lens group.

Step S23:

In step S23, optical members including the first lens group and the second lens group are disposed into a lens barrel having a cylindrical shape such that the wide-angle lens satisfies the following conditional expressions (5) and (2):

$$0.40<f0/\Sigma d<1.60 \tag{5}$$

$$1.30<BF/f0<2.50 \tag{2}$$

where $\Sigma d$ denotes a distance along an optical axis between the most object side lens surface and the most image side lens surface of the wide-angle lens, f0 denotes a focal length of the wide-angle lens upon focusing on infinity, and BF denotes a distance between the vertex of the most image side lens surface and the paraxial image plane of the wide-angle lens.

With this method for manufacturing a wide-angle lens seen from another point of view, it becomes possible to manufacture a wide-angle lens having a wide angle of view and excellent optical performance.

Then, a wide-angle lens seen from still another point of view according to the first embodiment of the present application is explained below.

A wide-angle lens seen from still another point of view according to the first embodiment includes, in order from an object side, a first lens group having negative refractive power, and a second lens group having positive refractive power. The first lens group consists of at least one negative meniscus lens component having a convex surface facing the object side. The second lens group includes, in order from the object side, two positive lens components, a negative lens component, and two positive lens components. The negative lens component includes a negative lens, and the following conditional expressions (8) and (2) are satisfied:

$$0 < |RNR| - |RNF| \text{(unit: mm)} \qquad (8)$$

$$1.30 < BF/f0 < 2.50 \qquad (2)$$

where RNF denotes a radius of curvature of the object side lens surface of the negative lens in the negative lens component of the second lens group, RNR denotes a radius of curvature of the image side lens surface of the negative lens in the negative lens component of the second lens group, f0 denotes a focal length of the wide-angle lens upon focusing on infinity, and BF denotes a distance between the vertex of the most image side lens surface and the paraxial image plane of the wide-angle lens.

With this lens configuration, a wide-angle lens seen from still another point of view according to the first embodiment makes it possible to accomplish a wide-angle lens having high optical performance with securing a given back focal length.

With including at least one negative meniscus lens component having a convex surface facing the object side into the first lens group, a wide-angle lens seen from still another point of view according to the first embodiment makes it possible to excellently correct off-axis aberrations, in particular, curvature of field, astigmatism and coma.

In a wide-angle lens seen from still another point of view according to the first embodiment, the second lens group includes, in order from the object side, two positive lens components, a negative lens component and two positive lens components, and the negative lens component includes a negative lens.

With this lens configuration, excellent spherical aberration can be accomplished, and Petzval sum can be optimized even if the second lens group becomes thin.

The negative lens in the second lens group may be a lens component included in a cemented lens, or a lens component independently existing in the air.

Moreover, a lens component means a single lens or a cemented lens.

With the lens configuration described above, a wide-angle lens seen from still another point of view according to the first embodiment makes it possible to accomplish to be extremely thin and to have a wide angle of view with keeping speed of the lens. Accordingly, a so-called thin wide-angle lens can be accomplished. As the total lens thickness of the wide-angle lens becomes thinner, off-axis aberration correction and on-axis aberration correction are carried out by the same lens surface at the same time. Moreover, the number of lenses composing the wide-angle lens is limited so as to make the thickness of the lens thinner, so that complicated lens configuration cannot be applied. Accordingly, off-axis aberration correction particularly becomes difficult, so that a large amount of coma tends to be remained in the lens system. A wide-angle lens seen from still another point of view according to the first embodiment is characterized by accomplishing excellent aberration correction with optimum power distribution and lens configuration of each lens group.

Conditional expression (8) defines the lens surface shape of the negative lens in the negative lens component of the second lens group. However, conditional expression (8) has already been described above, so that duplicated explanations are omitted.

Conditional expression (2) defines the back focal length of the wide-angle lens with respect to the focal length of the wide-angle lens. However, conditional expression (2) has already been described above, so that duplicated explanations are omitted except different portions.

With setting lower limit of conditional expression (2) to 1.40, it becomes possible to excellently correct various aberrations. With setting lower limit of conditional expression (2) to 1.45, it becomes possible to excellently correct various aberrations. With setting lower limit of conditional expression (2) to 1.50, it becomes possible to correct various aberrations much excellently. With setting lower limit of conditional expression (2) to 1.52, it becomes possible to correct various aberrations much excellently, and the effect of the present invention can be fully secured.

In a wide-angle lens seen from still another point of view according to the first embodiment, the following conditional expression (1) is preferably satisfied:

$$0.90 < \Sigma d / Y\text{max} < 2.00 \qquad (1)$$

where $\Sigma d$ denotes a distance along an optical axis between the most object side lens surface and the most image side lens surface of the wide-angle lens (hereinafter shown as a total lens thickness), and Ymax denotes an image height with respect to the maximum angle of view (hereinafter called as the maximum image height).

Conditional expression (1) defines an appropriate range of the ratio of the total lens thickness to the maximum image height of the wide-angle lens. However, conditional expression (1) has already been explained above, so that duplicated explanations are omitted except different portions.

With setting upper limit of conditional expression (1) to 1.85, it becomes possible to make the wide-angle lens compact. With setting upper limit of conditional expression (1) to 1.80, it becomes possible to make the wide-angle lens more compact. With setting upper limit of conditional expression (1) to 1.70, it becomes possible to make the wide-angle lens still more compact. With setting upper limit of conditional expression (1) to 1.50, it becomes possible to make the wide-angle lens further more compact, and the effect of the present invention can be fully secured. With setting upper limit of conditional expression (1) to 1.38, it becomes possible to make the wide-angle lens sufficiently compact, and the effect of the present invention can be fully secured.

In a wide-angle lens seen from still another point of view according to the first embodiment, the following conditional expression (3) is preferably satisfied:

$$0.10 < (-f1)/f0 < 2.00 \qquad (3)$$

where f1 denotes a focal length of the first lens group, and f0 denotes a focal length of the wide-angle lens upon focusing on infinity.

Conditional expression (3) defines a focal length of the first lens group with respect to the focal length of the wide-angle lens. However, conditional expression (3) has already been explained, so that duplicated explanations are omitted except different portions.

With setting the upper limit of conditional expression (3) to 1.60, the effect of the present invention can be secured. With setting the upper limit of conditional expression (3) to 1.40, the effect of the present invention can be more secured. With setting the upper limit of conditional expression (3) to 1.10, the effect of the present invention can be much more secured. With setting the upper limit of conditional expression (3) to 1.00, the effect of the present invention can be still much more secured. With setting the upper limit of conditional expression (3) to 0.93, the effect of the present invention can be fully secured.

In a wide-angle lens seen from still another point of view according to the first embodiment, the following conditional expression (4) is preferably satisfied:

$$0.40 < f2/f0 < 1.50 \quad (4)$$

where f2 denotes a focal length of the second lens group, and f0 denotes a focal length of the wide-angle lens upon focusing on infinity.

Conditional expression (4) defines an appropriate range of the focal length of the second lens group. However, conditional expression (4) has already been explained, so that duplicated explanations are omitted except different portions.

With setting upper limit of conditional expression (4) to 1.30, various aberrations can be corrected excellently. With setting upper limit of conditional expression (4) to 1.10, various aberrations can be corrected more excellently. With setting upper limit of conditional expression (4) to 1.00, various aberrations can be corrected still more excellently. With setting upper limit of conditional expression (4) to 0.90, various aberrations can be corrected further more excellently, and the effect of the present invention can be fully secured.

Figure 25:
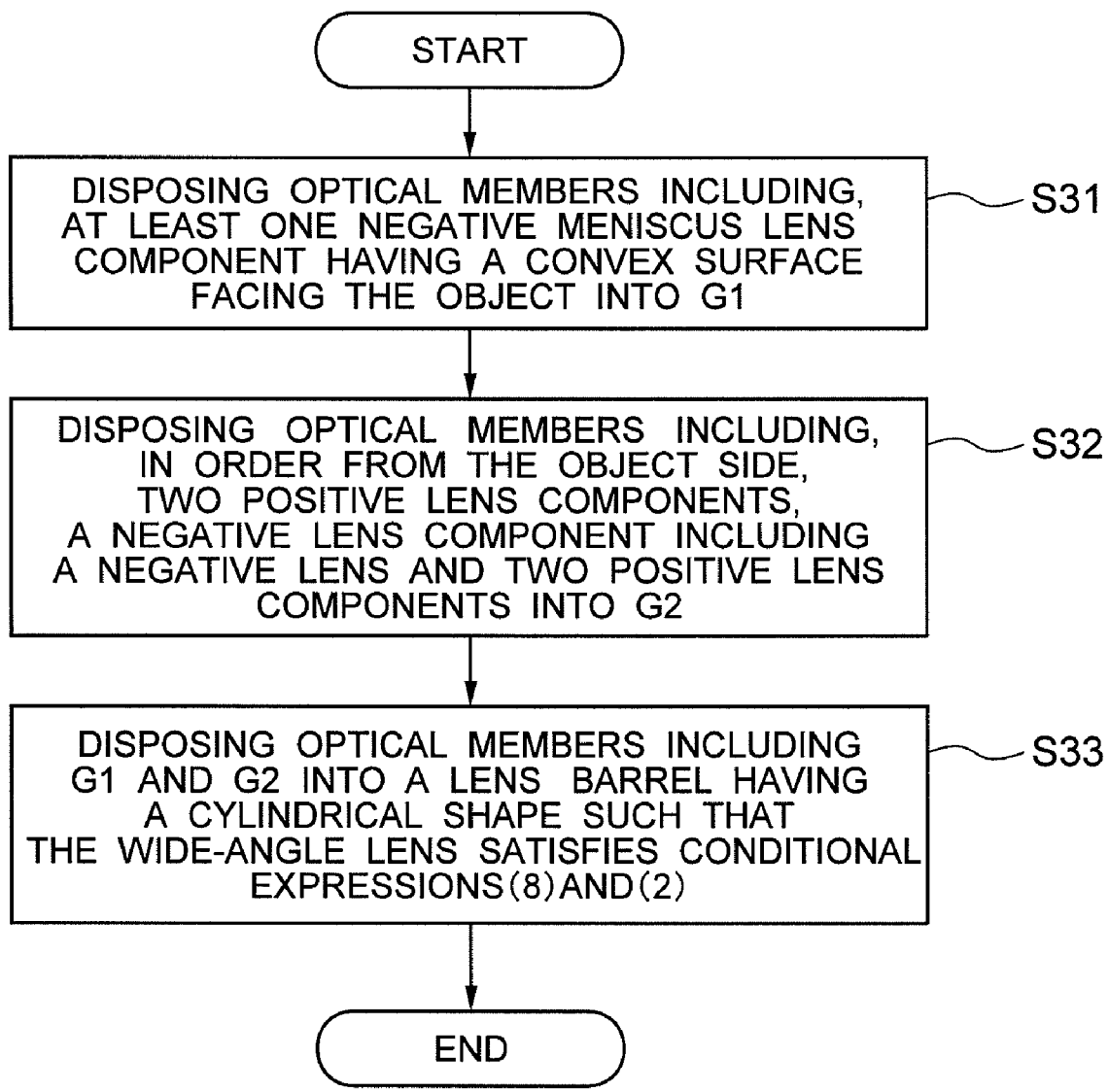
FIG. 25 is a flowchart showing a method for manufacturing the wide-angle lens seen from still another point of view according to the first embodiment of the present application.

Then, a method for manufacturing a wide-angle lens seen from still another point of view according to the first embodiment is explained with reference to FIG. 25. FIG. 25 is a flowchart showing a method for manufacturing the wide-angle lens seen from still another point of view according to the first embodiment of the present application.

The method for manufacturing the wide-angle lens seen from still another point of view according to the first embodiment is a method for manufacturing a wide-angle lens that includes, in order from an object side, a first lens group having negative refractive power, and a second lens group having positive refractive power, and the method includes the following steps from step S31 through step S33 as shown in FIG. 25.

Step S31:

In step S31, optical members including at least one negative meniscus lens having convex surface facing the object side are disposed into the first lens group.

Step S32:

In step S32, optical members including, in order from the object side, two positive lens components, a negative lens component including a negative lens, and two positive lens components are disposed into the second lens group.

Step S33:

In step S33, optical members including the first lens group and the second lens group are disposed into a lens barrel having a cylindrical shape such that the wide-angle lens satisfies the following conditional expressions (8) and (2):

$$0 < |RNR| - |RNF| (\text{unit: mm}) \quad (8)$$

$$1.30 < B$$

$$F/f0 < 2.50 \quad (2)$$

where RNF denotes a radius of curvature of the object side lens surface of the negative lens in the negative lens component of the second lens group, RNR denotes a radius of curvature of the image side lens surface of the negative lens in the negative lens component of the second lens group, f0 denotes a focal length of the wide-angle lens upon focusing on infinity, and BF denotes a distance between the vertex of the most image side lens surface and the paraxial image plane of the wide-angle lens (a so-called back focal length).

With this method for manufacturing a wide-angle lens seen from still another point of view, it becomes possible to manufacture a wide-angle lens having a wide angle of view and excellent optical performance.

Each numerical example of a wide-angle lens according to the first embodiment is explained below with reference to accompanying drawings.

EXAMPLE 1

FIG. 1 is a sectional view showing a lens configuration of a wide-angle lens focusing on infinity according to Example 1 of a first embodiment of the present application.

The wide-angle lens according to Example 1 is composed of, in order from an object side, a first lens group G1 having negative refractive power, and a second lens group G2 having positive refractive power.

The first lens group G1 is composed of, in order from the object side, a positive meniscus lens L11 having a convex surface facing the object side, a negative meniscus lens L12 having a convex surface facing an image side and an aspherical surface facing the object side, and a negative meniscus lens L13 having a convex surface facing the object side.

The second lens group G2 is composed of, in order from the object side, a cemented positive lens constructed by a negative meniscus lens L21 having a convex surface facing the object side cemented with a positive meniscus lens L22 having a convex surface facing the object side, an aperture stop S for defining an f-number, a positive meniscus lens L23 having a convex surface facing the object side, a cemented positive lens constructed by a double concave negative lens L24 cemented with a double convex positive lens L25, and a double convex positive lens L26 having an aspherical surface facing the image side.

Incidentally, a groove having an effective diameter of 10.4 mm is formed on a position with a vertex distance of 4 mm away from the object side lens surface of the negative meniscus lens L21 in the second lens group G2 in order to define lower side light ray.

Various values associated with the wide-angle lens according to Example 1 are listed in Table 1.

In [Specifications], f denotes a focal length of the wide-angle lens, FNO denotes an f-number, ω denotes a half angle of view, Y denotes an image height, TL denotes a total lens length, Σd denotes a distance between the most object side lens surface and the most image side lens surface of the wide-angle lens, and Bf denotes a back focal length.

In [Lens Data], the left most column "i" shows the lens surface number counted in order from the object side, the second column "r" shows a radius of curvature of the lens surface, the third column "d" shows a distance to the next surface, the fourth column "nd" shows refractive index at d-line (wavelength λ=587.6 nm), and the fifth column "νd"

shows an Abbe number at d-line (wavelength λ=587.6 nm). In the fifth column "nd" refractive index of the air nd=1.000000 is omitted. In the second column "r", r=∞ denotes a plane surface. An aspherical surface is expressed by attaching "*" to the left side of the lens surface number of [Lens Data].

In [Aspherical Surface Data], when "y" denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and An denotes an aspherical coefficient of n-th order, the aspherical surface is exhibited by the following expression:

$$X(y) = (y^2/r)/\left[1+\{1-\kappa \times (y/r)^2\}^{1/2}\right] + A4 \times y^4 + A6 \times y^6 + A8 \times y^8 + A10 \times y^{10} + A12 \times y^{12} + A14 \times y^{14} + A16 \times y^{16}$$

In [Aspherical Surface Data], "E-n" denotes "×10$^{-n}$", in which "n" is an integer, and for example "1.234E-05" denotes "1.234×10$^{-5}$". In [Lens Group Data], a starting surface number "i" and a focal length of each lens group are shown.

In [Values for Conditional Expressions], values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples.

TABLE 1

[Specifications]

| | |
|---|---|
| f = | 24.698 |
| FNO = | 2.9 |
| ω = | 41.86° |
| Y = | 21.6 |
| TL = | 74.298 |
| Σd = | 36.297 |
| Bf = | 38.000 |

[Lens Data]

| i | r | d | nd | vd |
|---|---|---|---|---|
| 1) | 60.2367 | 3.7000 | 1.487490 | 70.45 |
| 2) | 1253.2521 | 0.1000 | | |
| 3) | 23.0000 | 1.2000 | 1.497820 | 82.56 |
| *4) | 9.7255 | 3.0000 | | |
| 5) | 17.0653 | 1.0000 | 1.497820 | 82.56 |
| 6) | 11.2587 | 3.0000 | | |
| 7) | 209.7383 | 6.0000 | 1.581440 | 40.75 |
| 8) | 15.3142 | 4.0000 | 1.672700 | 32.11 |
| 9) | 999.0000 | 1.0000 | | |
| 10> | ∞ | 0.7000 | Aperture Stop S | |
| 11) | 16.8962 | 1.6000 | 1.497820 | 82.56 |
| 12) | 26.5870 | 2.9977 | | |
| 13) | −17.0825 | 1.0000 | 1.717360 | 29.52 |
| 14) | 115.0466 | 3.9000 | 1.603000 | 65.47 |
| 15) | −12.9513 | 0.1000 | | |
| 16) | 102.8313 | 3.0000 | 1.603000 | 65.47 |
| *17) | −33.5404 | 37.9998 | | |

TABLE 1-continued

[Aspherical Surface Data]

Surface Number: 4

| | |
|---|---|
| κ = | 0.5233 |
| A4 = | 7.38600E−05 |
| A6 = | 1.87510E−07 |
| A8 = | 1.29680E−08 |
| A10 = | 5.53830E−11 |
| A12 = | −0.98108E−12 |
| A14 = | −0.17874E−13 |
| A16 = | 0.44513E−15 |

Surface Number: 17

| | |
|---|---|
| κ = | 6.3253 |
| A4 = | 4.20950E−05 |
| A6 = | 7.78040E−08 |
| A8 = | 1.36830E−09 |
| A10 = | 7.36610E−13 |
| A12 = | 0.00 |
| A14 = | 0.00 |
| A16 = | 0.00 |

[Lens Group Data]

| Group | i | focal length |
|---|---|---|
| G1 | 1 | −28.546 |
| G2 | 7 | 22.093 |

[Values for Conditional Expressions]

| | |
|---|---|
| (1): Σd/Ymax = | 1.68 |
| (2): BF/f0 = | 1.54 |
| (3): (−f1)/f0 = | 1.16 |
| (4): f2/f0 = | 0.894 |
| (5): f0/Σd = | 0.680 |
| (6): νd1 = | 82.56 |

Figure 2:
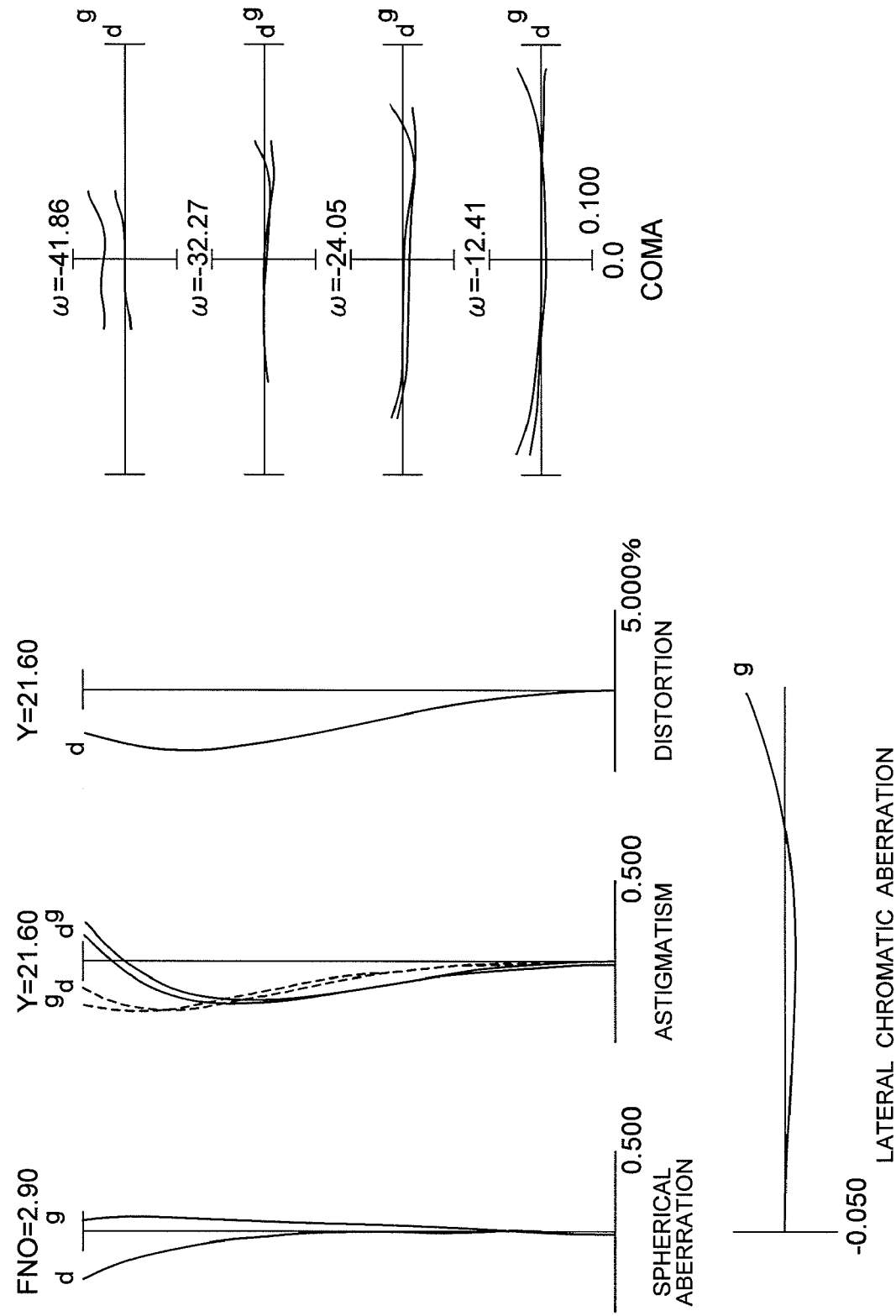
FIG. 2 shows graphs of various aberrations of the wide-angle lens according to Example 1 upon focusing on infinity.

FIG. 2 shows graphs of various aberrations of the wide-angle lens according to Example 1 upon focusing on infinity.

In respective graphs, FNO denotes an f-number, Y denotes an image height, and ω denotes a half angle of view (unit: degrees). In respective graphs, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane. In graphs showing coma, a solid line shows meridional coma. The above-described explanation regarding various aberration graphs is the same as the other Examples.

As is apparent from FIG. 2, the wide-angle lens according to Example 1 shows superb optical performance as a result of good corrections to various aberrations.

EXAMPLE 2

Figure 3:
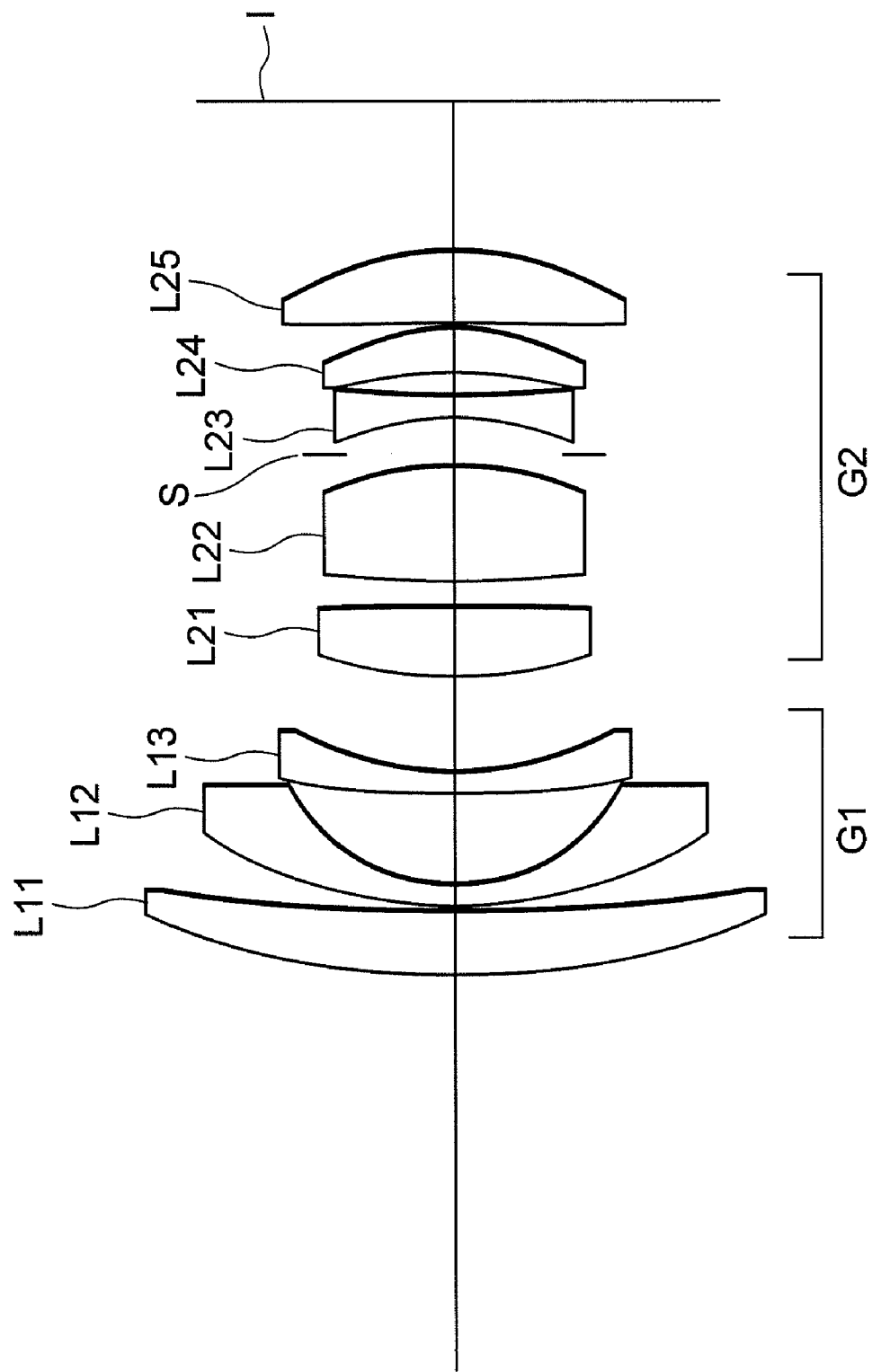
FIG. 3 is a sectional view showing a lens configuration of a wide-angle lens focusing on infinity according to Example 2 of the first embodiment of the present application.

FIG. 3 is a sectional view showing a lens configuration of a wide-angle lens focusing on infinity according to Example 2 of the first embodiment of the present application.

The wide-angle lens according to Example 2 is composed of, in order from an object side, a first lens group G1 having negative refractive power, and a second lens group G2 having positive refractive power.

The first lens group G1 is composed of, in order from the object side, a positive meniscus lens L11 having a convex surface facing the object side, a negative meniscus lens L12 having a convex surface facing the object side, and a negative meniscus lens L13 having a convex surface facing the object side.

The second lens group G2 is composed of, in order from the object side, a double convex positive lens L21, a double convex positive lens L22, an aperture stop S for defining an f-number, a double concave negative lens L23, a positive meniscus lens L24 having a convex surface facing the image side, and a double convex positive lens L25.

Various values associated with the wide-angle lens according to Example 2 are listed in Table 2.

TABLE 2

[Specifications]

| | |
|---|---|
| f = | 24.400 |
| FNO = | 3.596 |
| ω = | 42.44° |
| Y = | 21.6 |
| TL = | 68.898 |
| Σd = | 30.900 |
| Bf = | 37.998 |

[Lens Data]

| i | r | d | nd | νd |
|---|---|---|---|---|
| 1) | 33.8751 | 2.8000 | 1.603000 | 65.47 |
| 2) | 74.9380 | 0.1000 | | |
| 3) | 20.0930 | 1.0000 | 1.755000 | 52.29 |
| 4) | 8.3114 | 3.8000 | | |
| 5) | 42.9059 | 1.0000 | 1.497820 | 82.56 |
| 6) | 14.2223 | 4.0000 | | |
| 7) | 19.1522 | 3.0000 | 1.717360 | 29.52 |
| 8) | −1286.6968 | 1.0000 | | |
| 9) | 43.0642 | 5.0000 | 1.497820 | 82.56 |
| 10) | −15.7069 | 0.5000 | | |
| 11> | ∞ | 1.5000 | Aperture Stop S | |
| 12) | −13.6078 | 1.0000 | 1.903660 | 31.27 |
| 13) | 41.2595 | 0.9000 | | |
| 14) | −25.4888 | 2.0000 | 1.593190 | 67.87 |
| 15) | −11.7946 | 0.1000 | | |
| 16) | 485.1036 | 3.2000 | 1.603000 | 65.47 |
| 17) | −14.7873 | 37.9983 | | |

[Lens Group Data]

| Group | i | focal length |
|---|---|---|
| G1 | 1 | −15.318 |
| G2 | 7 | 18.373 |

[Values for Conditional Expressions]

| | |
|---|---|
| (1): Σd/Ymax = | 1.43 |
| (2): BF/f0 = | 1.56 |
| (3): (−f1)/f0 = | 0.628 |
| (4): f2/f0 = | 0.753 |
| (5): f0/Σd = | 0.790 |
| (6): νd1 = | 67.74 |
| (7): f2R/f0 = | 1.63 |
| (8): |RNR| − |RNF| = | 27.66 |

Figure 4:
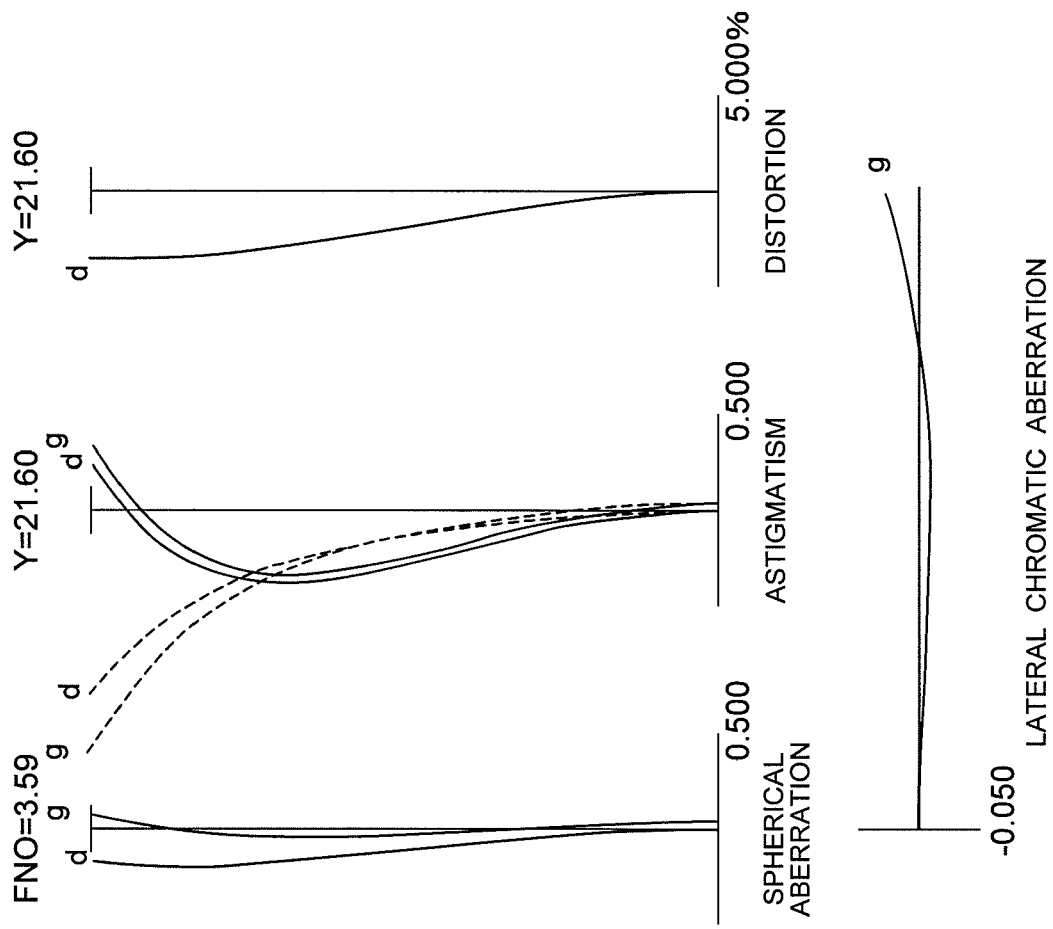
FIG. 4 shows graphs of various aberrations of the wide-angle lens according to Example 2 upon focusing on infinity.

FIG. 4 shows graphs of various aberrations of the wide-angle lens according to Example 2 upon focusing on infinity.

As is apparent from FIG. 4, the wide-angle lens according to Example 2 shows superb optical performance as a result of good corrections to various aberrations.

EXAMPLE 3

Figure 5:
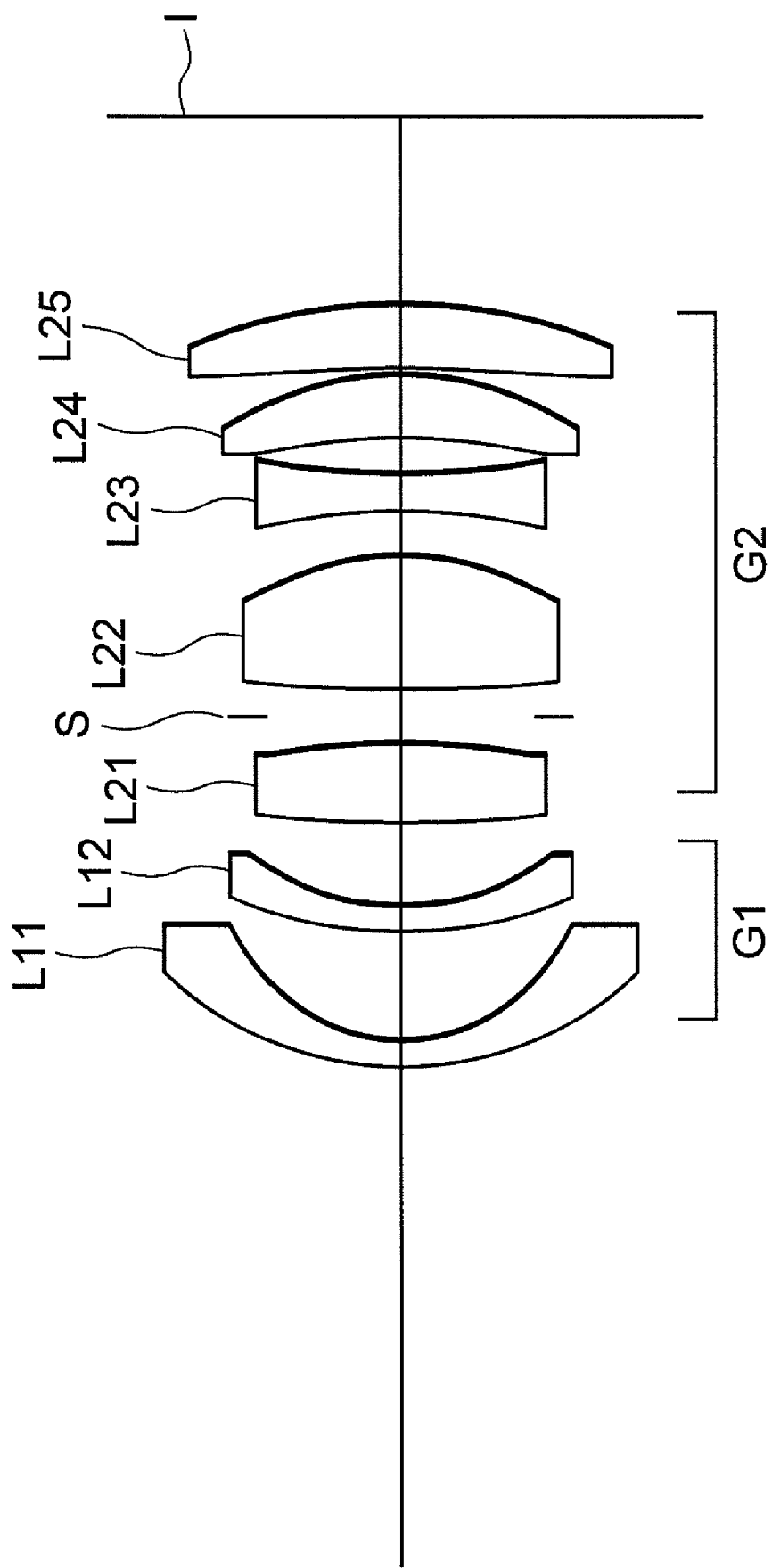
FIG. 5 is a sectional view showing a lens configuration of a wide-angle lens focusing on infinity according to Example 3 of the first embodiment of the present application.

FIG. 5 is a sectional view showing a lens configuration of a wide-angle lens focusing on infinity according to Example 3 of the first embodiment of the present application.

The wide-angle lens according to Example 3 is composed of, in order from an object side, a first lens group G1 having negative refractive power, and a second lens group G2 having positive refractive power.

The first lens group G1 is composed of, in order from the object side, a negative meniscus lens L11 having a convex surface facing the object side and an aspherical surface facing an image side, and a negative meniscus lens L12 having a convex surface facing the object side.

The second lens group G2 is composed of, in order from the object side, a double convex positive lens L21, an aperture stop S for defining an f-number, a double convex positive lens L22, a double concave negative lens L23, a positive meniscus lens L24 having a convex surface facing the image side, and a positive meniscus lens L25 having a convex surface facing the image side.

Various values associated with the wide-angle lens according to Example 3 are listed in Table 3.

TABLE 3

[Specifications]

| | |
|---|---|
| f = | 24.401 |
| FNO = | 3.62 |
| ω = | 42.31° |
| Y = | 21.6 |
| TL = | 66.423 |
| Σd = | 28.400 |
| Bf = | 38.023 |

[Lens Data]

| i | r | d | nd | νd |
|---|---|---|---|---|
| 1) | 13.0000 | 1.0000 | 1.603000 | 65.47 |
| *2) | 6.5788 | 4.0000 | | |
| 3) | 16.3065 | 1.0000 | 1.497820 | 82.56 |
| 4) | 9.3200 | 3.0000 | | |
| 5) | 35.6227 | 3.0000 | 1.672700 | 32.11 |
| 6) | −45.2913 | 1.0000 | | |
| 7> | ∞ | 1.0000 | Aperture Stop S | |
| 8) | 58.1986 | 5.0000 | 1.497820 | 82.56 |
| 9) | −11.9480 | 1.6000 | | |
| 10) | −25.4154 | 1.5000 | 1.850260 | 32.35 |
| 11) | 28.5178 | 1.2000 | | |
| 12) | −34.8646 | 2.5000 | 1.497820 | 82.56 |
| 13) | −12.2372 | 0.1000 | | |
| 14) | −148.0797 | 2.5000 | 1.603000 | 65.47 |
| 15) | −22.6787 | 38.0226 | | |

[Aspherical Surface Data]
Surface Number: 2

| | |
|---|---|
| κ = | 0.7798 |
| A4 = | −1.89600E−05 |
| A6 = | 6.76130E−06 |
| A8 = | −5.07050E−07 |
| A10 = | 2.17350E−08 |
| A12 = | −0.45673E−09 |
| A14 = | 0.37950E−11 |
| A16 = | 0.10000E−17 |

[Lens Group Data]

| Group | i | focal length |
|---|---|---|
| G1 | 1 | −14.488 |
| G2 | 5 | 17.812 |

[Values for Conditional Expressions]

| | |
|---|---|
| (1): Σd/Ymax = | 1.31 |
| (2): BF/f0 = | 1.56 |
| (3): (−f1)/f0 = | 0.594 |
| (4): f2/f0 = | 0.730 |
| (5): f0/Σd = | 0.859 |
| (6): νd1 = | 74.02 |
| (8): |RNR| − |RNF| = | 4.10 |

Figure 6:
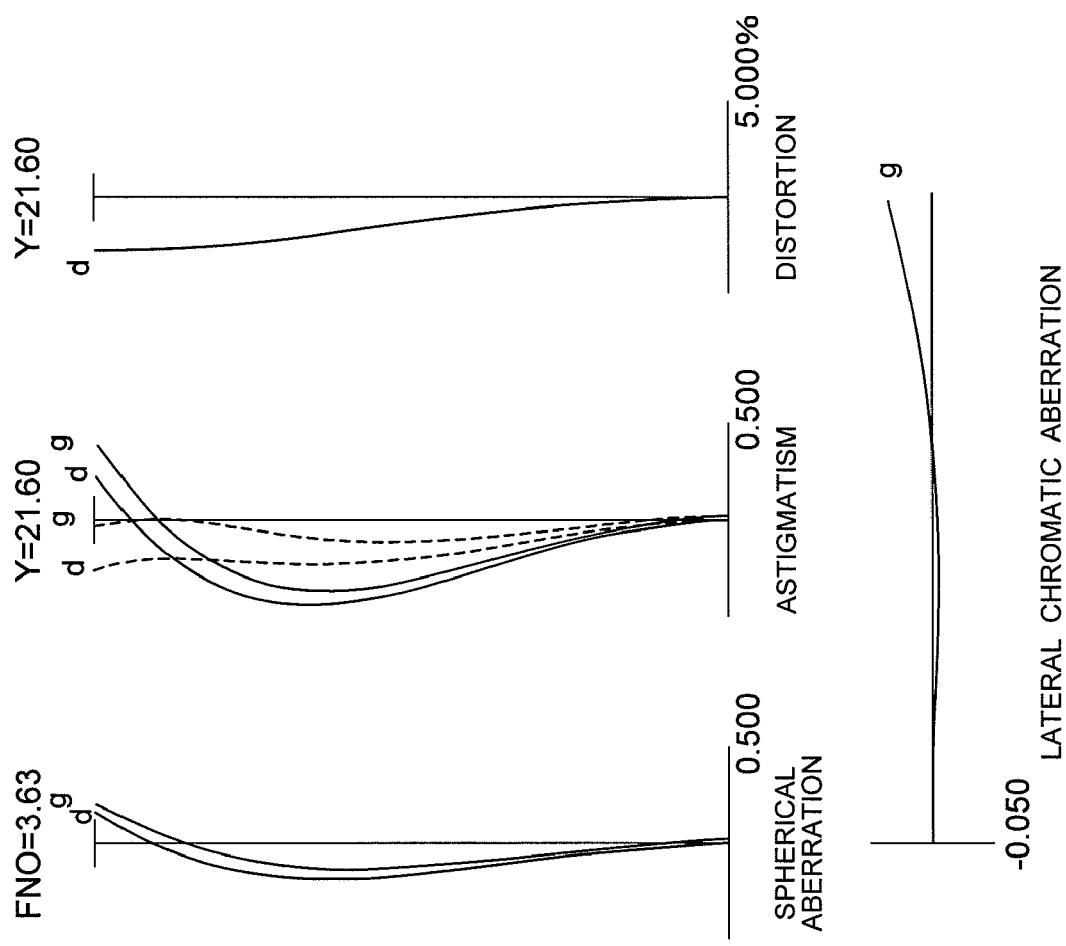
FIG. 6 shows graphs of various aberrations of the wide-angle lens according to Example 3 upon focusing on infinity.

FIG. 6 shows graphs of various aberrations of the wide-angle lens according to Example 3 upon focusing on infinity.

As is apparent from FIG. 6, the wide-angle lens according to Example 3 shows superb optical performance as a result of good corrections to various aberrations.

EXAMPLE 4

Figure 7:
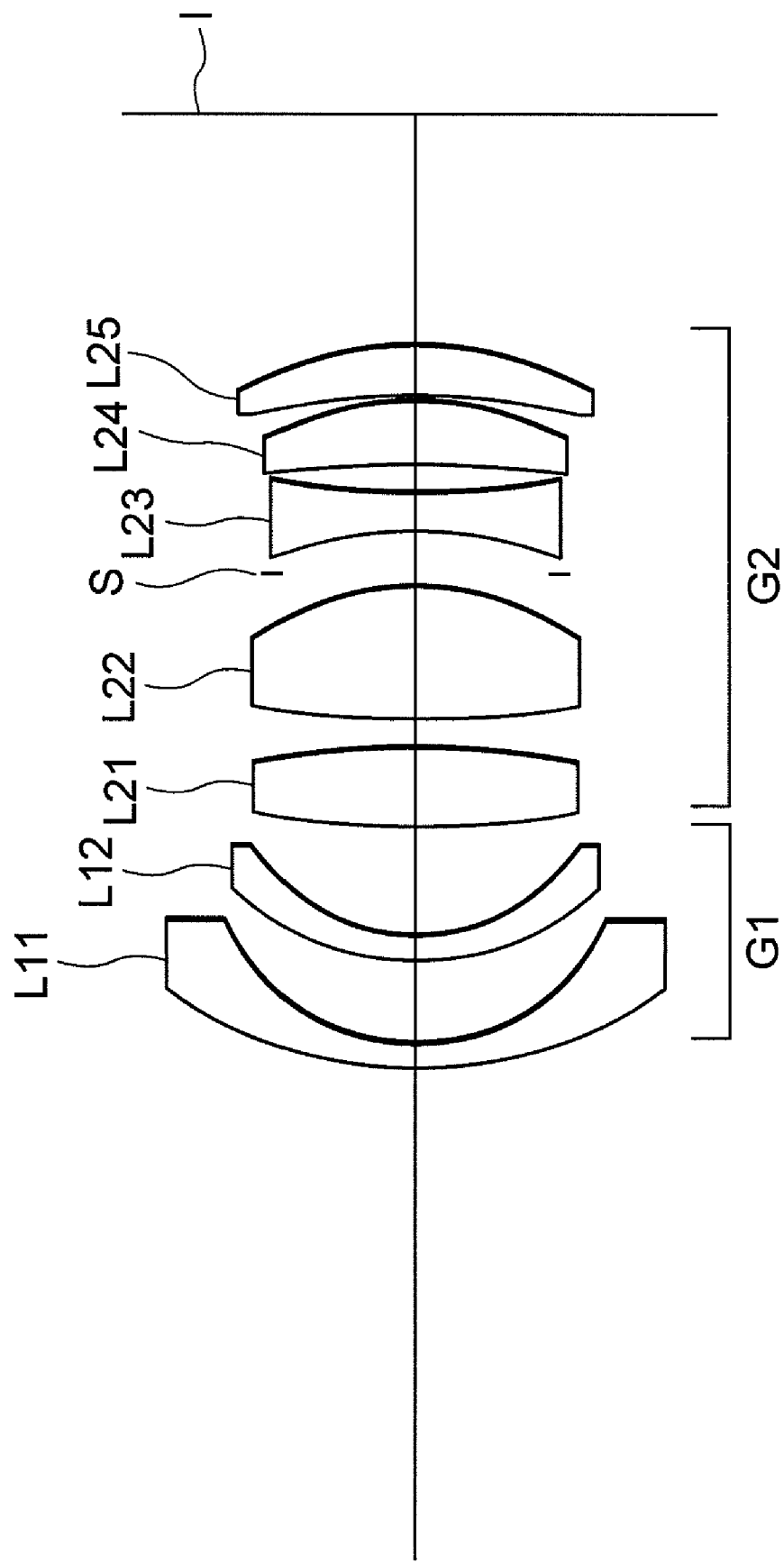
FIG. 7 is a sectional view showing a lens configuration of a wide-angle lens focusing on infinity according to Example 4 of the first embodiment of the present application.

FIG. 7 is a sectional view showing a lens configuration of a wide-angle lens focusing on infinity according to Example 4 of the first embodiment of the present application.

The wide-angle lens according to Example 4 is composed of, in order from an object side, a first lens group G1 having negative refractive power, and a second lens group G2 having positive refractive power.

The first lens group G1 is composed of, in order from the object side, a negative meniscus lens L11 having a convex surface facing the object side, and a negative meniscus lens L12 having a convex surface facing the object side and an aspherical surface facing the image side.

The second lens group G2 is composed of, in order from the object side, a double convex positive lens L21, a double convex positive lens L22, an aperture stop S for defining an f-number, a double concave negative lens L23, a positive meniscus lens L24 having a convex surface facing the image side, and a positive meniscus lens L25 having a convex surface facing the image side.

Various values associated with the wide-angle lens according to Example 4 are listed in Table 4.

TABLE 4

[Specifications]

| | |
|---|---|
| f = | 24.401 |
| FNO = | 3.62 |
| ω = | 42.31° |
| Y = | 21.6 |
| TL = | 65.078 |
| Σd = | 27.100 |
| Bf = | 37.978 |

[Lens Data]

| i | r | d | nd | vd |
|---|---|---|---|---|
| 1) | 16.0478 | 1.0000 | 1.755000 | 52.29 |
| 2) | 7.9274 | 3.0000 | | |
| 3) | 10.0991 | 1.0000 | 1.589130 | 61.18 |
| *4) | 6.8029 | 4.0000 | | |
| 5) | 32.0272 | 3.0000 | 1.717360 | 29.52 |
| 6) | −43.9577 | 1.0000 | | |
| 7) | 32.6637 | 5.0000 | 1.487490 | 70.45 |
| 8) | −11.6735 | 0.5000 | | |
| 9> | ∞ | 1.5000 | Aperture Stop S | |
| 10) | −17.5914 | 1.5000 | 1.903660 | 31.27 |
| 11) | 26.5782 | 1.0000 | | |
| 12) | −56.3638 | 2.5000 | 1.593190 | 67.87 |
| 13) | −12.4855 | 0.1000 | | |
| 14) | −31.8451 | 2.0000 | 1.603000 | 65.47 |
| 15) | −14.5224 | 37.9778 | | |

[Aspherical Surface Data]
Surface Number: 4

κ = 0.8089
A4 = −3.23490E−05
A6 = 7.06440E−08
A8 = −1.25010E−07
A10 = 3.45160E−09
A12 = −0.60254E−10
A14 = 0.00
A16 = 0.00

TABLE 4-continued

[Lens Group Data]

| Group | i | focal length |
|---|---|---|
| G1 | 1 | −13.163 |
| G2 | 5 | 16.844 |

[Values for Conditional Expressions]

| | |
|---|---|
| (1): Σd/Ymax = | 1.25 |
| (2): BF/f0 = | 1.56 |
| (3): (−f1)/f0 = | 0.539 |
| (4): f2/f0 = | 0.690 |
| (5): f0/Σd = | 0.900 |
| (6): νd1 = | 56.74 |
| (8): \|RNR\| − \|RNF\| = | 8.99 |

FIG. 8 shows graphs of various aberrations of the wide-angle lens according to Example 4 upon focusing on infinity.

As is apparent from FIG. 8, the wide-angle lens according to Example 4 shows superb optical performance as a result of good corrections to various aberrations.

EXAMPLE 5

Figure 9:
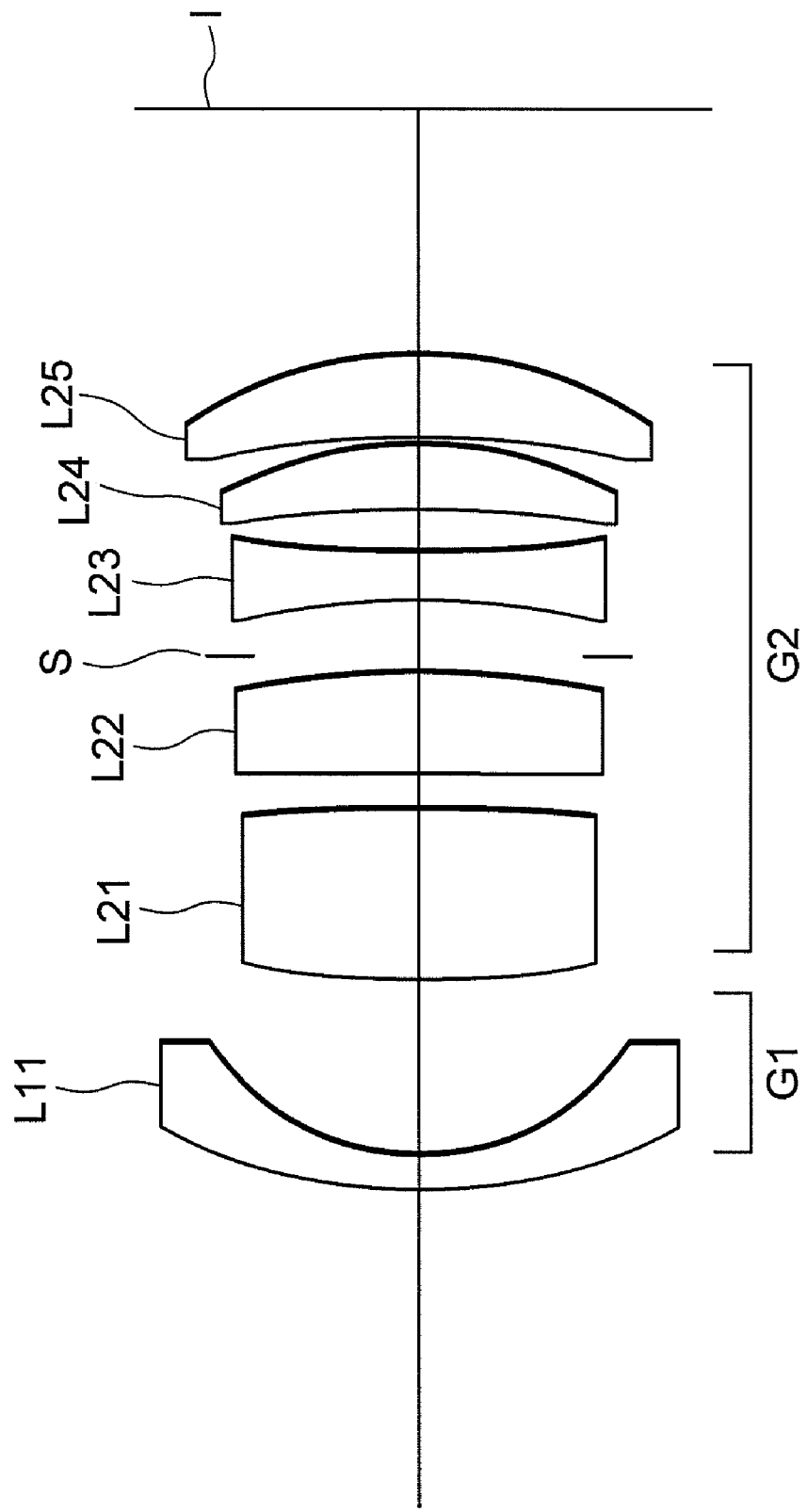
FIG. 9 is a sectional view showing a lens configuration of a wide-angle lens focusing on infinity according to Example 5 of the first embodiment of the present application.

FIG. 9 is a sectional view showing a lens configuration of a wide-angle lens focusing on infinity according to Example 5 of the first embodiment of the present application.

The wide-angle lens according to Example 5 is composed of, in order from an object side, a first lens group G1 having negative refractive power, and a second lens group G2 having positive refractive power.

The first lens group G1 is composed of a negative meniscus lens L11 having a convex surface facing the object side and an aspherical surface facing an image side.

The second lens group G2 is composed of, in order from the object side, a double convex positive lens L21, a double convex positive lens L22, an aperture stop S for defining an f-number, a double concave negative lens L23, a positive meniscus lens L24 having a convex surface facing the image side, and a positive meniscus lens L25 having a convex surface facing the image side.

Various values associated with the wide-angle lens according to Example 5 are listed in Table 5.

TABLE 5

[Specifications]

| | |
|---|---|
| f = | 24.401 |
| FNO = | 3.60 |
| ω = | 42.47° |
| Y = | 21.6 |
| TL = | 62.138 |
| Σd = | 24.260 |
| Bf = | 37.878 |

[Lens Data]

| i | r | d | nd | vd |
|---|---|---|---|---|
| 1) | 16.0478 | 1.0000 | 1.755000 | 52.29 |
| *2) | 6.7924 | 5.0000 | | |
| 3) | 23.7034 | 5.0000 | 1.755200 | 27.51 |
| 4) | −103.0800 | 1.0000 | | |
| 5) | 491.5870 | 3.0000 | 1.603000 | 65.47 |
| 6) | −31.7952 | 0.5000 | | |
| 7> | ∞ | 1.5000 | Aperture Stop S | |
| 8) | −27.9362 | 1.5000 | 1.805180 | 25.43 |
| 9) | 32.4779 | 1.1599 | | |
| 10) | −47.5563 | 2.0000 | 1.593190 | 67.87 |
| 11) | −13.1659 | 0.1000 | | |
| 12) | −33.7926 | 2.5000 | 1.603000 | 65.47 |
| 13) | −12.9041 | 37.8784 | | |

TABLE 5-continued

[Aspherical Surface Data]
Surface Number: 2

κ = 0.9337
A4 = −5.24830E−05
A6 = −4.30110E−06
A8 = 2.22250E−07
A10 = −8.38110E−09
A12 = 0.69851E−10
A14 = 0.00
A16 = 0.00

[Lens Group Data]

| Group | i | focal length |
|---|---|---|
| G1 | 1 | −16.359 |
| G2 | 3 | 18.317 |

[Values for Conditional Expressions]

| | |
|---|---|
| (1): Σd/Ymax = | 1.12 |
| (2): BF/f0 = | 1.55 |
| (3): (−f1)/f0 = | 0.670 |
| (4): f2/f0 = | 0.751 |
| (5): f0/Σd = | 1.01 |
| (6): νd1 = | 52.29 |
| (7): f2R/f0 = | 21.02 |
| (8): |RNR| − |RNF| = | 4.54 |

Figure 10:
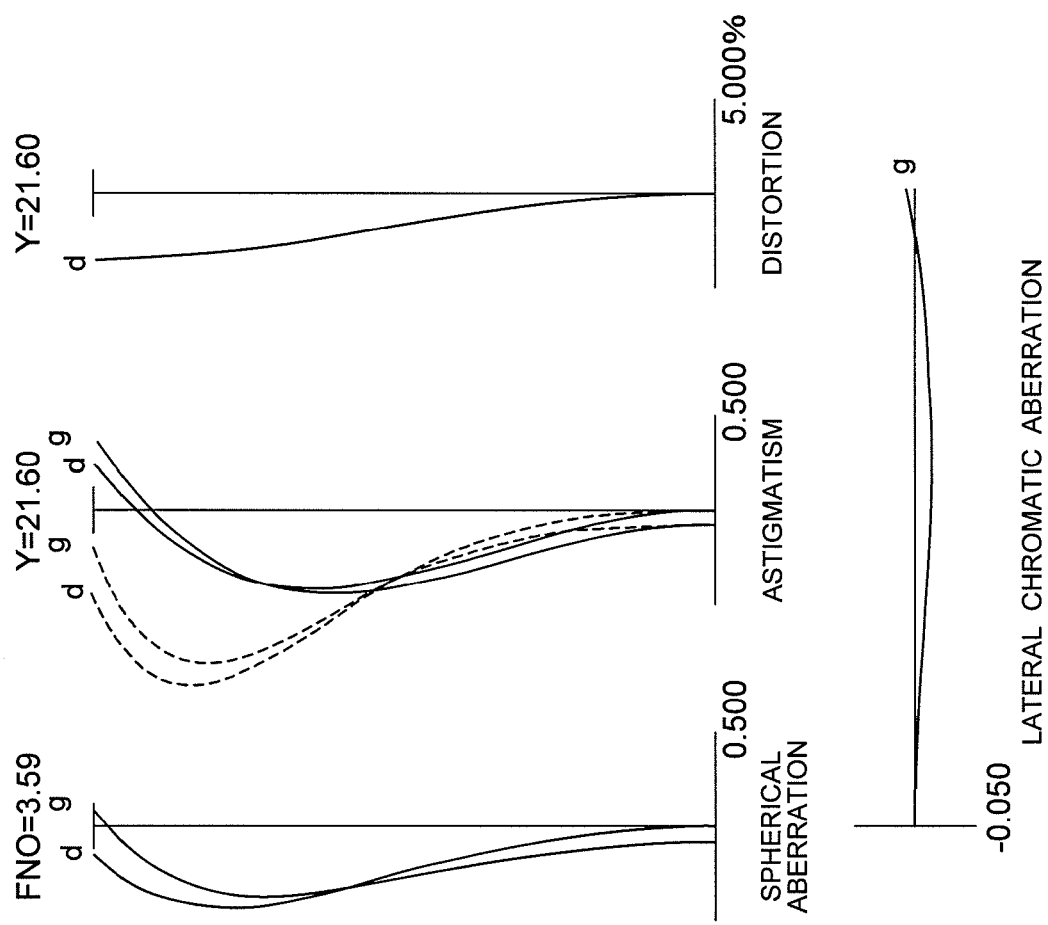
FIG. 10 shows graphs of various aberrations of the wide-angle lens according to Example 5 upon focusing on infinity.

FIG. 10 shows graphs of various aberrations of the wide-angle lens according to Example 5 upon focusing on infinity.

As is apparent from FIG. 10, the wide-angle lens according to Example 5 shows superb optical performance as a result of good corrections to various aberrations.

EXAMPLE 6

Figure 11:
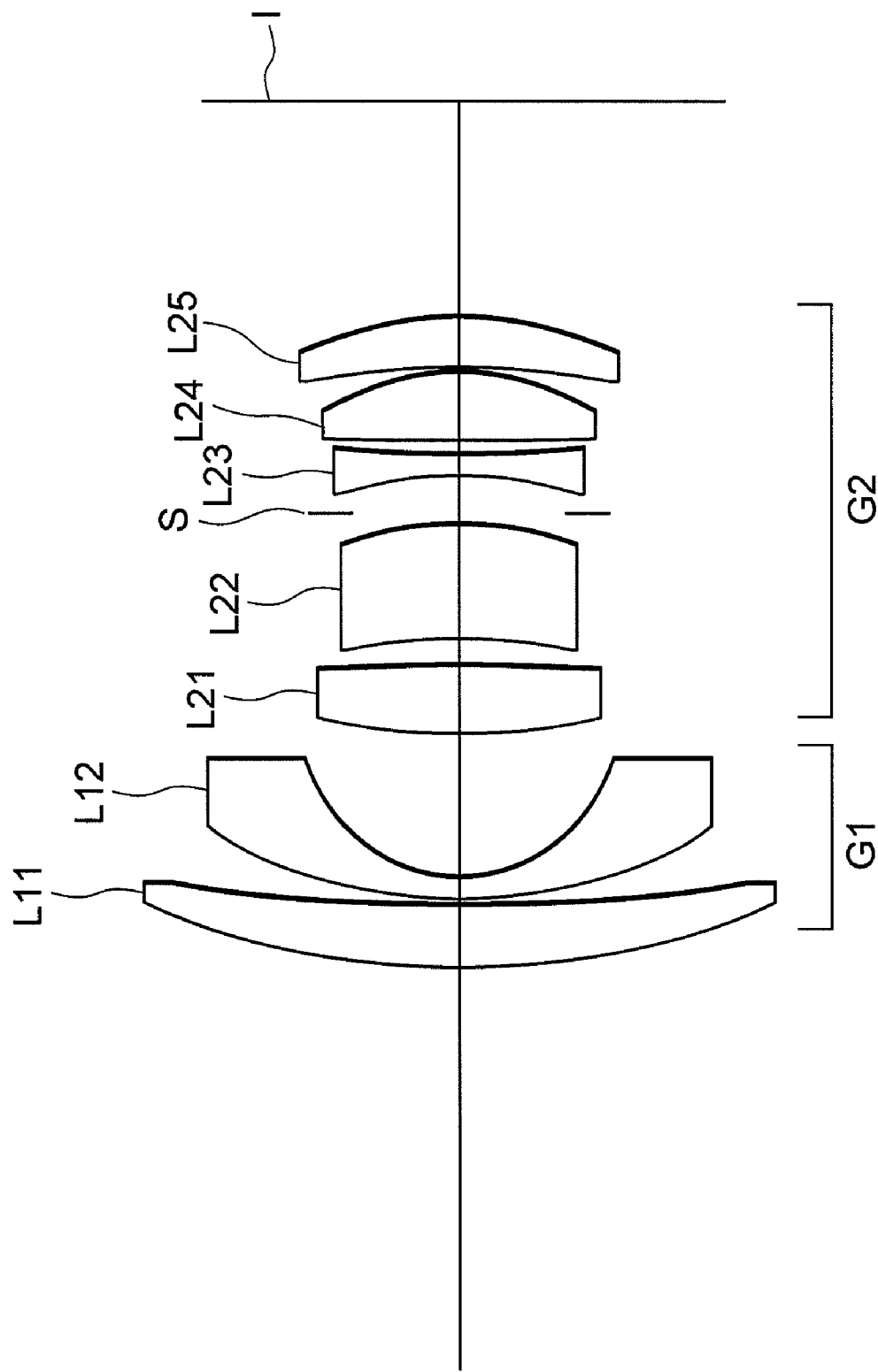
FIG. 11 is a sectional view showing a lens configuration of a wide-angle lens focusing on infinity according to Example 6 of the first embodiment of the present application.

FIG. 11 is a sectional view showing a lens configuration of a wide-angle lens focusing on infinity according to Example 6 of the first embodiment of the present application.

The wide-angle lens according to Example 6 is composed of, in order from an object side, a first lens group G1 having negative refractive power, and a second lens group G2 having positive refractive power.

The first lens group G1 is composed of, in order from the object side, a positive meniscus lens L11 having a convex surface facing the object side, and a negative meniscus lens L12 having a convex surface facing the object side and an aspherical surface facing an image side.

The second lens group G2 is composed of, in order from the object side, a double convex positive lens L21, a positive meniscus lens L22 having a convex surface facing the image side, an aperture stop S for defining an f-number, a double concave negative lens L23, a double convex positive lens L24, and a positive meniscus lens L25 having a convex surface facing the image side.

Various values associated with the wide-angle lens according to Example 6 are listed in Table 6.

TABLE 6

[Specifications]

| | |
|---|---|
| f = | 24.401 |
| FNO = | 3.6 |
| ω = | 42.31° |
| Y = | 21.6 |
| TL = | 65.799 |
| Σd = | 27.800 |
| Bf = | 37.999 |

[Lens Data]

| i | r | d | nd | νd |
|---|---|---|---|---|
| 1) | 33.8751 | 2.8000 | 1.603000 | 65.47 |
| 2) | 74.9380 | 0.1000 | | |
| 3) | 20.0930 | 1.0000 | 1.603000 | 65.47 |
| *4) | 6.5597 | 6.0000 | | |
| 5) | 25.5540 | 3.0000 | 1.717360 | 29.52 |
| 6) | −300.6963 | 1.0000 | | |
| 7) | −34.2497 | 5.0000 | 1.497820 | 82.56 |
| 8) | −17.6995 | 0.5000 | | |
| 9> | ∞ | 1.5000 | Aperture Stop S | |
| 10) | −20.5645 | 1.0000 | 1.903660 | 31.27 |
| 11) | 41.5823 | 0.5000 | | |
| 12) | 109.9269 | 3.0000 | 1.593190 | 67.87 |
| 13) | −11.8678 | 0.1000 | | |
| 14) | −47.8393 | 2.3000 | 1.603000 | 65.47 |
| 15) | −17.1597 | 37.9989 | | |

[Aspherical Surface Data]
Surface Number: 4

κ = 0.8318
A4 = 4.76210E−05
A6 = −3.01810E−06
A8 = 9.91860E−08
A10 = −1.21060E−09
A12 = 0.00
A14 = 0.00
A16 = 0.00

[Lens Group Data]

| Group | i | focal length |
|---|---|---|
| G1 | 1 | −20.971 |
| G2 | 5 | 19.797 |

[Values for Conditional Expressions]

| | |
|---|---|
| (1): Σd/Ymax = | 1.29 |
| (2): BF/f0 = | 1.56 |
| (3): (−f1)/f0 = | 0.859 |
| (4): f2/f0 = | 0.811 |
| (5): f0/Σd = | 0.878 |
| (6): νd1 = | 65.47 |
| (7): f2R/f0 = | 7.40 |
| (8): |RNR| − |RNF| = | 21.02 |

Figure 12:
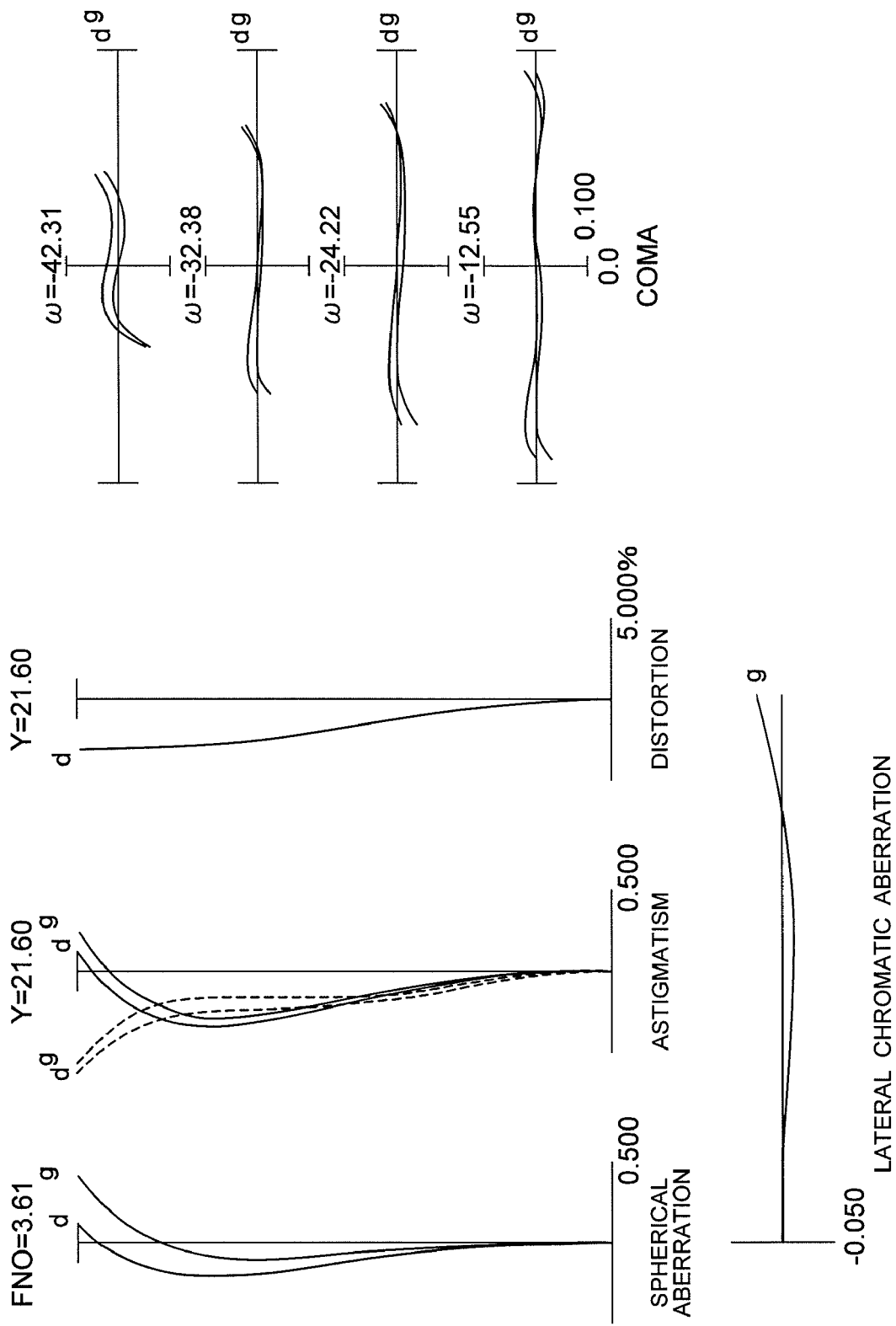
FIG. 12 shows graphs of various aberrations of the wide-angle lens according to Example 6 upon focusing on infinity.

FIG. 12 shows graphs of various aberrations of the wide-angle lens according to Example 6 upon focusing on infinity.

As is apparent from FIG. 12, the wide-angle lens according to Example 6 shows superb optical performance as a result of good corrections to various aberrations.

EXAMPLE 7

Figure 13:
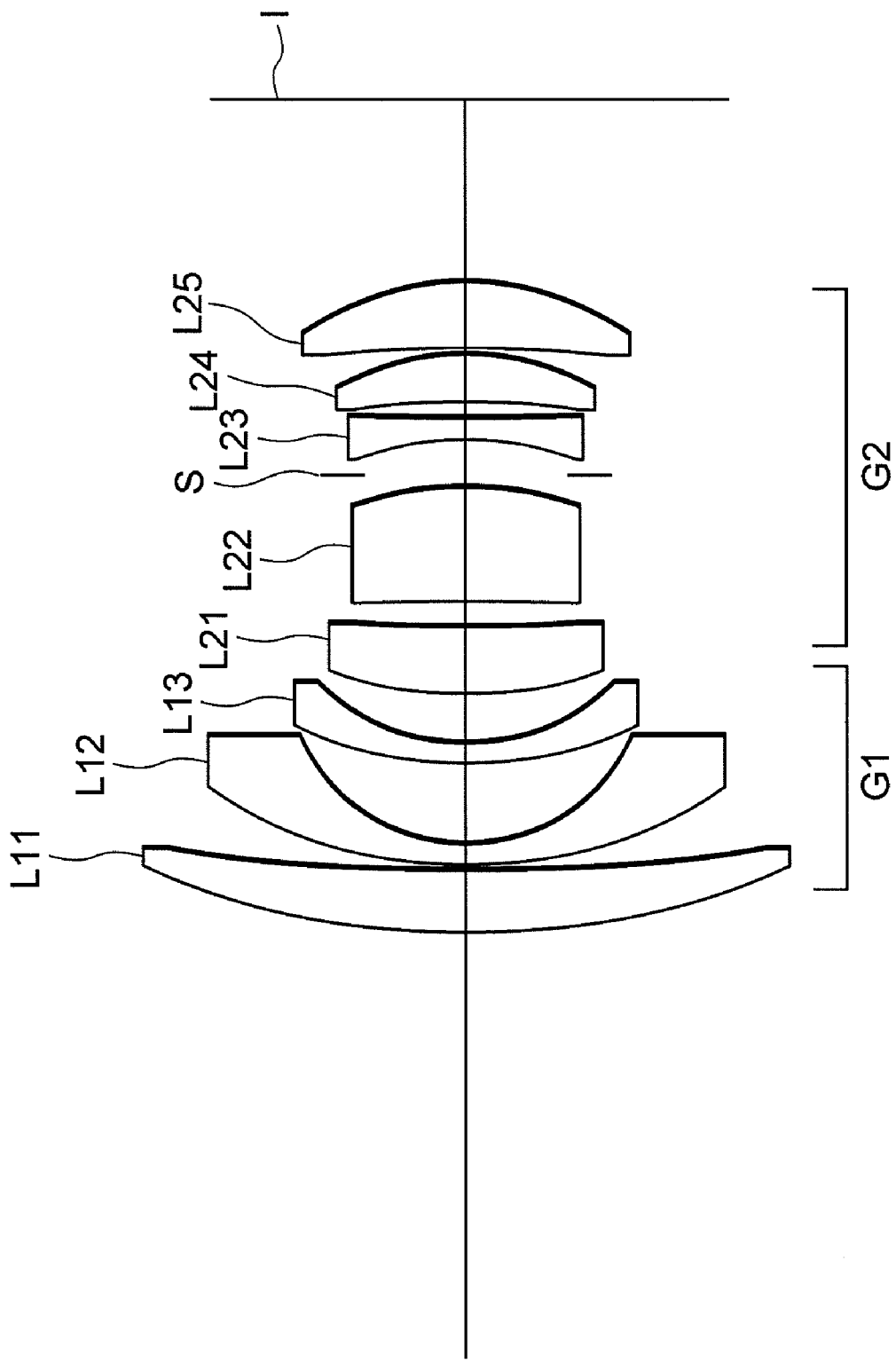
FIG. 13 is a sectional view showing a lens configuration of a wide-angle lens focusing on infinity according to Example 7 of the first embodiment of the present application.

FIG. 13 is a sectional view showing a lens configuration of a wide-angle lens focusing on infinity according to Example 7 of the first embodiment of the present application.

The wide-angle lens according to Example 7 is composed of, in order from an object side, a first lens group G1 having negative refractive power, and a second lens group G2 having positive refractive power.

The first lens group G1 is composed of, in order from the object side, a positive meniscus lens L11 having a convex surface facing the object side and an aspherical surface facing an image side, a negative meniscus lens L12 having a convex surface facing the object side, and a negative meniscus lens L13 having a convex surface facing the object side.

The second lens group G2 is composed of, in order from the object side, a positive meniscus lens L21 having a convex surface facing the object side, a positive meniscus lens L22 having a convex surface facing the image side, an aperture stop S for defining an f-number, a double concave negative lens L23, a positive meniscus lens L24 having a convex surface facing the image side, and a positive meniscus lens L25 having a convex surface facing the image side.

Various values associated with the wide-angle lens according to Example 7 are listed in Table 7.

TABLE 7

[Specifications]

| | |
|---|---|
| f = | 24.401 |
| FNO = | 3.64 |
| ω = | 42.32° |
| Y = | 21.6 |
| TL = | 66.097 |
| Σd = | 28.100 |
| Bf = | 37.997 |

[Lens Data]

| i | r | d | nd | νd |
|---|---|---|---|---|
| 1) | 33.8751 | 2.8000 | 1.603000 | 65.47 |
| *2) | 74.9380 | 0.1000 | | |
| 3) | 20.0930 | 1.0000 | 1.603000 | 65.47 |
| 4) | 7.9328 | 3.3000 | | |
| 5) | 16.9134 | 1.0000 | 1.497820 | 82.56 |
| 6) | 9.2383 | 2.0000 | | |
| 7) | 17.1817 | 3.0000 | 1.717360 | 29.52 |
| 8) | 53.0942 | 1.0000 | | |
| 9) | −920.7724 | 5.0000 | 1.497820 | 82.56 |
| 10) | −17.9112 | 0.5000 | | |
| 11> | ∞ | 1.5000 | Aperture Stop S | |
| 12) | −15.1601 | 1.0000 | 1.903660 | 31.27 |
| 13) | 102.1453 | 0.6000 | | |
| 14) | −42.6459 | 2.2000 | 1.593190 | 67.87 |
| 15) | −11.8420 | 0.1000 | | |
| 16) | −95.0161 | 3.0000 | 1.603000 | 65.47 |
| 17) | −12.9317 | 37.9970 | | |

[Aspherical Surface Data]
Surface Number: 2

κ = 1.00
A4 = −8.43520E−06
A6 = 3.92740E−08
A8 = −1.78160E−10
A10 = 4.80600E−13
A12 = 0.00
A14 = 0.00
A16 = 0.00

[Lens Group Data]

| Group | i | focal length |
|---|---|---|
| G1 | 1 | −17.111 |
| G2 | 7 | 18.270 |

[Values for Conditional Expressions]

| | |
|---|---|
| (1): Σd/Ymax = | 1.30 |
| (2): BF/f0 = | 1.56 |
| (3): (−f1)/f0 = | 0.701 |
| (4): f2/f0 = | 0.749 |
| (5): f0/Σd = | 0.868 |
| (6): νd1 = | 74.02 |
| (7): f2R/f0 = | 1.54 |
| (8): |RNR| − |RNF| = | 86.99 |

Figure 14:
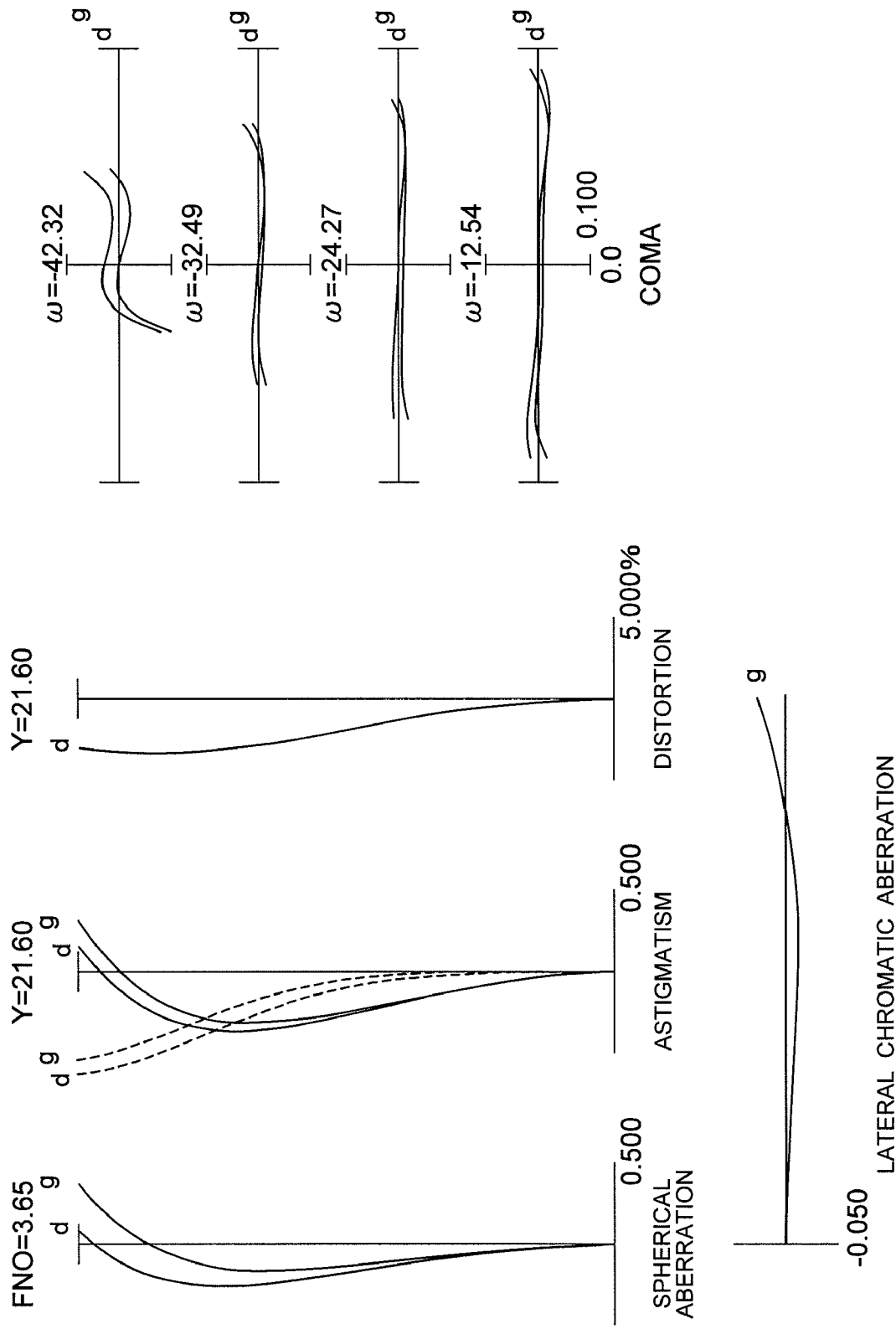
FIG. 14 shows graphs of various aberrations of the wide-angle lens according to Example 7 upon focusing on infinity.

FIG. 14 shows graphs of various aberrations of the wide-angle lens according to Example 7 upon focusing on infinity.

As is apparent from FIG. 14, the wide-angle lens according to Example 7 shows superb optical performance as a result of good corrections to various aberrations.

Each Example of the first embodiment makes it possible to provide a wide-angle lens having an angle of view 2ω of 84 degrees or more, an f-number of about 2.8 to 3.6, and high optical performance with excellently correcting spherical aberration, curvature of field, astigmatism and coma, and being compact and thin.

Second Embodiment

Then, a wide-angle lens according to a second embodiment of the present application is explained below. The following embodiment only shows for better understandings of the present invention. Accordingly, any operable additions or conversions capable of being carried out by a person having ordinary skill in the art are not intended to be excluded within a scope of the present invention.

A wide-angle lens according to the second embodiment includes, in order from an object side, a first lens group having negative refractive power, and a second lens group having positive refractive power. The first lens group includes, in order from the object side, a positive lens component having a convex surface facing the object side, and a rear lens group having negative refractive power. The rear lens group of the first lens group includes at least two negative meniscus lens component having a convex surface facing the object side. The second lens group includes, in order from the object side, a first positive lens component, a positive meniscus lens component having a convex surface facing the object side, and a rear lens group having positive refractive power. The rear lens group of the second lens group includes, in order from the object side, a cemented positive lens constructed by a negative lens cemented with a positive lens, and a second positive lens component, and the following conditional expressions (1) and (2) are satisfied:

$$0.90 < \Sigma d/Y\max < 2.00 \quad (1)$$

$$1.30 < BF/f0 < 2.50 \quad (2)$$

where Σd denotes a distance along an optical axis between the most object side lens surface and the most image side lens surface of the wide-angle lens (hereinafter shown as a total lens thickness), Ymax denotes an image height with respect to the maximum angle of view (hereinafter called as the maximum image height), BF denotes a distance between the vertex of the most image side lens surface and the paraxial image plane (a so-called back focal length), and f0 denotes a focal length of the wide-angle lens upon focusing on infinity.

With including a positive lens component having a convex surface facing the object side in the first lens group, a wide-angle lens according to the second embodiment makes it possible to excellently correct off-axis aberrations such as distortion in particular. Moreover, the rear lens group that has at least two negative meniscus lens components having a convex surface facing the object side are included behind the positive lens component in the first lens group, so that distortion and lateral chromatic aberration can be kept in an excellent state, and off-axis aberrations such as curvature of field and astigmatism in particular can be excellently corrected. Incidentally, a lens component means a single lens or a cemented lens.

With disposing, in order from the object side, two positive lens components in the second lens group, it becomes possible to excellently correct lower coma and spherical aberration. In particular, with including a positive meniscus lens component having a convex surface facing the object side in the second lens group, it becomes possible to excellently correct spherical aberration and longitudinal chromatic aberration.

When a negative lens is independently disposed in the air space, astigmatism is generated at a diverging surface. However, in a wide-angle lens according to the second embodiment, a negative lens is not independently disposed in the air space, but is disposed as a cemented positive lens constructed by a negative lens and a positive lens in the rear lens group in the second lens group, so that the rear lens group includes two positive lens components. Accordingly, off-axis aberrations such as astigmatism, curvature of field and upper coma, in particular, can be excellently corrected. Moreover, the cemented positive lens makes it possible to accomplish excellent spherical aberration state with optimizing Petzval sum even if the lens construction becomes thinner.

With the lens configuration described above, a wide-angle lens according to the second embodiment makes it possible to accomplish to be extremely thin and to have a wide angle of view with keeping speed of the lens. Accordingly, a so-called thin, wide-angle lens can be accomplished. As the total lens thickness of the wide-angle lens becomes thinner, off-axis aberration correction and on-axis aberration correction are carried out by the same lens surface at the same time. Moreover, the number of lenses composing the wide-angle lens is limited so as to make the thickness of the lens thinner, so that complicated lens configuration cannot be applied. Accordingly, off-axis aberration correction particularly becomes difficult, so that a large amount of coma tends to be remained in the optical system. A wide-angle lens according to the second embodiment is characterized by accomplishing excellent aberration correction with optimum power distribution and lens configuration of each lens group.

Conditional expression (1) defines an appropriate range of the ratio of the total lens thickness to the maximum image height of the wide-angle lens according to the second embodiment. However, conditional expression (1) has already been explained above, so that duplicated explanations are omitted except different portions.

With setting the lower limit of conditional expression (1) to 0.95, various aberrations can be excellently corrected. With setting the lower limit of conditional expression (1) to 1.00, various aberrations can be much excellently corrected. With setting the lower limit of conditional expression (1) to 1.30, various aberrations can be further excellently corrected. With setting the lower limit of conditional expression (1) to 1.42, various aberrations can be further excellently corrected. With setting the lower limit of conditional expression (1) to 1.49, various aberrations can be further excellently corrected, and the effect of the present invention can fully secured.

Conditional expression (2) defines the back focal length of the wide-angle lens with respect to the focal length of the wide-angle lens. However, conditional expression (2) has already been explained above, so that duplicated explanations are omitted.

In a wide-angle lens according to the second embodiment, the following conditional expression (9) is preferably satisfied:

$$0.20 < (-f1B)/f0 < 1.50 \tag{9}$$

where f1B denotes a focal length of the rear lens group of the first lens group, and f0 denotes a focal length of the wide-angle lens upon focusing on infinity.

Conditional expression (9) defines the focal length of the rear lens group of the first lens group by the focal length of the wide-angle lens. The magnitude of refractive power of the rear lens group of the first lens group affects whether off-axis aberrations can be excellently corrected or not, and the dimension of the wide-angle lens. With satisfying conditional expression (9), it becomes possible to accomplish a wide-angle lens having high optical performance.

When the ratio $(-f1B)/f0$ is equal to or exceeds the upper limit of conditional expression (9), an absolute value of the focal length of the rear lens group in the first lens group becomes large, in other words, negative refractive power becomes weak. When negative refractive power becomes weak, diameter of the first lens group becomes large so that the diameter of the wide-angle lens becomes large, or back focal length becomes small, so that conditional expressions (1) and (2) cannot be satisfied. As for correction of aberrations, the refractive power balance between the first lens group having negative refractive power and the second lens group having positive refractive power is shifted, so that it becomes impossible to correct distortion excellently.

With setting the upper limit of conditional expression (9) to 1.40, the effect of the present invention can be secured. With setting the upper limit of conditional expression (9) to 1.10, the effect of the present invention can be more secured. With setting the upper limit of conditional expression (9) to 1.00, the effect of the present invention can be fully secured.

On the other hand, when the ratio $(-f1B)/f0$ is equal to or falls below the lower limit of conditional expression (9), the absolute value of the focal length of the rear lens group in the first lens group becomes small, in other words, refractive power of the rear lens group having negative refractive power in the first lens group becomes excessively strong. In this case, the back focal length becomes too long to make the wide-angle lens compact, so that conditional expressions (1) and (2) cannot be satisfied. As for correction of aberrations, excessive negative refractive power increases off-axis aberrations, so that curvature of field, astigmatism and coma in particular become worse.

With setting the lower limit of conditional expression (9) to 0.30, various aberrations can be excellently corrected. With setting the lower limit of conditional expression (9) to 0.40, various aberrations can be more excellently corrected. With setting the lower limit of conditional expression (9) to 0.50, various aberrations can be more excellently corrected, and the effect of the present invention can be fully secured.

In a wide-angle lens according to the second embodiment, the following conditional expression (10) is preferably satisfied:

$$0.50 < f2B/f0 < 2.00 \tag{10}$$

where f2B denotes a focal length of the rear lens group in the second lens group, and f0 denotes a focal length of the wide-angle lens upon focusing on infinity.

Conditional expression (10) defines an appropriate range of the focal length of the rear lens group in the second lens group. With optimizing refractive power of the rear lens group in the second lens group, spherical aberration and coma can be excellently corrected.

When the ratio f2B/f0 is equal to or exceeds the upper limit of conditional expression (10), the focal length of the rear lens group in the second lens group becomes long, in other words, refractive power becomes weak, so that spherical aberration becomes overcorrected. In this case, coma becomes worse. Moreover, in this case, the second lens group becomes large, and the wide-angle lens becomes large.

With setting the upper limit of conditional expression (10) to 1.80, various aberrations can be excellently corrected. With setting the upper limit of conditional expression (10) to 1.70, various aberrations can be further excellently corrected. With setting the upper limit of conditional expression (10) to 1.50, various aberrations can be further excellently corrected, and the effect of the present invention can be fully secured.

On the other hand, when the ratio f2B/f0 is equal to or falls below the lower limit of conditional expression (10), the focal length of the rear lens group in the second lens group becomes short, in other words, positive refractive power becomes strong, so that spherical aberration becomes undercorrected. In this case, back focal length becomes short consequently.

With setting the lower limit of conditional expression (10) to 0.60, various aberrations can be excellently corrected. With setting the lower limit of conditional expression (10) to 0.70, various aberrations can be much excellently corrected. With setting the lower limit of conditional expression (10) to 0.80, various aberrations can be further excellently corrected, and the effect of the present invention can be fully secured.

In a wide-angle lens according to the second embodiment of the present application, the rear lens group in the second lens group includes at least one aspherical surface, and the aspherical surface preferably has a shape that positive refractive power becomes weak or negative refractive power becomes strong from the optical axis to the periphery. Such an aspherical surface is suitable for a thin, wide-angle lens according to the second embodiment having a wide angle of view and a high speed of the lens. With this lens configuration, coma, curvature of field and distortion can be excellently corrected. It is particularly preferable that the aspherical surface is applied to the most image side lens surface of the rear lens group in the second lens group. With this lens configuration, coma, curvature of field and distortion can be excellently corrected.

In a wide-angle lens according to the second embodiment, the following conditional expression (11) is preferably satisfied:

$$0 < R2R - R2F (\text{unit: mm}) \quad (11)$$

where R2F denotes a radius of curvature of the object side lens surface of the positive meniscus lens component in the second lens group, and R2R denotes a radius of curvature of the image side lens surface of the positive meniscus lens component in the second lens group.

Conditional expression (11) is for a shape of the positive meniscus lens component in the second lens group. With satisfying conditional expression (11), spherical aberration can be excellently corrected.

It is preferable that the first positive lens component in the second lens group is a positive lens component including a cemented lens constructed by a negative lens and a positive lens, or a cemented lens constructed by a positive lens and a negative lens. With this lens configuration, it becomes possible to accomplish excellent state of lateral chromatic aberration and to optimize Petzval sum.

In a wide-angle lens according to the second embodiment, an aperture stop is preferably disposed to the object side of the most image side lens in the second lens group. The aperture stop defines an f-number of the wide-angle lens. In a wide-angle lens according to the second embodiment, with disposing the aperture stop to the object side of the most image side lens in the second lens group, it becomes possible to excellently correct curvature of field, distortion and lateral chromatic aberration.

In a wide-angle lens according to the second embodiment, the following conditional expression (12) is preferably satisfied:

$$65.0 < \nu d \quad (12)$$

where νd denotes an Abbe number of at least one negative lens included in the rear lens group in the first lens group.

Conditional expression (12) shows that the rear lens group in the first lens group includes at least one negative lens using low dispersion glass. Among low dispersion glass, a glass having anomalous dispersion is preferably used for the negative lens. With this lens configuration, secondary spectrum of lateral chromatic aberration can be excellently corrected. With disposing at least one negative lens into the rear lens group in the first lens group, high optical performance can be accomplished.

Figure 26:
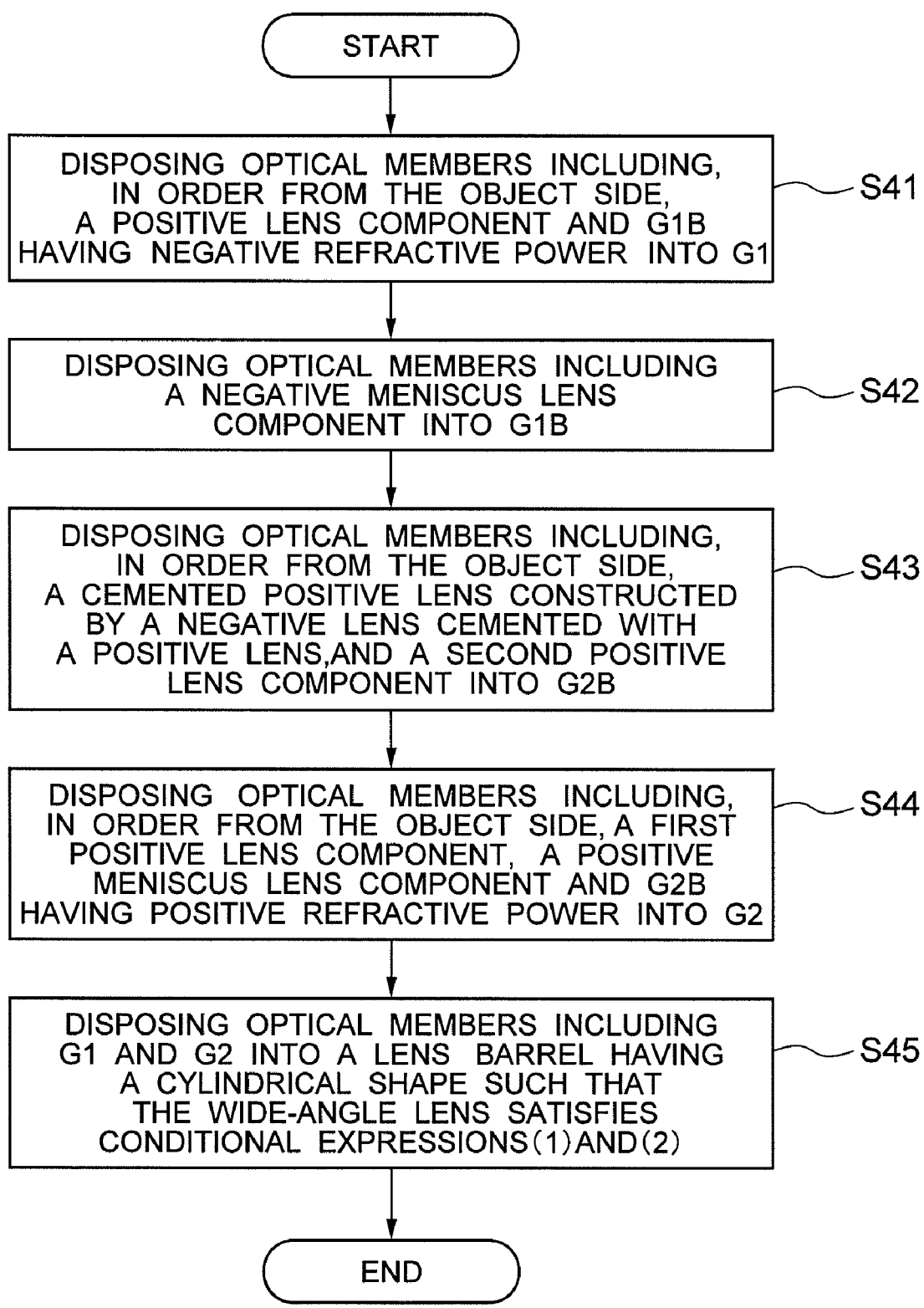
FIG. 26 is a flowchart showing a method for manufacturing the wide-angle lens according to the second embodiment of the present application.

Then, a method for manufacturing a wide-angle lens according to the second embodiment is explained with reference to FIG. 26. FIG. 26 is a flowchart showing a method for manufacturing the wide-angle lens according to the second embodiment of the present application.

The method for manufacturing the wide-angle lens according to the second embodiment is a method for manufacturing a wide-angle lens that includes, in order from an object side, a first lens group having negative refractive power, and a second lens group having positive refractive power, and the method includes the following steps from step S41 through step S45 as shown in FIG. 26.

Step S41:
In step S41, optical members including, in order from the object side, a positive lens component and a rear lens group having negative refractive power are disposed into the first lens group.

Step S42:
In step S42, optical members including a negative meniscus lens component are disposed into the rear lens group in the first lens group.

Step S43:
In step S43, optical members including, in order from the object side, a cemented positive lens constructed by a negative lens cemented with a positive lens, and a second positive lens component are disposed into the rear lens group having positive refractive power in the second lens group.

Step S44:
In step S44, optical members including, in order from the object side, a first positive lens component, a positive meniscus lens component, and the rear lens group having positive refractive power in the second lens group are disposed into the second lens group.

Step S45:
In step S45, optical members including the first lens group and the second lens group are disposed into a lens barrel having a cylindrical shape such that the wide-angle lens satisfies the following conditional expressions (1) and (2):

$$0.90 < \Sigma d / Y\max < 2.00 \quad (1)$$

$$1.30 < BF/f0 < 2.50 \quad (2)$$

where Σd denotes a distance along an optical axis between the most object side lens surface and the most image side lens surface of the wide-angle lens, Ymax denotes an image height with respect to the maximum angle of view, BF denotes a distance between the vertex of the most image side lens surface and the paraxial image plane, and f0 denotes a focal length of the wide-angle lens upon focusing on infinity.

With this method for manufacturing a wide-angle lens according to the second embodiment, it becomes possible to manufacture a wide-angle lens having a wide angle of view and excellent optical performance.

Then, each numerical Example of a wide-angle lens according to the second embodiment of the present application is explained below with reference to accompanying drawings.

EXAMPLE 8

Figure 15:
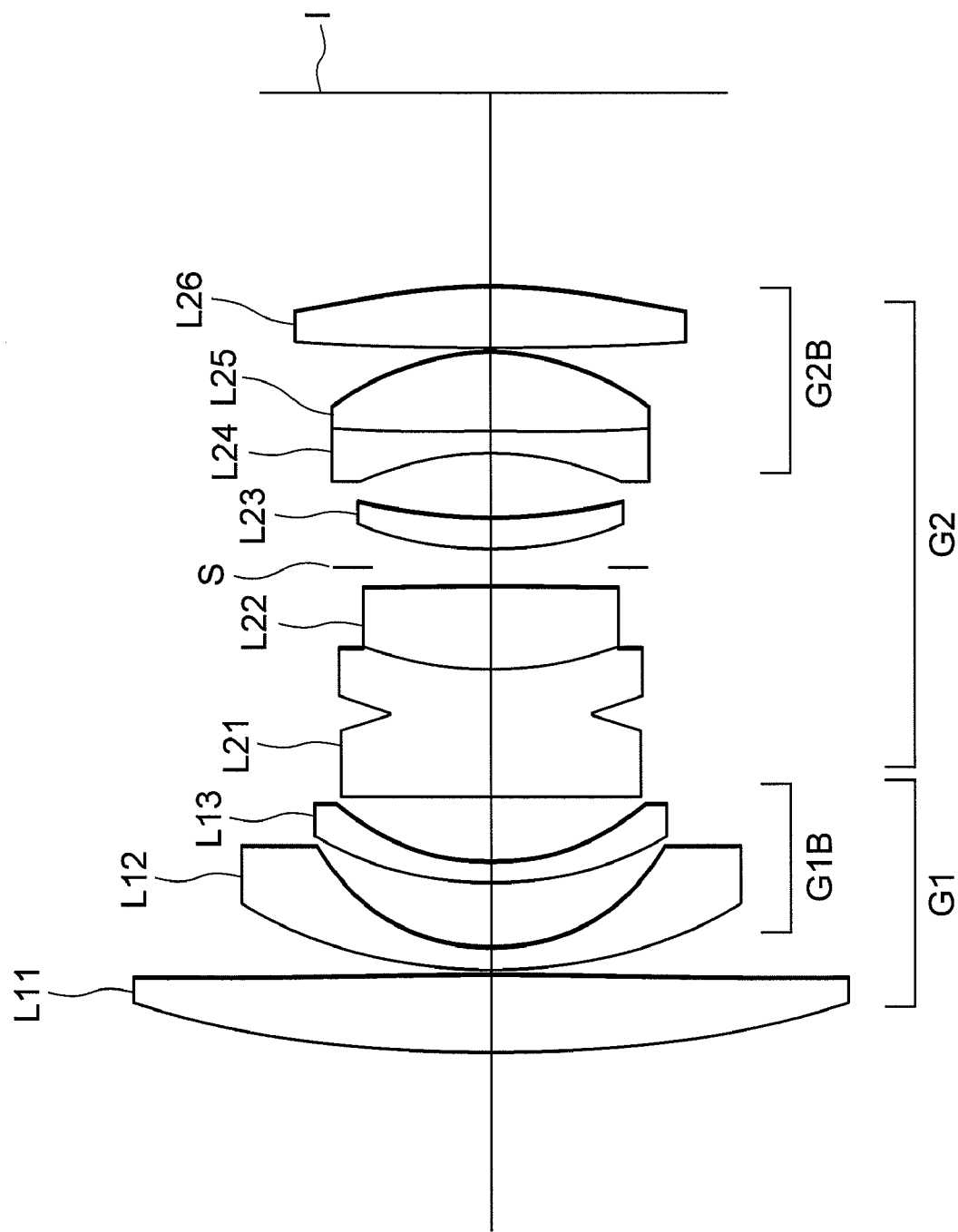
FIG. 15 is a sectional view showing a lens configuration of a wide-angle lens focusing on infinity according to Example 8 of a second embodiment of the present application.

FIG. 15 is a sectional view showing a lens configuration of a wide-angle lens focusing on infinity according to Example 8 of a second embodiment of the present application.

The wide-angle lens according to Example 8 is composed of, in order from an object side, a first lens group G1 having negative refractive power, and a second lens group G2 having positive refractive power.

The first lens group G1 is composed of, in order from the object side, a positive meniscus lens L11 having a convex surface facing the object side, and a rear lens group G1B having negative refractive power.

The rear lens group G1B is composed of, in order from the object side, a negative meniscus lens L12 having a convex surface facing the object side and an aspherical surface facing an image side, and a negative meniscus lens L13 having a convex surface facing the object side.

The second lens group G2 is composed of, in order from the object side, a cemented positive lens constructed by a negative meniscus lens L21 having a convex surface facing the object side cemented with a positive meniscus lens L22 having a convex surface facing the object side, an aperture stop S for defining an f-number, a positive meniscus lens L23 having a convex surface facing the object side, and a rear lens group G2B having positive refractive power.

The rear lens group G2B is composed of, in order from the object side, a cemented positive lens constructed by a double concave negative lens L24 cemented with a double convex positive lens L25, and a double convex positive lens L26 having an aspherical surface facing the image side.

Incidentally, a groove having an effective diameter of 10.4 mm is formed on a position with a vertex distance of 4 mm away from the object side lens surface of the negative meniscus lens L21 in the second lens group G2 in order to define lower side light ray.

Various values associated with the wide-angle lens according to Example 8 are listed in Table 8.

TABLE 8

[Specifications]

| | |
|---|---|
| f = | 24.698 |
| FNO = | 2.9 |
| ω = | 41.86° |
| Y = | 21.6 |
| TL = | 74.298 |
| Σd = | 36.297 |
| Bf = | 38.000 |

[Lens Data]

| i | r | d | nd | vd |
|---|---|---|---|---|
| 1) | 60.2367 | 3.7000 | 1.487490 | 70.45 |
| 2) | 1253.2521 | 0.1000 | | |
| 3) | 23.0000 | 1.2000 | 1.497820 | 82.56 |
| *4) | 9.7255 | 3.0000 | | |
| 5) | 17.0653 | 1.0000 | 1.497820 | 82.56 |
| 6) | 11.2587 | 3.0000 | | |
| 7) | 209.7383 | 6.0000 | 1.581440 | 40.75 |
| 8) | 15.3142 | 4.0000 | 1.672700 | 32.11 |
| 9) | 999.0000 | 1.0000 | | |
| 10> | ∞ | 0.7000 | Aperture Stop S | |
| 11) | 16.8962 | 1.6000 | 1.497820 | 82.56 |
| 12) | 26.5870 | 2.9977 | | |
| 13) | −17.0825 | 1.0000 | 1.717360 | 29.52 |
| 14) | 115.0466 | 3.9000 | 1.603000 | 65.47 |
| 15) | −12.9513 | 0.1000 | | |
| 16) | 102.8313 | 3.0000 | 1.603000 | 65.47 |
| *17) | −33.5404 | 37.9998 | | |

TABLE 8-continued

[Aspherical Surface Data]

Surface Number: 4

κ = 0.5233
A4 = 7.38600E−05
A6 = 1.87510E−07
A8 = 1.29680E−08
A10 = 5.53830E−11
A12 = −0.98108E−12
A14 = −0.17874E−13
A16 = 0.44513E−15

Surface Number: 17

κ = 6.3253
A4 = 4.20950E−05
A6 = 7.78040E−08
A8 = 1.36830E−09
A10 = 7.36610E−13
A12 = 0.00
A14 = 0.00
A16 = 0.00

[Lens Group Data]

| Group | i | focal length |
|---|---|---|
| G1 | 1 | −28.546 |
| G2 | 7 | 22.093 |

[Values for Conditional Expressions]

| | |
|---|---|
| (1): Σd/Ymax = | 1.68 |
| (2): BF/f0 = | 1.54 |
| (9): (−f1B)/f0 = | 0.907 |
| (10): f2B/f0 = | 1.13 |
| (11): R2R − R2F = | 9.69 |
| (12): vd = | 82.56 |

Figure 16:
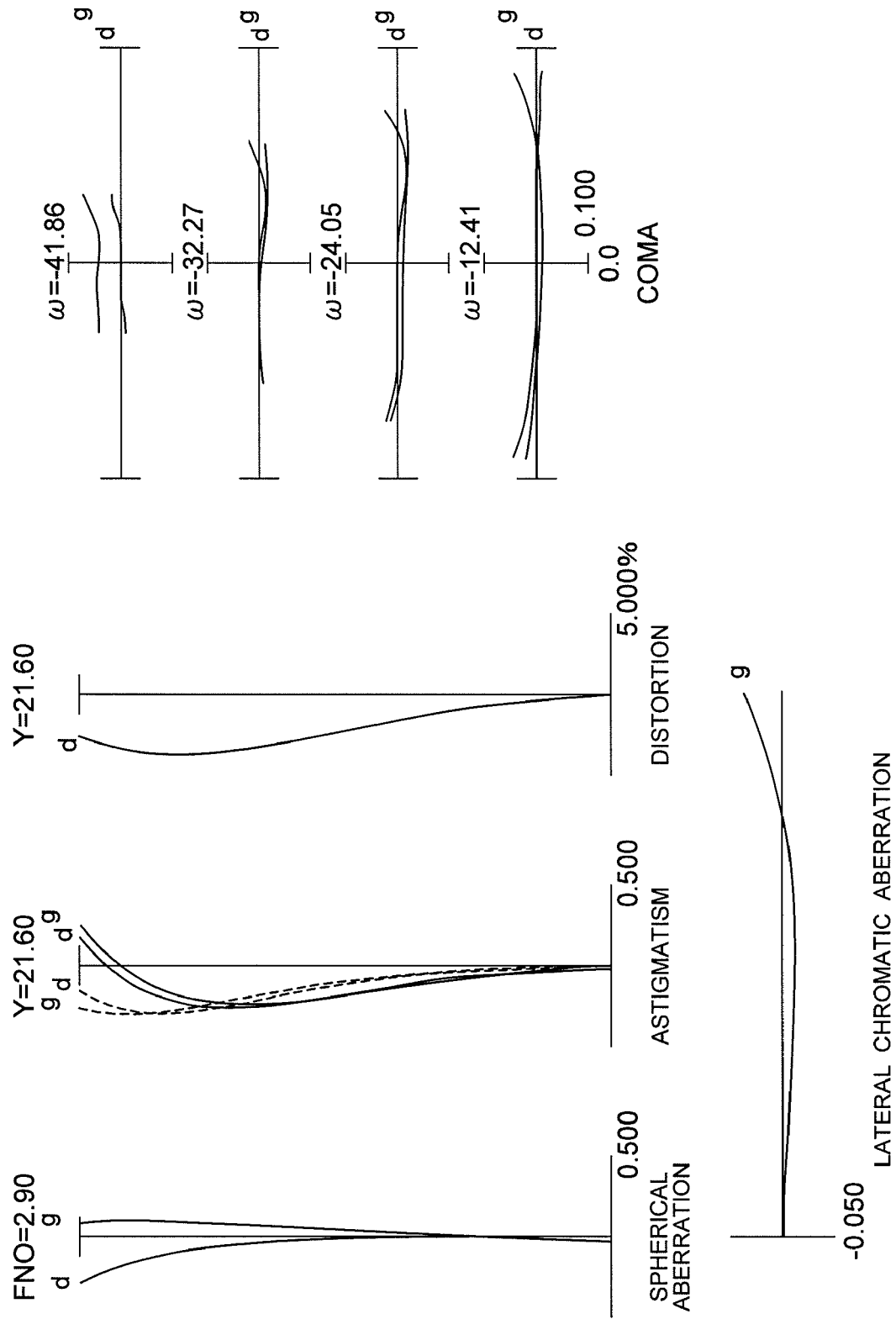
FIG. 16 shows graphs of various aberrations of the wide-angle lens according to Example 8 upon focusing on infinity.

FIG. 16 shows graphs of various aberrations of the wide-angle lens according to Example 8 upon focusing on infinity.

As is apparent from FIG. 16, the wide-angle lens according to Example 8 shows superb optical performance as a result of good corrections to various aberrations.

EXAMPLE 9

Figure 17:
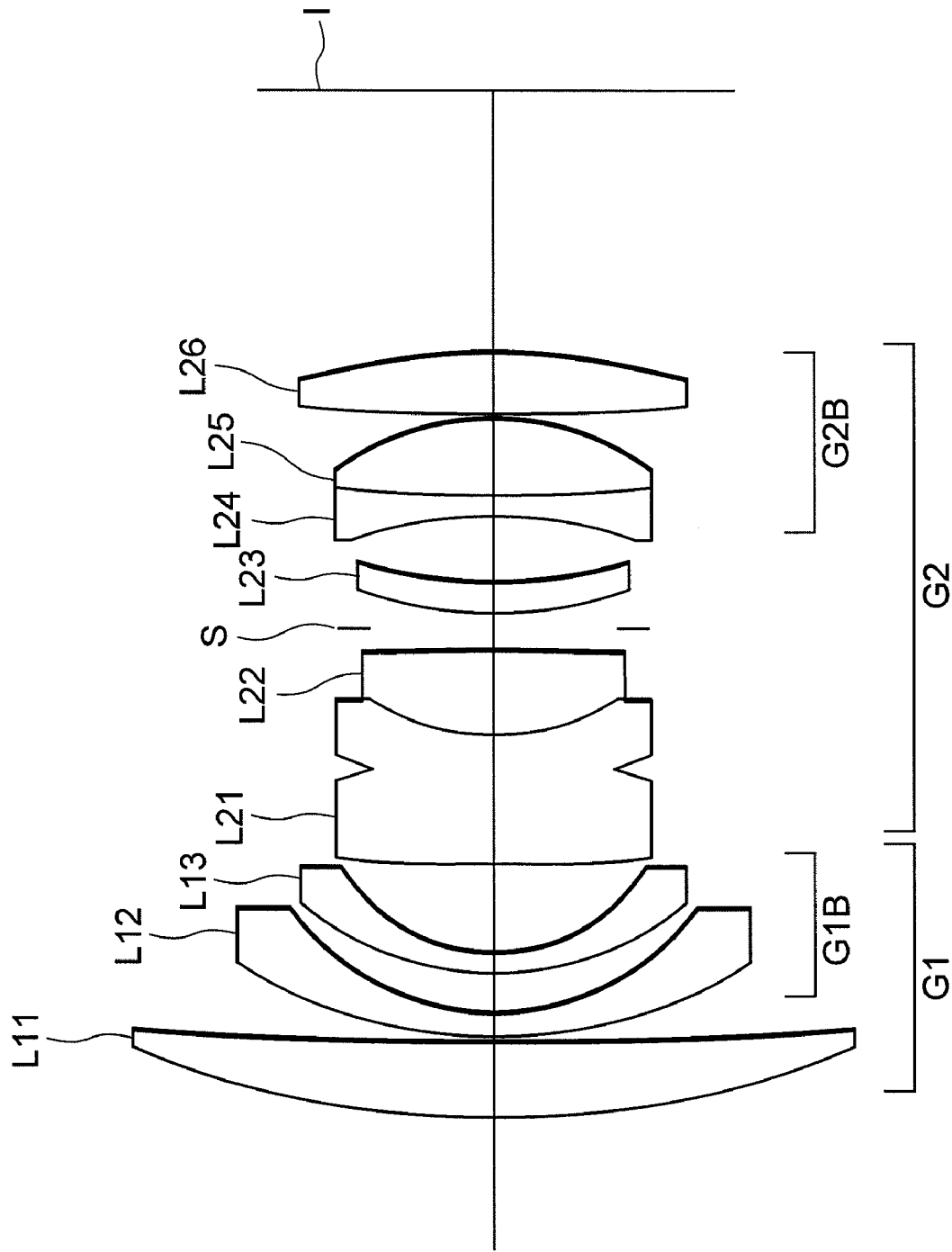
FIG. 17 is a sectional view showing a lens configuration of a wide-angle lens focusing on infinity according to Example 9 of the second embodiment of the present application.

FIG. 17 is a sectional view showing a lens configuration of a wide-angle lens focusing on infinity according to Example 9 of the second embodiment of the present application.

The wide-angle lens according to Example 9 is composed of, in order from an object side, a first lens group G1 having negative refractive power, and a second lens group G2 having positive refractive power.

The first lens group G1 is composed of, in order from the object side, a positive meniscus lens L11 having a convex surface facing the object side, and a rear lens group G1B having negative refractive power. The rear lens group G1B is composed of, in order from the object side, a negative meniscus lens L12 having a convex surface facing the object side, and a negative meniscus lens L13 having a convex surface facing the object side.

The second lens group G2 is composed of, in order from the object side, a cemented positive lens constructed by a negative meniscus lens L21 having a convex surface facing the object side cemented with a positive meniscus lens L22 having a convex surface facing the object side, an aperture stop S for defining an f-number, a positive meniscus lens L23 having a convex surface facing the object side, and a rear lens group G2B having positive refractive power. The rear lens group G2B is composed of, in order from the object side, a cemented positive lens constructed by a double concave negative lens L24 cemented with a double convex positive lens L25, and a double convex positive lens L26 having an aspherical surface facing the image side.

Incidentally, a groove having an effective diameter of 10.62 mm is formed on a position with a vertex distance of 5 mm away from the object side lens surface of the negative meniscus lens L21 in the second lens group G2 in order to define lower side light ray.

Various values associated with the wide-angle lens according to Example 9 are listed in Table 9.

TABLE 9

[Specifications]

| | |
|---|---|
| f = | 24.70 |
| FNO = | 2.88 |
| ω = | 41.75° |
| Y = | 21.6 |
| TL = | 73.698 |
| Σd = | 35.698 |
| Bf = | 37.998 |

[Lens Data]

| i | r | d | nd | νd |
|---|---|---|---|---|
| 1) | 45.0041 | 3.6000 | 1.603000 | 65.47 |
| 2) | 182.0811 | 0.1000 | | |
| 3) | 23.0000 | 1.2000 | 1.755000 | 52.29 |
| 4) | 12.0000 | 1.8000 | | |
| 5) | 14.4678 | 1.0000 | 1.497820 | 82.56 |
| 6) | 8.5548 | 4.0000 | | |
| 7) | 75.6692 | 6.0000 | 1.581440 | 40.75 |
| 8) | 11.1099 | 4.0000 | 1.672700 | 32.11 |
| 9) | 999.0000 | 1.0000 | | |
| 10> | ∞ | 0.7000 | Aperture Stop S | |
| 11) | 19.2664 | 1.5000 | 1.487490 | 70.45 |
| 12) | 21.1548 | 2.9977 | | |
| 13) | −22.5900 | 1.0000 | 1.755200 | 27.51 |
| 14) | 61.9542 | 3.7000 | 1.593190 | 67.87 |
| 15) | −13.0368 | 0.1000 | | |
| 16) | 108.4396 | 3.0000 | 1.603000 | 65.47 |
| *17) | −32.4109 | 37.9999 | | |

[Aspherical Surface Data]
Surface Number: 17

κ = 2.4373
A4 = 1.83600E−05
A6 = −4.18830E−08
A8 = 1.37730E−09
A10 = −5.38610E−12
A12 = 0.000
A14 = 0.000
A16 = 0.000

[Lens Group Data]

| Group | i | focal length |
|---|---|---|
| G1 | 1 | −25.237 |
| G2 | 7 | 21.541 |

[Values for Conditional Expressions]

(1): Σd/Ymax = 1.65
(2): BF/f0 = 1.54
(9): (−f1B)/f0 = 0.766
(10): f2B/f0 = 1.01
(11): R2R − R2F = 1.93
(12): νd = 82.56

Figure 18:
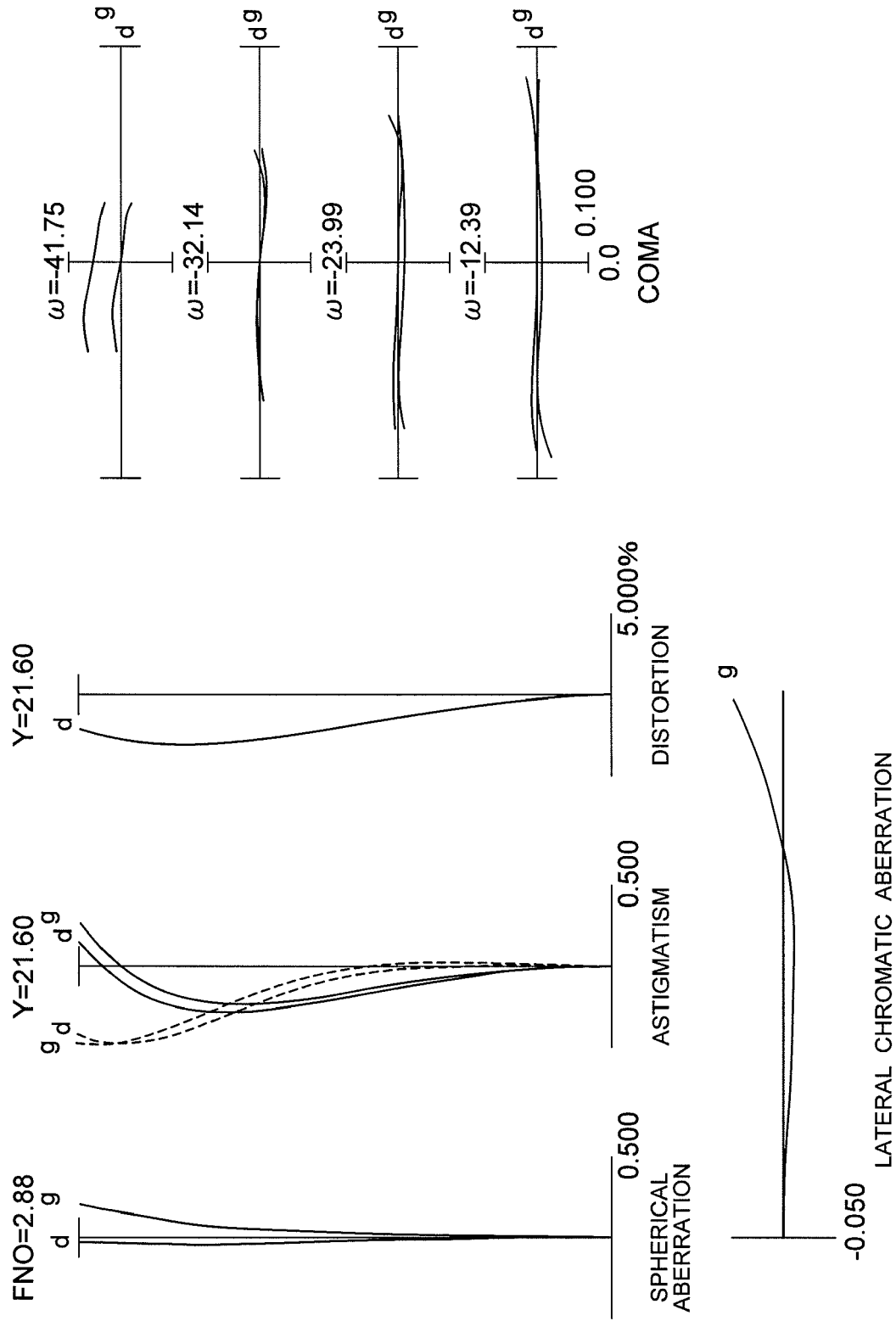
FIG. 18 shows graphs of various aberrations of the wide-angle lens according to Example 9 upon focusing on infinity.

FIG. 18 shows graphs of various aberrations of the wide-angle lens according to Example 9 upon focusing on infinity.

As is apparent from FIG. 18, the wide-angle lens according to Example 9 shows superb optical performance as a result of good corrections to various aberrations.

EXAMPLE 10

Figure 19:
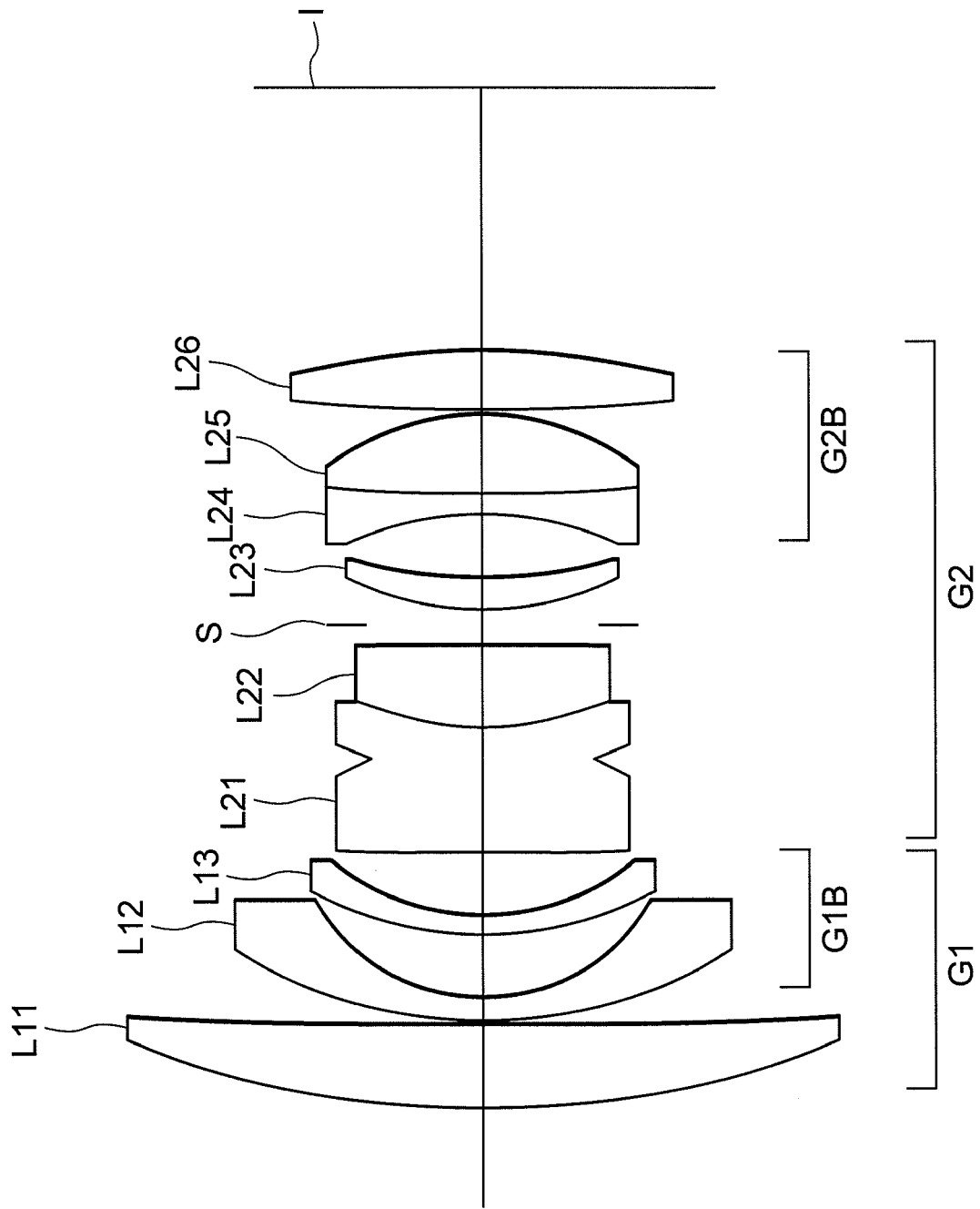
FIG. 19 is a sectional view showing a lens configuration of a wide-angle lens focusing on infinity according to Example 10 of the second embodiment of the present application.

FIG. 19 is a sectional view showing a lens configuration of a wide-angle lens focusing on infinity according to Example 10 of the second embodiment of the present application.

The wide-angle lens according to Example 10 is composed of, in order from an object side, a first lens group G1 having negative refractive power, and a second lens group G2 having positive refractive power.

The first lens group G1 is composed of, in order from the object side, a positive meniscus lens L11 having a convex surface facing the object side, and a rear lens group G1B having negative refractive power. The rear lens group G1B is composed of, in order from the object side, a negative meniscus lens L12 having a convex surface facing the object side and an aspherical surface facing an image side, and a negative meniscus lens L13 having a convex surface facing the object side.

The second lens group G2 is composed of, in order from the object side, a cemented positive lens constructed by a negative meniscus lens L21 having a convex surface facing the object side cemented with a positive meniscus lens L22 having a convex surface facing the object side, an aperture stop S for defining an f-number, a positive meniscus lens L23 having a convex surface facing the object side, and a rear lens group G2B having positive refractive power. The rear lens group G2B is composed of, in order from the object side, a cemented positive lens constructed by a double concave negative lens L24 cemented with a double convex positive lens L25, and a double convex positive lens L26 having an aspherical surface facing the image side.

Incidentally, a groove having an effective diameter of 10.4 mm is formed on a position with a vertex distance of 4 mm away from the object side lens surface of the negative meniscus lens L21 in the second lens group G2 in order to define lower side light ray.

Various values associated with the wide-angle lens according to Example 10 are listed in Table 10.

TABLE 10

[Specifications]

| | |
|---|---|
| f = | 24.70 |
| FNO = | 2.88 |
| ω = | 41.26° |
| Y = | 21.6 |
| TL = | 74.598 |
| Σd = | 36.598 |
| Bf = | 38.000 |

[Lens Data]

| i | r | d | nd | νd |
|---|---|---|---|---|
| 1) | 47.9219 | 4.0000 | 1.603000 | 65.47 |
| 2) | 286.0566 | 0.1000 | | |
| 3) | 23.0000 | 1.2000 | 1.497820 | 82.56 |
| *4) | 9.7255 | 3.0000 | | |
| 5) | 17.7866 | 1.0000 | 1.755000 | 52.29 |
| 6) | 11.7936 | 3.0000 | | |
| 7) | 192.4496 | 6.0000 | 1.581440 | 40.75 |
| 8) | 14.3503 | 4.0000 | 1.672700 | 32.11 |
| 9) | 999.0000 | 1.0000 | | |
| 10> | ∞ | 0.7000 | Aperture Stop S | |
| 11) | 15.7831 | 1.6000 | 1.497820 | 82.56 |
| 12) | 24.1251 | 2.9977 | | |
| 13) | −16.9402 | 1.0000 | 1.717360 | 29.52 |
| 14) | 98.2188 | 3.9000 | 1.603000 | 65.47 |
| 15) | −13.0197 | 0.1000 | | |
| 16) | 87.7345 | 3.0000 | 1.603000 | 65.47 |
| *17) | −32.6504 | 37.9999 | | |

TABLE 10-continued

[Aspherical Surface Data]

Surface Number: 4

κ = 0.5514
A4 = 8.71930E−05
A6 = 1.45310E−07
A8 = 1.44120E−08
A10 = 3.11220E−11
A12 = −0.47684E−12
A14 = −0.49445E−14
A16 = 0.32880E−15

Surface Number: 17

κ = 5.7591
A4 = 3.99600E−05
A6 = 1.66930E−07
A8 = 3.04000E−10
A10 = 6.06570E−12
A12 = 0.000
A14 = 0.000
A16 = 0.000

[Lens Group Data]

| Group | i | focal length |
|-------|---|--------------|
| G1    | 1 | −26.856      |
| G2    | 7 | 21.575       |

[Values for Conditional Expressions]

| (1): Σd/Ymax =    | 1.69  |
| (2): BF/f0 =      | 1.54  |
| (9): (−f1B)/f0 =  | 0.792 |
| (10): f2B/f0 =    | 1.10  |
| (11): R2R − R2F = | 8.35  |
| (12): νd =        | 82.56 |

Figure 20:
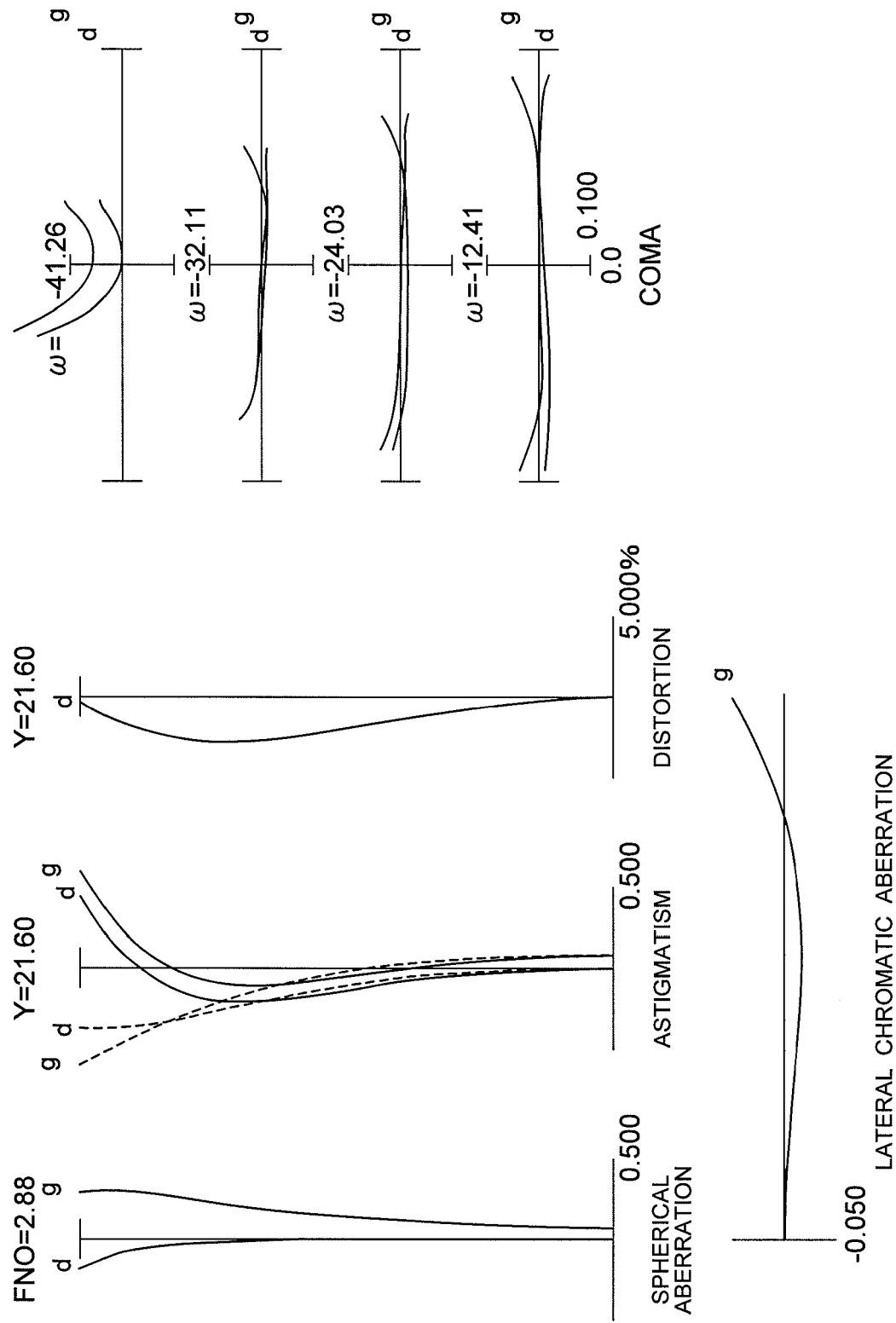
FIG. 20 shows graphs of various aberrations of the wide-angle lens according to Example 10 upon focusing on infinity.

FIG. 20 shows graphs of various aberrations of the wide-angle lens according to Example 10 upon focusing on infinity.

As is apparent from FIG. 20, the wide-angle lens according to Example 10 shows superb optical performance as a result of good corrections to various aberrations.

EXAMPLE 11

Figure 21:
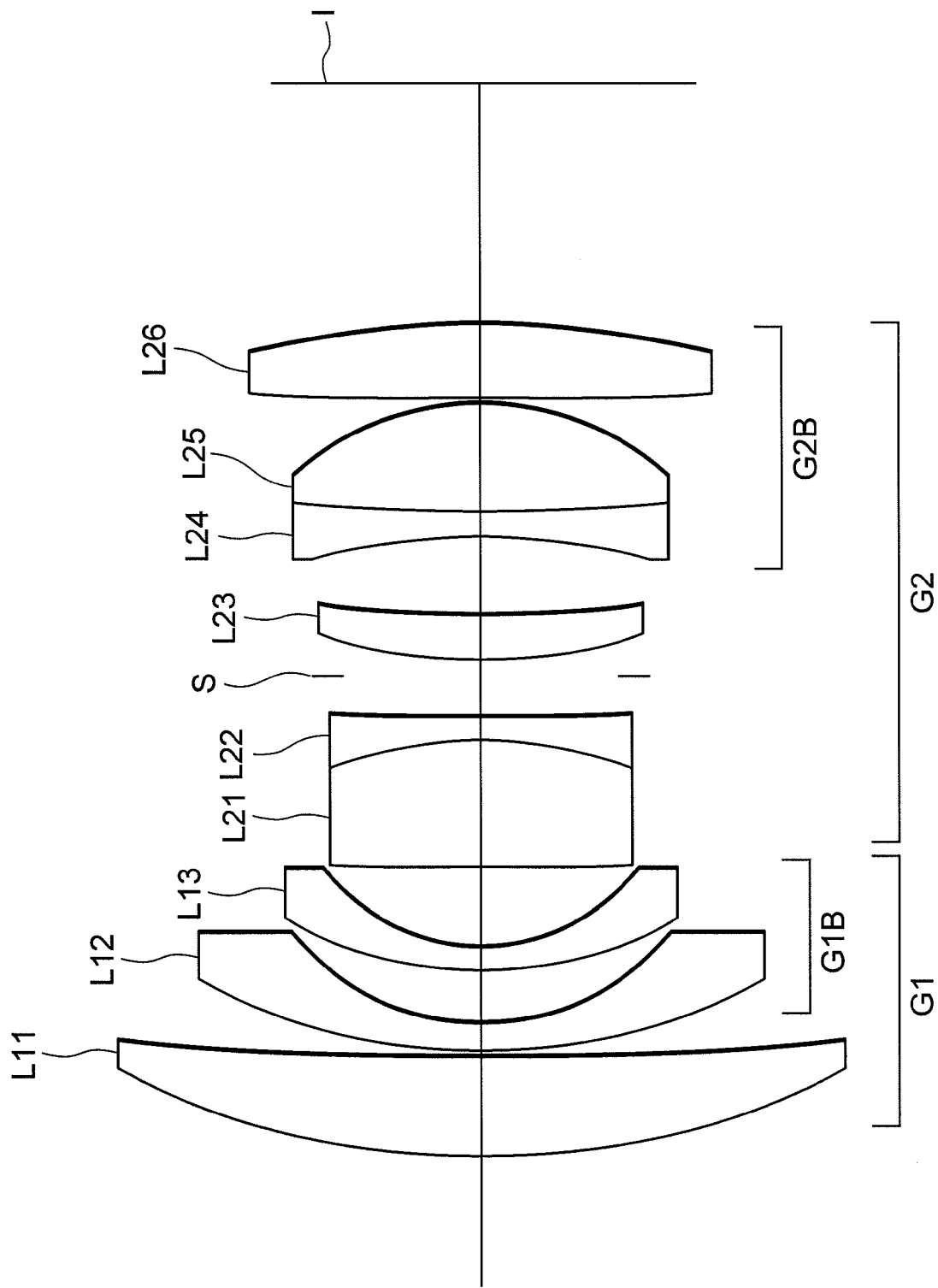
FIG. 21 is a sectional view showing a lens configuration of a wide-angle lens focusing on infinity according to Example 11 of the second embodiment of the present application.

FIG. 21 is a sectional view showing a lens configuration of a wide-angle lens focusing on infinity according to Example 11 of the second embodiment of the present application.

The wide-angle lens according to Example 11 is composed of, in order from an object side, a first lens group G1 having negative refractive power, and a second lens group G2 having positive refractive power.

The first lens group G1 is composed of, in order from the object side, a positive meniscus lens L11 having a convex surface facing the object side, and a rear lens group G1B having negative refractive power. The rear lens group G1B is composed of, in order from the object side, a negative meniscus lens L12 having a convex surface facing the object side and an aspherical surface facing an image side, and a negative meniscus lens L13 having a convex surface facing the object side.

The second lens group G2 is composed of, in order from the object side, a cemented positive lens constructed by a double convex positive lens L21 cemented with a double concave negative lens L22, an aperture stop S for defining an f-number, a positive meniscus lens L23 having a convex surface facing the object side, and a rear lens group G2B having negative refractive power. The rear lens group G2B is composed of, in order from the object side, a cemented positive lens constructed by a double concave negative lens L24 cemented with a double convex positive lens L25, and a double convex positive lens L26 having an aspherical surface facing the image side.

Various values associated with the wide-angle lens according to Example 11 are listed in Table 11.

TABLE 11

[Specifications]

| f =   | 24.70  |
| FNO = | 2.89   |
| ω =   | 41.80° |
| Y =   | 21.6   |
| TL =  | 70.797 |
| Σd =  | 32.798 |
| Bf =  | 38.000 |

[Lens Data]

| i    | r        | d       | nd       | νd    |
|------|----------|---------|----------|-------|
| 1)   | 31.3830  | 4.0000  | 1.487490 | 70.45 |
| 2)   | 150.8827 | 0.1000  |          |       |
| 3)   | 23.0000  | 1.2000  | 1.497820 | 82.56 |
| *4)  | 9.7255   | 2.0000  |          |       |
| 5)   | 15.3269  | 1.0000  | 1.497820 | 82.56 |
| 6)   | 7.9129   | 3.0000  |          |       |
| 7)   | 108.8032 | 5.0000  | 1.672700 | 32.11 |
| 8)   | −16.9652 | 1.0000  | 1.581440 | 40.75 |
| 9)   | 111.3590 | 1.5000  |          |       |
| 10>  | ∞        | 0.7000  | Aperture Stop S | |
| 11)  | 21.5578  | 1.8000  | 1.497820 | 82.56 |
| 12)  | 48.0513  | 2.9977  |          |       |
| 13)  | −26.4152 | 1.0000  | 1.717360 | 29.52 |
| 14)  | 75.3003  | 4.4000  | 1.497820 | 82.56 |
| 15)  | −11.0814 | 0.1000  |          |       |
| 16)  | 288.1280 | 3.0000  | 1.589130 | 61.18 |
| *17) | −32.6421 | 37.9995 |          |       |

[Aspherical Surface Data]

Surface Number: 4

κ = 1.0683
A4 = 1.98710E−06
A6 = 1.03460E−07
A8 = −1.40520E−09
A10 = 3.28720E−11
A12 = 0.000
A14 = 0.000
A16 = 0.000

Surface Number: 17

κ = 1.3009
A4 = 2.11830E−05
A6 = 2.27450E−08
A8 = 1.17810E−09
A10 = −3.86520E−12
A12 = 0.000
A14 = 0.000
A16 = 0.000

[Lens Group Data]

| Group | i | focal length |
|-------|---|--------------|
| G1    | 1 | −23.272      |
| G2    | 7 | 20.154       |

[Values for Conditional Expressions]

| (1): Σd/Ymax =    | 1.52  |
| (2): BF/f0 =      | 1.54  |
| (9): (−f1B)/f0 =  | 0.674 |
| (10): f2B/f0 =    | 0.990 |
| (11): R2R − R2F = | 26.49 |
| (12): νd =        | 82.56 |

Figure 22:
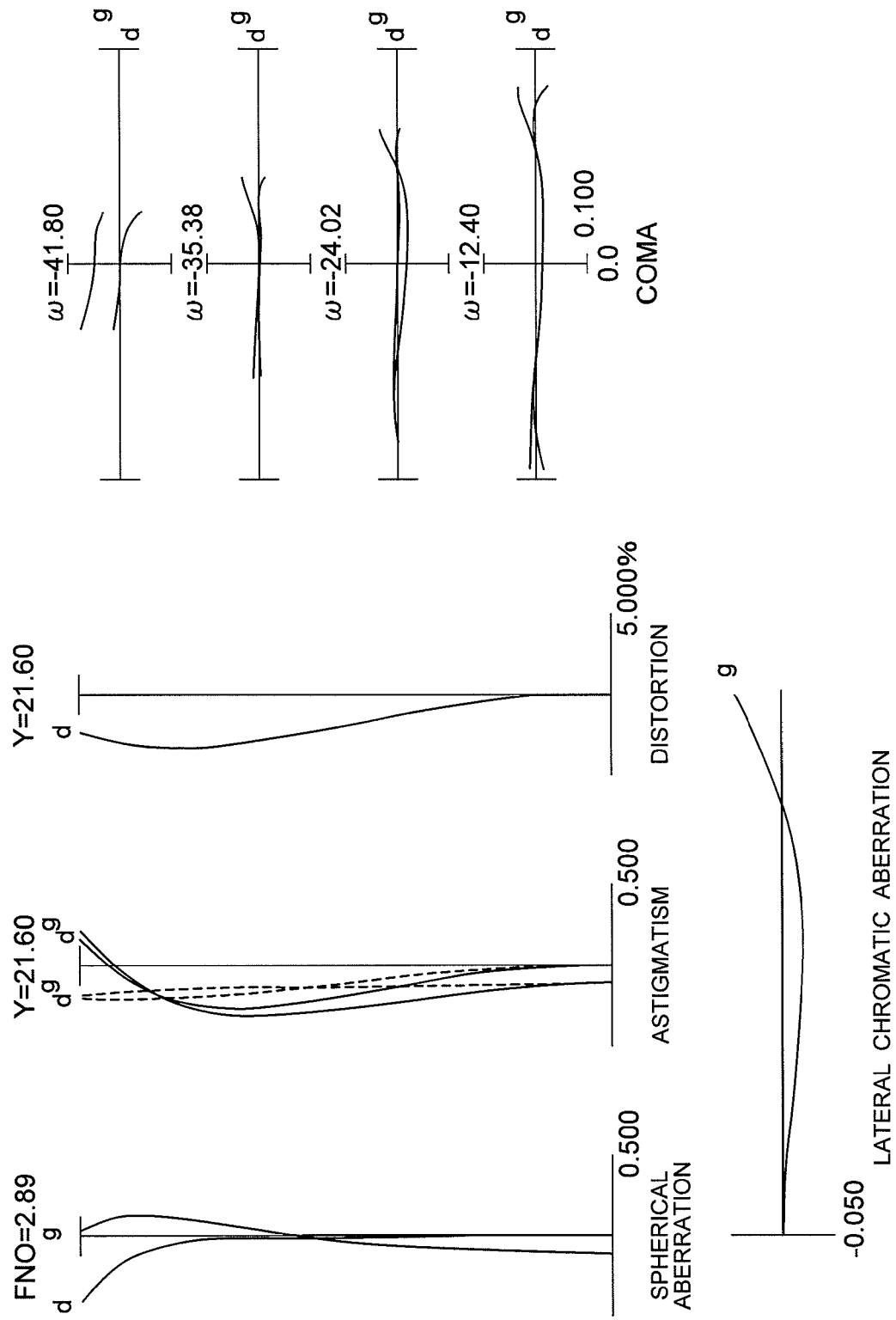
FIG. 22 shows graphs of various aberrations of the wide-angle lens according to Example 11 upon focusing on infinity.

FIG. 22 shows graphs of various aberrations of the wide-angle lens according to Example 11 upon focusing on infinity.

As is apparent from FIG. 22, the wide-angle lens according to Example 11 shows superb optical performance as a result of good corrections to various aberrations.

Each Example of the second embodiment makes it possible to provide a wide-angle lens having an angle of view 2ω of 84 degrees or more, an f-number of about 2.8 to 3.6, and high optical performance with excellently correcting spherical aberration, curvature of field, astigmatism and coma, and being compact and thin.

Then, an imaging apparatus equipped with a wide-angle lens according to the present application is explained with reference to FIG. 27.

Figure 27:
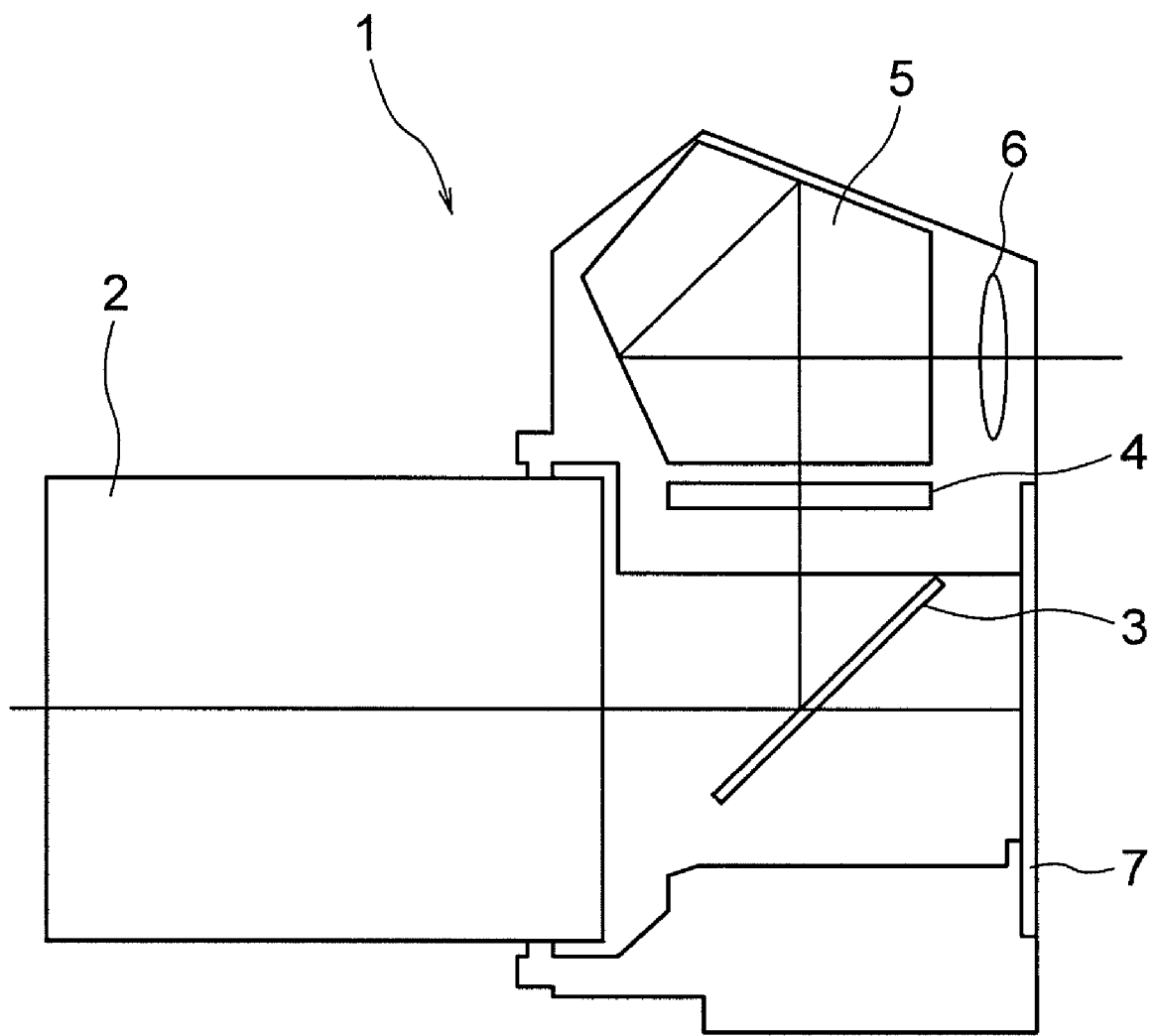
FIG. 27 is a diagram showing a construction of an imaging apparatus (a camera) equipped with the wide-angle lens according to Example 1 of the first embodiment of the present application.

FIG. 27 is a diagram showing a construction of an imaging apparatus (a camera) equipped with a wide-angle lens according to the present application.

As shown in FIG. 27, the camera 1 is a single lens reflex digital camera equipped with the wide-angle lens according to Example 1 of the first embodiment as an imaging lens 2.

In the camera 1, light coming out from an object (not shown) is converged by an imaging lens 2, reflected by a quick return mirror 3, and focused on a focusing screen 4. The light focused on the focusing screen 4 is reflected a plurality of times by a pentagonal roof prism 5, and led to an eyepiece 6. Accordingly, a photographer can observe the object image as an erected image through an eyepiece 6.

When the photographer presses a release button (not shown) all the way down, the quick return mirror 3 is retracted from the optical path, the light from the object converged by the imaging lens 2 is detected by an imaging device 7, and a photographed image is captured and stored in a memory (not shown). In this manner, the photographer can take an image of an object by the camera 1.

Here, the wide-angle lens according to Example 1 of the first embodiment installed in the camera 1 as an imaging lens 2 makes it possible to realize a wide-angle lens having fewer amount of curvature of field, astigmatism and coma by the characteristic lens configuration. Accordingly, the camera 1 can realize a thin imaging apparatus capable of taking a wide-angle picture with fewer amount of curvature of field, astigmatism and coma.

Moreover, a camera equipped with the wide-angle lens according to any one of Examples 2 to 11 can perform the same effect as the camera 1.

Incidentally, the following description may suitably be applied within limits that do not deteriorate optical performance.

Although a wide-angle lens with a two-lens-group configuration is shown as each Example of the present application, the lens-group configuration according to the present application is not limited to this, other lens-group configurations such as a three-lens-group configuration is possible.

In a wide-angle lens according to the present application, in order to carry out focusing from an infinity object to a close object, a portion of a lens group, a lens group, or a plurality of lens groups may be moved along the optical axis as a focusing lens group. It is preferable that the whole lens, at least a portion of the second lens group, or at least two portions of the whole lens group are used as focusing lens groups. Moreover, such a focusing lens group is suitable for auto focusing, and is suitable for being driven by a motor for auto focusing such as an ultrasonic motor.

In a wide-angle lens according to the present application, a lens group or a portion of a lens group may be shifted in a direction including a component perpendicular to the optical axis as a vibration reduction lens group, or tilted (fluctuated) in a direction including the optical axis for correcting an image blur caused by a camera shake. In a wide-angle lens according to the present application, it is particularly preferable that at least a portion of the second lens group is used as a vibration reduction lens group.

A lens surface of a lens composing a wide-angle lens according to the present application may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the surface is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

In a wide-angle lens according to the present application, although an aperture stop is preferably provided inside or in the vicinity of the second lens group, the function may be substituted by a lens frame without disposing a member as an aperture stop.

An antireflection coating having high transmittance over a broad wavelength range may be applied to each lens surface of a wide-angle lens according to the present application to reduce flare or ghost images, so that high optical performance with high contrast can be attained.

In a wide-angle lens according to the present application, the first lens group preferably includes one negative lens component. The first lens group preferably includes one positive lens component and one negative lens component. The first lens group preferably disposes these lens components, in order from the object side, positive-negative with an air space between each of them.

In a wide-angle lens according to the present application, the first lens group preferably includes one positive lens component and two negative lens components. The first lens group preferably disposes these lens components, in order from the object side, positive-negative-negative with an air space between each of them.

In a wide-angle lens according to the present application, the second lens group preferably includes two positive lens components and one negative lens component. The second lens group preferably disposes these lens components, in order from the object side, positive-negative-positive with an air space between each of them.

In a wide-angle lens according to the present application, the second lens group preferably includes three positive lens components. In a wide-angle lens according to the present application, the second lens group preferably includes three positive lens components and one negative lens component. The second lens group preferably disposes these lens components, in order from the object side, positive-negative-positive-positive with an air space between each of them.

In a wide-angle lens according to the present application, the second lens group preferably includes four positive lens components.

Above-described each example only shows a specific example for the purpose of better understanding of the present invention. Accordingly, it is needless to say that the invention in its broader aspect is not limited to the specific details and representative devices shown and described herein.

What is claimed is:

1. A wide-angle lens comprising, in order from an object side:
a first lens group having negative refractive power; and
a second lens group having positive refractive power;
the first lens group including at least one negative meniscus lens having a convex surface facing the object side,
the second lens group including, in order from the object side, a positive lens, a negative lens, and a positive lens, and
the following conditional expressions being satisfied:

$$0.90 < \Sigma d/Y\max < 2.00$$

$$1.30 < BF/f0 < 2.50$$

where $\Sigma d$ denotes a distance along an optical axis between the most object side lens surface and the most image side lens surface of the wide-angle lens, Ymax denotes an image height with respect to the maximum angle of view of the wide-angle lens, BF denotes a distance between the vertex of the most image side lens surface and the paraxial focal plane of the wide-angle lens, and f0 denotes a focal length of the wide-angle lens upon focusing on infinity.

2. The wide-angle lens according to claim 1, wherein the following conditional expression is satisfied:

$$0.10 < (-f1)/f0 < 2.00$$

where f1 denotes a focal length of the first lens group, and f0 denotes a focal length of the wide-angle lens upon focusing on infinity.

3. The wide-angle lens according to claim 1, wherein the following conditional expression is satisfied:

$$0.40 < f2/f0 < 1.50$$

where f2 denotes a focal length of the second lens group, and f0 denotes a focal length of the wide-angle lens upon focusing on infinity.

4. The wide-angle lens according to claim 1, wherein the following conditional expression is satisfied:

$$0.40 < f0/\Sigma d < 1.60$$

where f0 denotes a focal length of the wide-angle lens upon focusing on infinity, and $\Sigma d$ denotes a distance along an optical axis between the most object side lens surface and the most image side lens surface of the wide-angle lens.

5. The wide-angle lens according to claim 1, wherein the following conditional expression is satisfied:

$$45.0 < vd1 < 95.0$$

where vd1 denotes an average value of Abbe numbers of all lenses having negative refractive power in the first lens group.

6. The wide-angle lens according to claim 1, wherein an aperture stop is disposed to the object side of the most image side lens of the second lens group.

7. The wide-angle lens according to claim 1, wherein the first lens group includes at least one aspherical surface.

8. An imaging apparatus equipped with the wide-angle lens according to claim 1.

9. A wide-angle lens comprising, in order from an object side:
a first lens group having negative refractive power; and
a second lens group having positive refractive power;
the first lens group including, in order from the object side, a positive lens component, and a negative lens component,
the second lens group including, in order from the object side, a first positive lens component, a negative lens component, and a second positive lens component, and the following conditional expressions being satisfied:

$$0.40 < f0/\Sigma d < 1.60$$

$$1.30 < BF/f0 < 2.50$$

where $\Sigma d$ denotes a distance along an optical axis between the most object side lens surface and the most image side lens surface of the wide-angle lens, f0 denotes a focal length of the wide-angle lens upon focusing on infinity, and BF denotes a distance between the vertex of the most image side lens surface and the paraxial image plane of the wide-angle lens.

10. The wide-angle lens according to claim 9, wherein the following conditional expression is satisfied:

$$0.10 < (-f1)/f0 < 2.00$$

where f1 denotes a focal length of the first lens group, and f0 denotes a focal length of the wide-angle lens upon focusing on infinity.

11. The wide-angle lens according to claim 9, wherein the following conditional expression is satisfied:

$$0.80 < f2R/f0 < 10.00$$

where f2R denotes a combined focal length of the negative lens component and the second positive lens component in the second lens group, and f0 denotes a focal length of the wide-angle lens upon focusing on infinity.

12. The wide-angle lens according to claim 9, wherein the negative lens component in the second lens group includes a negative lens, and the following conditional expression is satisfied:

$$0 < |RNR| - |RNF| (\text{unit: mm})$$

where RNF denotes a radius of curvature of the object side lens surface of the negative lens in the negative lens component of the second lens group, and RNR denotes a radius of curvature of the image side lens surface of the negative lens in the negative lens component of the second lens group.

13. The wide-angle lens according to claim 9, wherein the following conditional expression is satisfied:

$$0.40 < f2/f0 < 1.50$$

where f2 denotes a focal length of the second lens group, and f0 denotes a focal length of the wide-angle lens upon focusing on infinity.

14. The wide-angle lens according to claim 9, wherein the following conditional expression is satisfied:

$$0.40 < f0/\Sigma d < 1.60$$

where f0 denotes a focal length of the wide-angle lens upon focusing on infinity, and $\Sigma d$ denotes a distance along an optical axis between the most object side lens surface and the most image side lens surface of the wide-angle lens.

15. An imaging apparatus equipped with the wide-angle lens according to claim 9.

16. A wide-angle lens comprising, in order from an object side:
a first lens group having negative refractive power; and
a second lens group having positive refractive power;
the first lens group including, in order from the object side, a positive lens component having a convex surface facing the object side, and a rear lens group having negative refractive power,
the rear lens group in the first lens group including at least two negative meniscus lens components having a convex surface facing the object side,
the second lens group including, in order from the object side, a first positive lens component, a positive meniscus lens component having a convex surface facing the object side, and a rear lens group having positive refractive power, the rear lens group in the second lens group including, in order from the object side, a cemented positive lens constructed by a negative lens cemented with a positive lens, and a second positive lens component, and the following conditional expressions being satisfied:

$$0.90 < \Sigma d/Y\text{max} < 2.00$$

$$1.30 < BF/f0 < 2.50$$

where Σd denotes a distance along an optical axis between the most object side lens surface and the most image side lens surface of the wide-angle lens, Ymax denotes an image height with respect to the maximum angle of view of the wide-angle lens, BF denotes a distance between the vertex of the most image side lens surface and the paraxial image plane of the wide-angle lens, and f0 denotes a focal length of the wide-angle lens upon focusing on infinity.

17. The wide-angle lens according to claim 16, wherein the following conditional expression is satisfied:

$$0.20 < (-f1B)/f0 < 1.50$$

where f1B denotes a focal length of the rear lens group of the first lens group, and f0 denotes a focal length of the wide-angle lens upon focusing on infinity.

18. The wide-angle lens according to claim 16, wherein the following conditional expression is satisfied:

$$0.50 < f2B/f0 < 2.00$$

where f2B denotes a focal length of the rear lens group in the second lens group, and f0 denotes a focal length of the wide-angle lens upon focusing on infinity.

19. The wide-angle lens according to claim 16, wherein the rear lens group in the second lens group includes at least one aspherical surface, and the aspherical surface has a shape that positive refractive power becomes weak or negative refractive power becomes strong from the optical axis to the periphery.

20. The wide-angle lens according to claim 16, wherein the following conditional expression is satisfied:

$$0 < R2R - R2F (\text{unit: mm})$$

where R2F denotes a radius of curvature of the object side lens surface of the positive meniscus lens component in the second lens group, and R2R denotes a radius of curvature of the image side lens surface of the positive meniscus lens component in the second lens group.

21. The wide-angle lens according to claim 16, wherein the first positive lens component includes a cemented lens constructed by a negative lens and a positive lens, or a cemented lens constructed by a positive lens and a negative lens.

22. The wide-angle lens according to claim 16, wherein at least one negative lens satisfying the following conditional expression is included in the rear lens group in the first lens group:

$$65.0 < vd$$

where vd denotes an Abbe number of the at least one negative lens included in the rear lens group in the first lens group.

23. A wide-angle lens comprising, in order from an object side:

a first lens group having negative refractive power; and
a second lens group having positive refractive power;
the first lens group including at least one negative meniscus lens component, the second lens group including, in order from the object side, two positive lens components, a negative lens component, and two positive lens components, the negative lens component including a negative lens, and the following conditional expressions being satisfied:

$$0 < |RNR| - |RNF| (\text{unit: mm})$$

$$1.30 < BF/f0 < 2.50$$

where RNF denotes a radius of curvature of the object side lens surface of the negative lens in the negative lens component of the second lens group, RNR denotes a radius of curvature of the image side lens surface of the negative lens in the negative lens component of the second lens group, f0 denotes a focal length of the wide-angle lens upon focusing on infinity, and BF denotes a distance between the vertex of the most image side lens surface and the paraxial image plane of the wide-angle lens.

24. The wide-angle lens according to claim 23, wherein the following conditional expression is satisfied:

$$0.40 < f2/f0 < 1.50$$

where f2 denotes a focal length of the second lens group, and f0 denotes a focal length of the wide-angle lens upon focusing on infinity.

25. A method for manufacturing a wide-angle lens that includes, in order from an object side, a first lens group having negative refractive power, and a second lens group having positive refractive power, the method comprising steps of:

disposing a negative meniscus lens having a convex surface facing the object side into the first lens group;

disposing, in order from the object side, a positive lens, a negative lens, and a positive lens into the second lens group; and disposing the first lens group and the second lens group such that the wide-angle lens satisfies the following conditional expressions:

$$0.90 < \Sigma d/Y\text{max} < 2.00$$

$$1.30 < BF/f0 < 2.50$$

where Σd denotes a distance along an optical axis between the most object side lens surface and the most image side lens surface of the wide-angle lens, Ymax denotes an image height with respect to the maximum angle of view of the wide-angle lens, BF denotes a distance between the vertex of the most image side lens surface and the paraxial image plane of the wide-angle lens, and f0 denotes a focal length of the wide-angle lens upon focusing on infinity.

26. The method according to claim 25, further including a step of:

disposing the first lens group and the second lens group such that the wide-angle lens satisfies the following conditional expression:

$$0.10 < (-f1)/f0 < 2.00$$

where f1 denotes a focal length of the first lens group, and f0 denotes a focal length of the wide-angle lens upon focusing on infinity.

27. The method according to claim 25, further including a step of:

disposing the first lens group and the second lens group such that the wide-angle lens satisfies the following conditional expression:

$$0.40 < f2/f0 < 1.50$$

where f2 denotes a focal length of the second lens group, and f0 denotes a focal length of the wide-angle lens upon focusing on infinity.

28. The method according to claim 25, further including a step of:
disposing the first lens group and the second lens group such that the wide-angle lens satisfies the following conditional expression:

$0.40<f0/\Sigma d<1.60$ where f0 denotes a focal length of the wide-angle lens upon focusing on infinity, and $\Sigma d$ denotes a distance along an optical axis between the vertex of the most object side lens surface and the most image side lens surface of the wide-angle lens.

29. A method for manufacturing a wide-angle lens that includes, in order from an object side, a first lens group having negative refractive power, and a second lens group having positive refractive power, the method comprising steps of:
disposing, in order from the object side, a positive lens component and a negative lens component into the first lens group;
disposing, in order from the object side, a first positive lens component, a negative lens component and a second lens component into the second lens group; and
disposing the first lens group and the second lens group such that the wide-angle lens satisfies the following conditional expressions:

$0.40<f0/\Sigma d<1.60$ $1.30<BF/f0<2.50$ where $\Sigma d$ denotes a distance along an optical axis between the most object side lens surface and the most image side lens surface of the wide-angle lens, f0 denotes a focal length of the wide-angle lens upon focusing on infinity, and BF denotes a distance between the most image side lens surface and the paraxial image plane of the wide-angle lens.

30. The method according to claim 29, further including a step of:
disposing the first lens group and the second lens group such that the wide-angle lens satisfies the following conditional expression:

$0.80<f2R/f0<10.00$ where f2R denotes a combined focal length of the negative lens component and the second positive lens component in the second lens group, and f0 denotes a focal length of the wide-angle lens upon focusing on infinity.

31. The method according to claim 29, further including a step of:
disposing the first lens group and the second lens group such that the negative lens component in the second lens group includes a negative lens, and the wide-angle lens satisfies the following conditional expression:

$0<|RNR|-|RNF|$(unit: mm)

where RNF denotes a radius of curvature of the object side lens surface of the negative lens in the negative lens component of the second lens group, and RNR denotes a radius of curvature of the image side lens surface of the negative lens in the negative lens component of the second lens group.

32. A method for manufacturing a wide-angle lens that includes, in order from an object side, a first lens group having negative refractive power, and a second lens group having positive refractive power, the method comprising steps of:
disposing, in order from the object side, a positive lens component and a rear lens group having negative refractive power into the first lens group;
disposing a negative meniscus lens component into the rear lens group of the first lens group;
disposing, in order from the object side, a first positive lens component, a positive meniscus lens component, and a rear lens group having positive refractive power into the second lens group;
disposing, in order from the object side, a cemented positive lens constructed by a negative lens cemented with a positive lens, and a second positive lens component into the rear lens group of the second lens group; and
disposing the first lens group and the second lens group such that the wide-angle lens satisfies the following conditional expressions:

$0.90<\Sigma d/Y\max<2.00$ $1.30<BF/f0<2.50$ where $\Sigma d$ denotes a distance along an optical axis between the most object side lens surface and the most image side lens surface of the wide-angle lens, Ymax denotes an image height with respect to the maximum angle of view of the wide-angle lens, BF denotes a distance between the vertex of the most image side lens surface and the paraxial image plane of the wide-angle lens, and f0 denotes a focal length of the wide-angle lens upon focusing on infinity.

33. A method for manufacturing a wide-angle lens that includes, in order from an object side, a first lens group having negative refractive power, and a second lens group having positive refractive power, the method comprising steps of:
disposing a negative meniscus lens component having a convex surface facing the object side into the first lens group;
disposing, in order from the object side, two positive lens components, a negative lens component, and two positive lens components into the second lens group;
disposing a negative lens into the negative lens component; and
disposing the first lens group and the second lens group such that the following conditional expression are satisfied:

$0<|RNR|-|RNF|$(unit: mm)

$1.30<BF/f0<2.50$ where RNF denotes a radius of curvature of the object side lens surface of the negative lens in the negative lens component of the second lens group, RNR denotes a radius of curvature of the image side lens surface of the negative lens in the negative lens component of the second lens group, f0 denotes a focal length of the wide-angle lens upon focusing on infinity, and BF denotes a distance between the vertex of the most image side lens surface and the paraxial image plane of the wide-angle lens.

* * * * *